United States Patent
Ko et al.

(10) Patent No.: US 9,462,108 B2
(45) Date of Patent: Oct. 4, 2016

(54) MOBILE TERMINAL AND METHOD FOR CONTROLLING THE MOBILE TERMINAL

(71) Applicant: LG Electronics Inc., Seoul (KR)

(72) Inventors: Kyoungsuk Ko, Seoul (KR); Byungjin Kim, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/593,846

(22) Filed: Jan. 9, 2015

(65) Prior Publication Data
US 2015/0326704 A1 Nov. 12, 2015

Related U.S. Application Data

(60) Provisional application No. 61/992,163, filed on May 12, 2014, provisional application No. 62/006,823, filed on Jun. 2, 2014.

(30) Foreign Application Priority Data

Jul. 22, 2014 (KR) ......... 10-2014-0092468
Jul. 22, 2014 (KR) ......... 10-2014-0092469
Jul. 22, 2014 (KR) ......... 10-2014-0092470

(51) Int. Cl.
*H04M 1/725* (2006.01)
*H04W 4/02* (2009.01)
(Continued)

(52) U.S. Cl.
CPC ........ *H04M 1/7253* (2013.01); *H04L 12/2809* (2013.01); *H04L 67/18* (2013.01); *H04M 1/72572* (2013.01); *H04W 4/02* (2013.01); *H04W 4/023* (2013.01)

(58) Field of Classification Search
CPC .. H04W 4/02; H04W 4/023; H04L 12/2809; H04L 67/18; H04M 1/72572; H04M 1/7253
See application file for complete search history.

(56) References Cited

U.S. PATENT DOCUMENTS 6,710,719 B1 * 3/2004 Jones ............... G01S 5/14
340/10.2
2004/0204831 A1 10/2004 Pochuev et al.
(Continued)

FOREIGN PATENT DOCUMENTS

JP 2011-96102 A 5/2011
KR 10-0652928 B1 12/2006
(Continued)

OTHER PUBLICATIONS

Liu et al., "Survey of Wireless Indoor Positioning Techniques and Systems," IEEE Transactions on Systems, Man, and Cybernetics—Part C: Applications and Reviews, vol. 37, No. 6, Nov. 2007, pp. 1067-1080, XP-011193920.

*Primary Examiner* — Kenneth Lam
(74) *Attorney, Agent, or Firm* — Birch, Stewart, Kolasch & Birch, LLP

(57) ABSTRACT

A method for controlling a mobile terminal, and which includes establishing communication connections, via a communication unit of the mobile terminal, with a plurality of reference devices, for a location-based service to calculate a current location of the mobile terminal; displaying a list of controllable devices on a display unit of the mobile terminal based on the calculated current location of the mobile terminal; receiving, via a controller of the mobile terminal, a selection of a specific device from displayed list of controllable devices; storing location information about the selected device in an internal or external memory of the mobile terminal; and displaying a first graphic image for controlling a first device corresponding to the calculated current location and a direction of the mobile terminal.

14 Claims, 73 Drawing Sheets

(51) Int. Cl.
*H04L 12/28* (2006.01)
*H04L 29/08* (2006.01)

(56) References Cited

U.S. PATENT DOCUMENTS

| | | | |
|---|---|---|---|
| 2004/0204832 A1* | 10/2004 | Han | G01C 21/367 |
| | | | 701/455 |
| 2011/0141909 A1 | 6/2011 | Hibara et al. | |
| 2012/0019674 A1* | 1/2012 | Ohnishi | G08C 17/00 |
| | | | 348/207.1 |
| 2012/0117249 A1* | 5/2012 | Jung | H04L 12/2809 |
| | | | 709/227 |
| 2013/0029685 A1* | 1/2013 | Moshfeghi | G01S 19/48 |
| | | | 455/456.1 |
| 2013/0053061 A1 | 2/2013 | Kang et al. | |
| 2013/0113993 A1* | 5/2013 | Dagit, III | G06F 3/017 |
| | | | 348/552 |
| 2013/0247117 A1 | 9/2013 | Yamada et al. | |
| 2015/0025838 A1* | 1/2015 | Yamada | H04W 64/006 |
| | | | 702/150 |
| 2015/0050947 A1* | 2/2015 | Wirola | G01S 5/0252 |
| | | | 455/456.1 |

FOREIGN PATENT DOCUMENTS

| | | |
|---|---|---|
| KR | 10-0764244 B1 | 10/2007 |
| KR | 10-2010-0128490 A | 12/2010 |
| KR | 10-2013-0002663 A | 1/2013 |
| KR | 10-2013-0022885 A | 3/2013 |
| KR | 10-2013-0086714 A | 8/2013 |
| WO | WO 2010/021170 A1 | 2/2010 |

* cited by examiner

FIG. 35
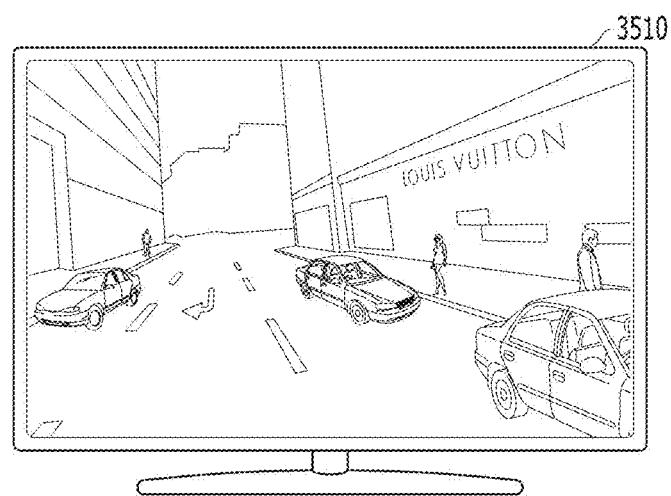
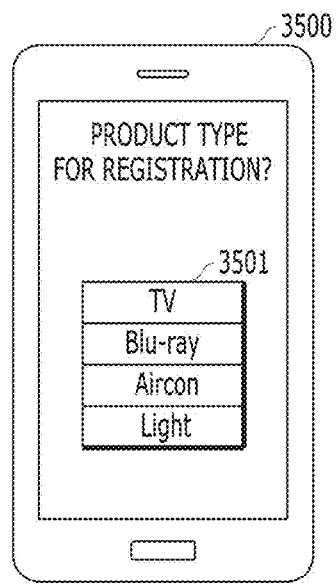

FIG. 36
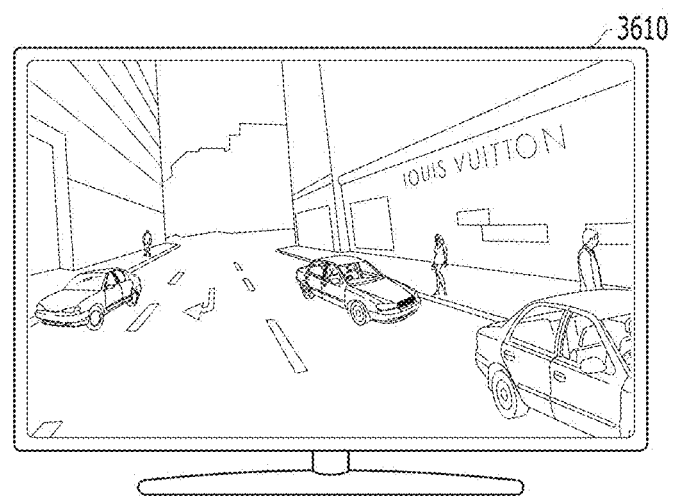
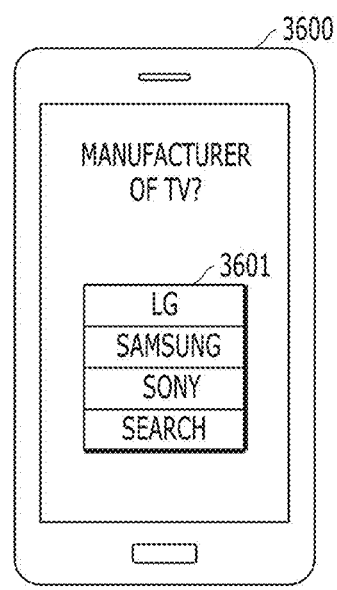

FIG. 37
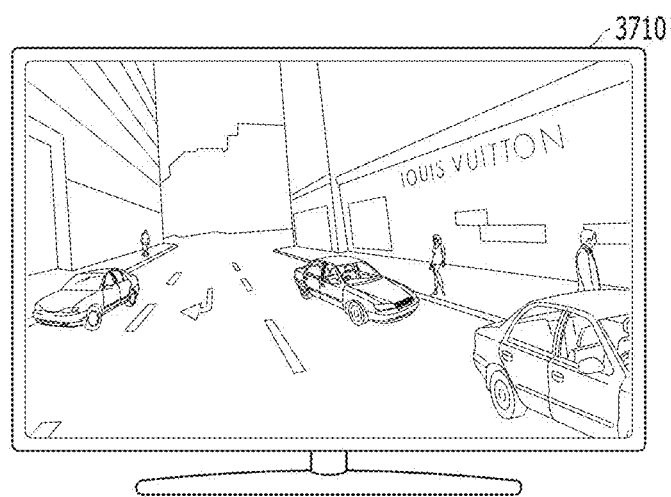
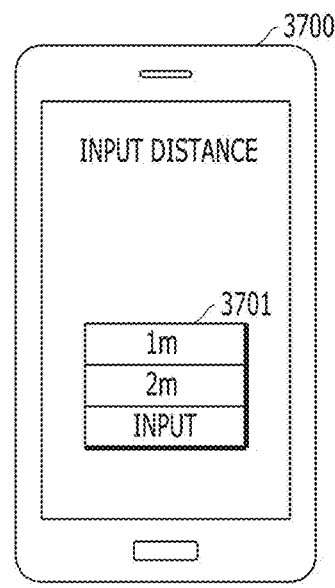

FIG. 49
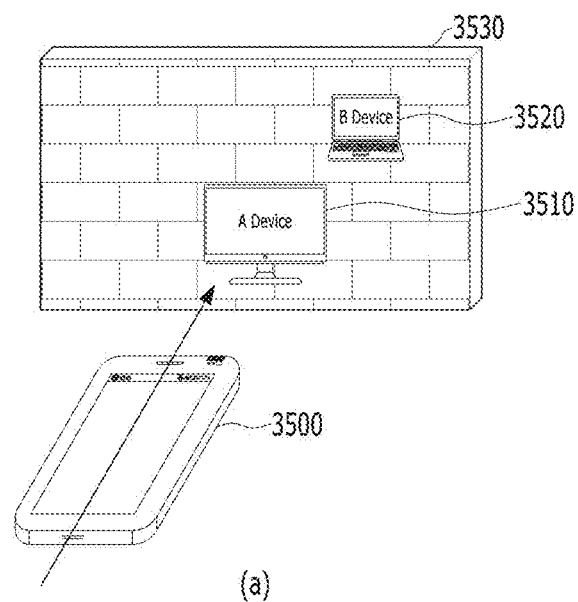
(a)
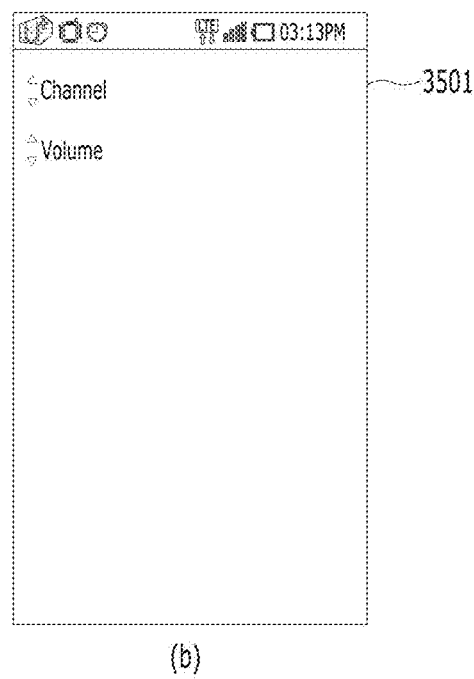
(b)

FIG. 50
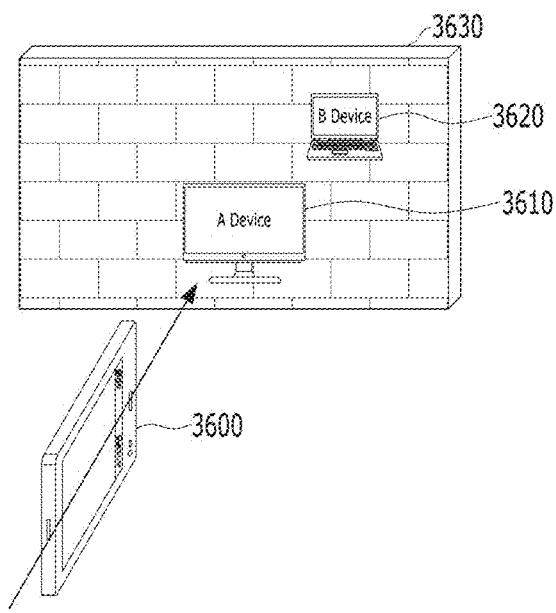
(a)
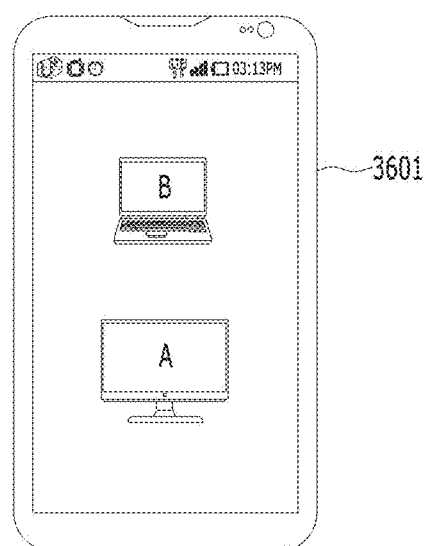
(b)

FIG. 51
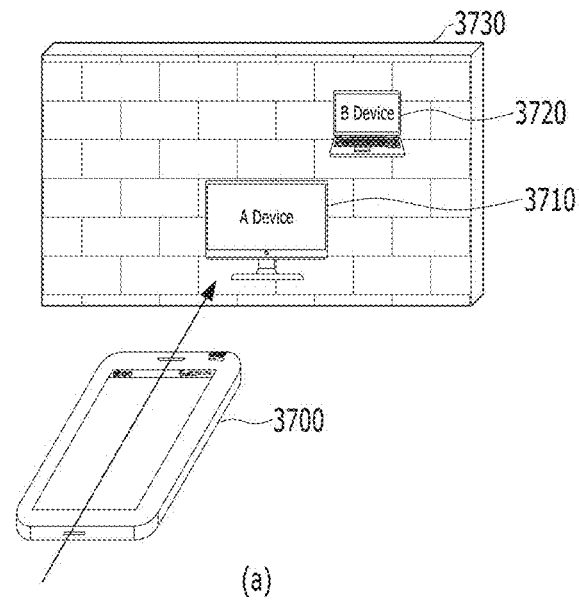
(a)
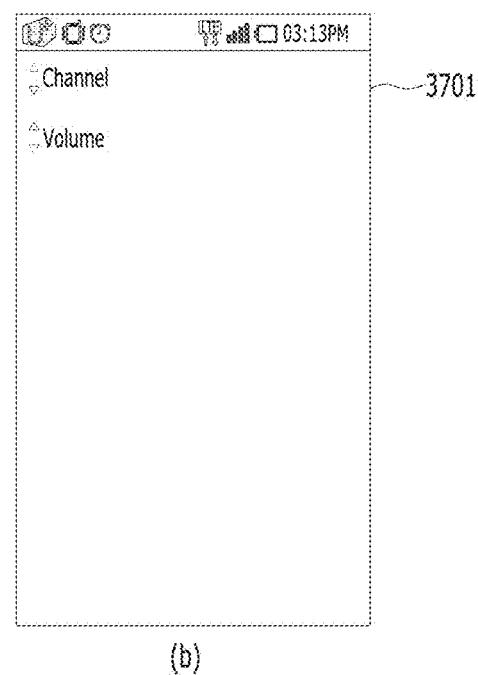
(b)

FIG. 52
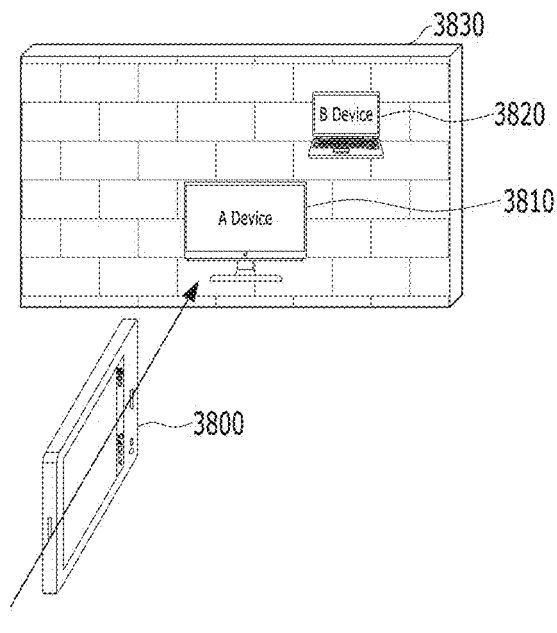
(a)
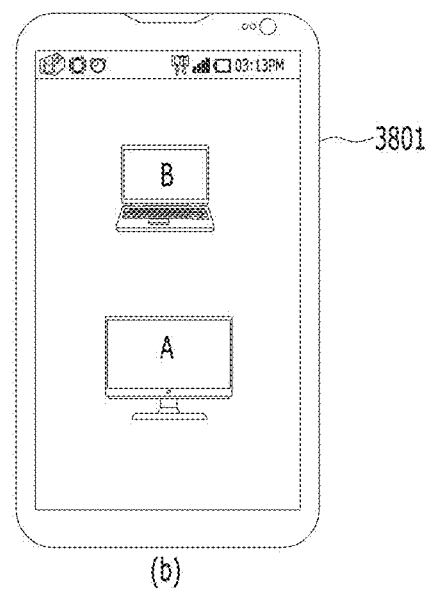
(b)

FIG. 57
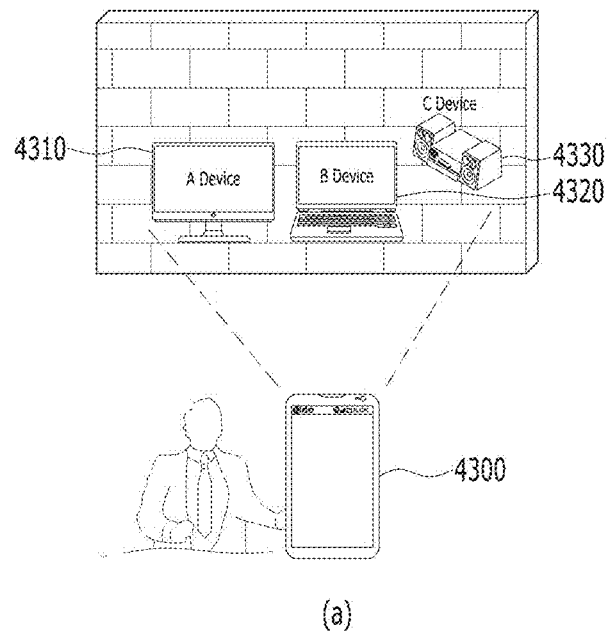
(a)
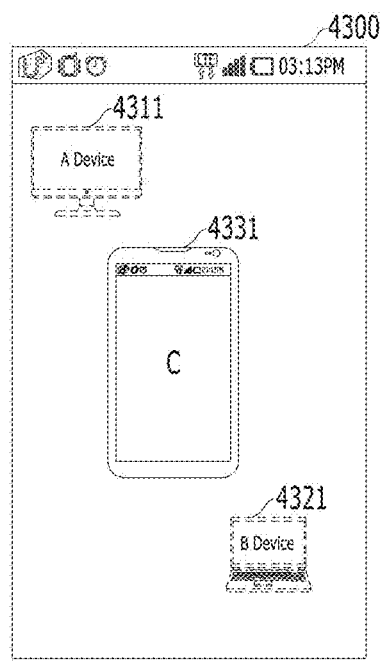
(b)

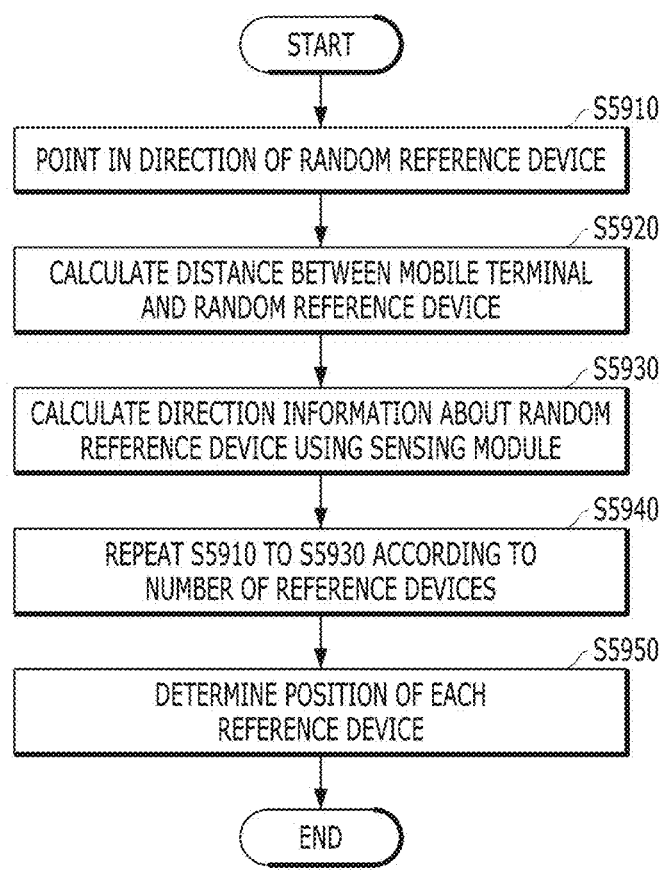

MOBILE TERMINAL AND METHOD FOR CONTROLLING THE MOBILE TERMINAL

Pursuant to 35 U.S.C. §119(e), this application claims the benefit of priority to U.S. provisional patent Application Nos. 61/992,163, filed on May 12, 2014, 62/006,823, filed on Jun. 2, 2014 the contents of which are incorporated by reference herein in their entirety. Pursuant to 35 U.S.C. §119(a), this application claims the benefit of earlier filing date and right of priority to Korean Application Nos. 10-2014-0092468, filed on Jul. 22, 2014, 10-2014-0092469, filed on Jul. 22, 2014, 10-2014-0092470, filed on Jul. 22, 2014, the contents of which are hereby incorporated by reference herein in their entirety.

BACKGROUND OF THE INVENTION

1. Field of the Invention

The present invention relates to a mobile terminal and control system for measuring the location of an electronic device or a specific area and controlling a system including the electronic device or the specific area. More particularly, the present invention is applicable for effective control of at least one device which is located indoors.

2. Discussion of the Related Art

Terminals may be categorized into mobile or portable terminals and stationary terminals. Mobile terminals may be further divided into handheld terminals and vehicle-mounted terminals. As such a terminal is equipped with a variety of functions, the terminal is configured, for example, as a multimedia player with composite functions including capturing of a picture or a video, playback of music or a video, gaming, broadcasting reception, etc.

To realize the composite functions of a multimedia player, many new attempts have been made in terms of hardware or software. For example, a User Interface (UI) environment that enables a user to readily search for and select a function is provided. As a mobile terminal has become a personal attachment representing a user's personality, there are various design requirements for the mobile terminal. The design requirements include structural modifications and improvements made to allow users to use mobile terminals more conveniently. Such a structural modification and improvement may be considered for a manipulation unit.

SUMMARY OF THE INVENTION

Accordingly, the present invention is directed to a mobile terminal and a method for controlling the mobile terminal that substantially obviate one or more problems due to limitations and disadvantages of the related art.

An object of the present invention is to provide a mobile terminal and control system for measuring the location of an electronic device or a specific area and controlling a system including the electronic device or the specific area.

Another object of the present invention is to define a protocol for, if a mobile terminal to be controlled is a legacy device, pre-registering the legacy device. Those skilled in the art may interpret the legacy device as a general meaning of the term or, for example, as an analog device or a device without communication functionality.

Another object of the present invention is to define a process for automatically changing a communication means of a mobile terminal to be controlled in order to control the mobile terminal according to a pointing direction of the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a mobile terminal includes starting to establish communication connections with a plurality of reference devices, for a location-based service, displaying a list of devices to be controlled, selecting a specific device from among the devices included in the list, storing location information about the selected device in an internal or external memory, and outputting a graphic image for controlling a first device corresponding to a location and direction of the mobile terminal.

In another aspect of the present invention, a mobile terminal includes a communication module configured to start to establish communication connections with a plurality of reference devices, for a location-based service, a display module configured to display a list of devices to be controlled, an interface module configured to select a specific device from among the devices included in the list, and a controller configured to control the display module to output a graphic image for controlling a first device corresponding to a location and direction of the mobile terminal.

It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 35 illustrates a procedure for registering a legacy device using a mobile terminal according to an embodiment of the present invention;

FIG. 36 illustrates another procedure for registering a legacy device using a mobile terminal according to an embodiment of the present invention;

FIG. 37 illustrates another procedure for registering a legacy device using a mobile terminal according to an embodiment of the present invention;

FIG. 49 illustrates an embodiment of solving the problem encountered with the case of FIG. 48.

FIG. 50 illustrates another embodiment of overcoming the problem encountered with the case of FIG. 48.

FIG. 51 illustrates another embodiment of solving the problem encountered with the case of FIG. 48.

FIG. 52 illustrates another embodiment of solving the problem encountered with the case of FIG. 48.

FIG. 57 illustrates a graphic image that a mobile terminal outputs, when a plurality of perceivable controlled devices exist in the same indoor area in FIG. 53 according to an embodiment of the present invention.

And, FIG. 73 is a flowchart illustrating a control method of a mobile terminal according to another embodiment of the present invention.

DETAILED DESCRIPTION OF THE INVENTION

Reference will now be made in detail to embodiments of the present invention disclosed in the specification, examples of which are illustrated in the accompanying drawings. Wherever possible, the same reference numbers will be used throughout the drawings to refer to the same or like parts and a redundant description of the reference numbers will be omitted. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used with each other. Also, the attached drawings are provided to help easy understanding of the embodiments of the present invention. Therefore, it is to be understood that the attached drawings do not limit the technical scope of the present invention and all modifications, equivalents, and replacements are embraced within the spirit and scope of the present invention.

Terms such as "first" or "second" may be used to describe various components, but do not limit such components. Such terms may be used to differentiate one component from another. If a component is said to be "connected with" or "connected to" another component, the component may be directly connected with or connected to the other component, or another component may exist in between. Further, if a component is said to be "directly connected with" or "directly connected to" another component, it should be understood that no component exists in between.

Unless otherwise specified in the context, any definition for a singular expression incorporates its plural counterpart. As used in the present invention, a term such as "include" or "have" refers to the presence of characteristics, numbers, steps, operations, components, parts, or combinations thereof, and is not intended to exclude one or more additional characteristics, numbers, steps, operations, components, parts, or combinations thereof.

Figure 1:
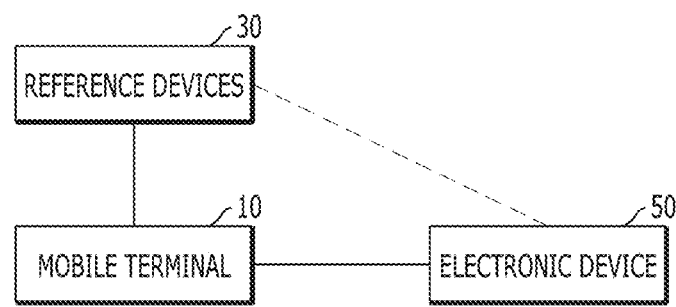
FIG. 1 illustrates an control system according to an embodiment of the present invention.

FIG. 1 illustrates a control system according to an embodiment of the present invention. Referring to FIG. 1, the control system may include a mobile terminal 10, a plurality of reference devices 30, and at least one electronic device 50. The mobile terminal 10 measures its location through wireless communication with the reference devices 30, senses its direction toward the electronic device 50, and measures the distance between the mobile device 10 and the electronic device 50. The mobile terminal 10 may measure the location of the electronic device 50 using the location and direction of the mobile terminal 10 and the distance between the mobile terminal 10 and the electronic device 50. The mobile terminal 10 may also generate and store a map indicating the locations of electronic devices 50 based on measured locations of the electronic devices 50 and may select and control an intended electronic device 50 using the map.

The mobile terminal 10 as described herein may be configured as any of portable phone, smart phone, laptop computer, digital broadcasting terminal, Personal Digital Assistant (PDA), Portable Multimedia Player (PMP), navigation device, slate Personal Computer (PC), tablet PC, ultrabook, wearable device (e.g. smartwatch, smart glasses, or Head Mounted Display (HMD)), and remote control.

The reference devices 30 are used to measure the location of the mobile terminal 10 or the electronic device 50. Preferably, at least three reference devices 30 are deployed at different locations, for triangulation-based location measurement. For example, at least three reference devices 30 are needed to measure a Two-Dimensional (2D) location of the mobile terminal 10 or the electronic device 50 and at least four reference devices 30 are needed to measure a Three-Dimensional (3D) location of the mobile terminal 10 or the electronic device 50. While it is preferred that the reference devices 30 are positioned indoors when they are used for location measurement of the mobile terminal 10 located indoors, the locations of the reference devices 30 are not limited to indoors. Thus the reference devices 30 may be positioned outdoors.

The electronic device 50 may be a home appliance such as TV, computer, refrigerator, washing machine, air conditioner, light, or the like. Aside from the home appliance, the electronic device 50 may be a mobile terminal with communication functionality. Particularly, if the electronic device 50 has an Indoor Positioning System (IPS) function, the electronic device 50 may measure its own location through communication with the reference devices 30.

Figure 2:
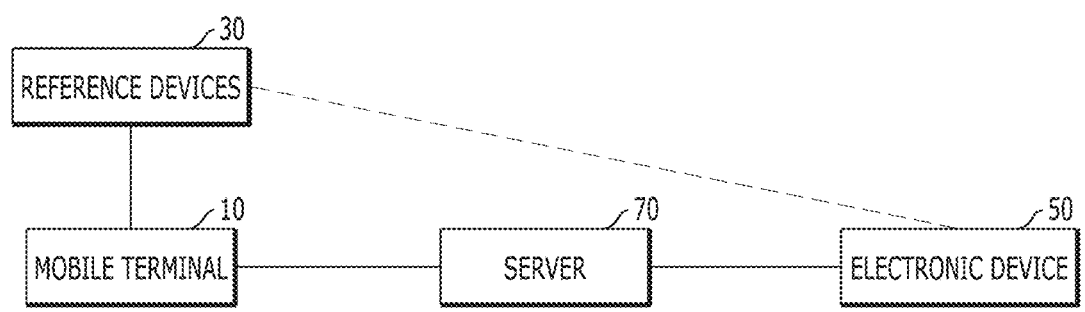
FIG. 2 illustrates another control system according to an embodiment of the present invention.

FIG. 2 illustrates another control system according to an embodiment of the present invention. Referring to FIG. 2, the control system of the present invention may include the mobile terminal 10, a plurality of reference devices 30, at least one electronic device 50, and a server 70. The mobile terminal 10 measures its location through wireless communication with the reference devices 30, senses its direction toward the electronic device 50, and measures the distance between the mobile device 10 and the electronic device 50. The mobile terminal 10 may measure the location of the electronic device 50 using the location and direction of the mobile terminal 10 and the distance between the mobile terminal 10 and the electronic device 50. The mobile terminal 10 may also generate and store a map indicating the locations of electronic devices 50 based on measured locations of the electronic devices 50 and may select and control an intended electronic device 50 using the map.

The reference devices 30 are used to measure the location of the mobile terminal 10 or the electronic device 50. Preferably, at least three reference devices 30 are deployed at different locations, for triangulation-based location measurement. While it is preferred that the reference devices 30 are positioned indoors when they are used for location measurement of the mobile terminal 10 located indoors, the locations of the reference devices 30 are not limited to indoors. Thus the reference devices 30 may be positioned outdoors.

The electronic device 50 may be a home appliance such as TV, computer, refrigerator, washing machine, air conditioner, light, or the like. Aside from the home appliance, the electronic device 50 may be a mobile terminal with communication functionality. Particularly, if the electronic device 50 has an IPS function, the electronic device 50 may measure its own location through communication with the reference devices 30.

The server 70 can measure the location of the electronic device 50 using the location and direction of the mobile terminal 10 and the distance between the mobile terminal 10 and the electronic device 50. The server 70 can also generate and store a map indicating the locations of electronic devices 50 based on measured locations of the electronic devices 50 and may select and control an intended electronic device 50 using the map in accordance with a command received from the mobile terminal 10. The server 70 can be, but not limited to, a home gateway or a cloud device. Or the server 70 can be a computation/storage device with communication functionality.

Figure 3:
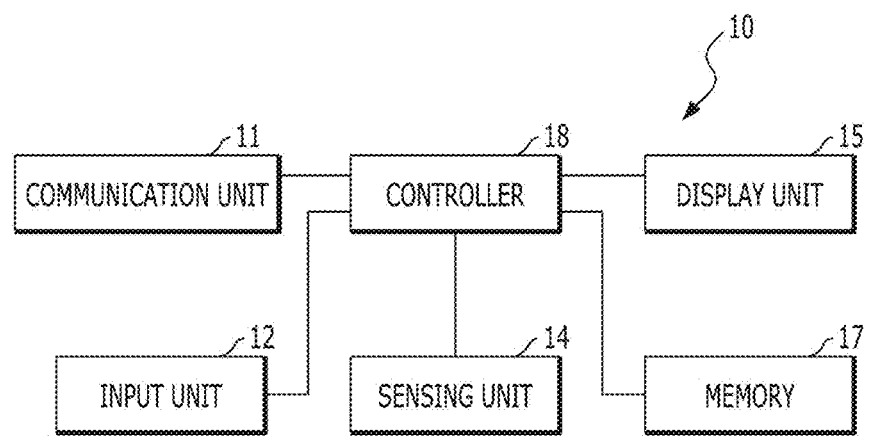
FIG. 3 illustrates an mobile terminal according to an embodiment of the present invention.

FIG. 3 illustrates an mobile terminal according to an embodiment of the present invention. Referring to FIG. 3, the mobile terminal 10 of the present invention includes a communication unit 11, an input unit 12, a sensing unit 14, a display unit 15, a memory 17, and a controller 18. The components illustrated in FIG. 3 are not mandatory to implement the mobile terminal 10. Accordingly, the mobile terminal described in the specification may include more or fewer than the above-enumerated components.

The communication unit 11 may include at least one of a wireless Internet module, a short-range communication module, or a location information module. The wireless Internet module refers to a module used for wireless Internet connectivity. The wireless Internet module may be mounted inside or outside the mobile terminal 10. The wireless Internet module is configured to transmit and receive wireless signals over communication networks complying with wireless Internet technologies. The wireless Internet technologies include, for example, Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), LTE-Advanced (LTE-A), etc. The wireless Internet module transmits and receives data in compliance with at least one wireless Internet technology within a range including other wireless Internet technologies in addition to the above-described wireless Internet technologies.

The short-range communication module is used for short-range communication. The short-range communication module may support short-range communication using at least one of Bluetooth, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (USB). The short-range communication module may support wireless communication between the mobile terminal 10 and the reference devices 30, between the mobile terminal 10 and the electronic device, or between the mobile terminal 10 and a network in which the server 70 resides, through a short-range wireless network. The short-range wireless network may be a short-range wireless personal area network. Particularly, the mobile terminal 10 may determine its location by communicating with the reference devices 30 through the short-range communication module.

The location information module is used to determine the location (or current location) of the mobile terminal 10. A major example of the location information module is a Global Positioning System (GPS) module or a Wi-Fi module. For example, if the mobile terminal 10 uses a GPS module, the mobile terminal 10 may determine its location using a signal received from a GPS satellite. In another example, if the mobile terminal 10 uses a Wi-Fi module, the mobile terminal 10 may determine its location based on information of a wireless Access Point (AP) that transmits or receives a signal to or from the Wi-Fi module. Alternatively or additionally, the location information module may perform the function of any other module of the communication unit 11 to obtain data about the location of the mobile terminal 10, when needed.

The input unit 12 may include a user input unit for receiving information from a user, for example, a touch key, a mechanical key, etc. The sensing unit 14 may include one or more sensors for sensing at least one of internal information about the mobile terminal 10, information about an ambient environment of the mobile terminal 10, or user information. For example, the sensing unit 14 may include at least one of an acceleration sensor, a magnetic sensor, a gravity sensor, a gyroscope sensor, a motion sensor, an InfraRed (IR) sensor, an ultrasonic sensor, or an optical sensor. At least one of the acceleration sensor, the magnetic sensor, the gravity sensor, the gyroscope sensor, or the motion sensor may be used to determine a direction in which a top end of the mobile terminal 10 is steered, whereas at least one of the IR sensor, the ultrasonic sensor, or the optical sensor may be used to measure the distance between the mobile terminal 10 and the electronic device 50. For example, the ultrasonic sensor may sense ultrasonic waves reflected from the electronic device 50 and the controller 18 can calculate the distance to a wave generation source (i.e., the electronic device 50) based on the sensed ultrasonic waves. The distance to the wave generation source may be calculated using a time difference between output ultrasonic waves and reflected ultrasonic waves.

The display unit 15 may be configured as a touch screen. The touch screen may function as the user input unit 12 that provides an input interface between the mobile terminal 10 and the user and provide an output device between the mobile terminal 10 and the user, as well. In addition, the display unit 15 displays (outputs) information processed in the mobile terminal 10. For example, the display unit 15 may display information about an execution screen of an application program executed by the mobile terminal 10, or User Interface (UI) or Graphic User Interface (GUI) information related to the execution screen information.

The memory 17 may store a plurality of application programs or applications executed by the mobile terminal 10, data and commands needed for operations of the mobile terminal 10, location information and identification information about the electronic device 50, and a map including location information and identification information about one or more electronic devices 50. The memory 17 may include at least one of storage medium types such as a flash memory type, a hard disk type, a Solid State Disk (SSD) type, a multimedia card micro type, a card-type memory (e.g., Secure Disk (SD) or eXtreme Digital (XD) memory), a Random Access Memory (RAM), a Static RAM (SRAM), a Read Only Memory (ROM), an Electrically Erasable Programmable Read Only Memory (EEPROM), a Programmable Read Only Memory (PROM), a magnetic memory, a magnetic disk, and an optical disk.

The controller 18 generally provides overall control to the operations of the mobile terminal 10. The controller 18 can provide or process appropriate information or functions to the user by processing signals, data, information, etc. input to or output from the above-described components or executing application programs stored in the memory 17. The controller 18 can also control at least a part of the components to execute application programs stored in the memory 17. Further, the controller 18 can operate at least two of the components included in the mobile terminal 10, in combination, in order to execute the application programs.

In addition, the controller 18 measures the actual location of the electronic device 50 using three values, that is, the location of the mobile terminal 10 which is measured through communication between the communication unit 11 and the reference devices 30, the direction of the mobile terminal 10 toward the electronic device 50, sensed by the sensing unit 14, and the distance between the mobile terminal 10 and the electronic device 50. The controller 18 can provide a UI through which a maximum allowed distance between the mobile terminal 10 and the electronic device 50 may be set to measure the location of the electronic device 50.

The controller 18 can transmit the measured location information about the electronic device 50 along with identification information about the electronic device 50 to the memory 17 or the server 70, and may generate a map using location information and identification information about one or more electronic devices 50 and store the map in the memory 17.

If the user executes a location tracking application and controls the direction of the mobile terminal 10 after the map is generated in the above-described manner, the controller 18 determines whether the controlled direction of the mobile terminal 10 is toward the measured location of the electronic device 50. For this purpose, the controller 18 determines whether the mobile terminal 10 is directed toward the electronic device 50 registered on the map, in consideration of the current location and direction of the mobile terminal 10. If the mobile terminal 10 is directed toward the location of the electronic device 50, the controller 18 can select and control the electronic device 50.

Even when the user applies a touch input (e.g., a drag input) to the display unit 15 so that the mobile terminal 10 may be directed toward the measured location of the electronic device 50, the controller 18 can select and control the user-intended electronic device 50, taking into account the current location of the mobile terminal 10 and the direction of the touch input.

The controller 18 can also display identification information about one or more electronic devices 50 located on a virtual line drawn in the direction of the mobile terminal 10 or the direction of the touch input. The controller 18 can display the identification information on the display unit 15 in a predetermined order according to the distances between the mobile terminal 10 and the electronic devices 50. Thus, the user can readily select the intended electronic device 50 using the displayed identification information. The controller 18 can also provide a UI through which the length of a virtual line is drawn to the display unit 15.

Figure 4:
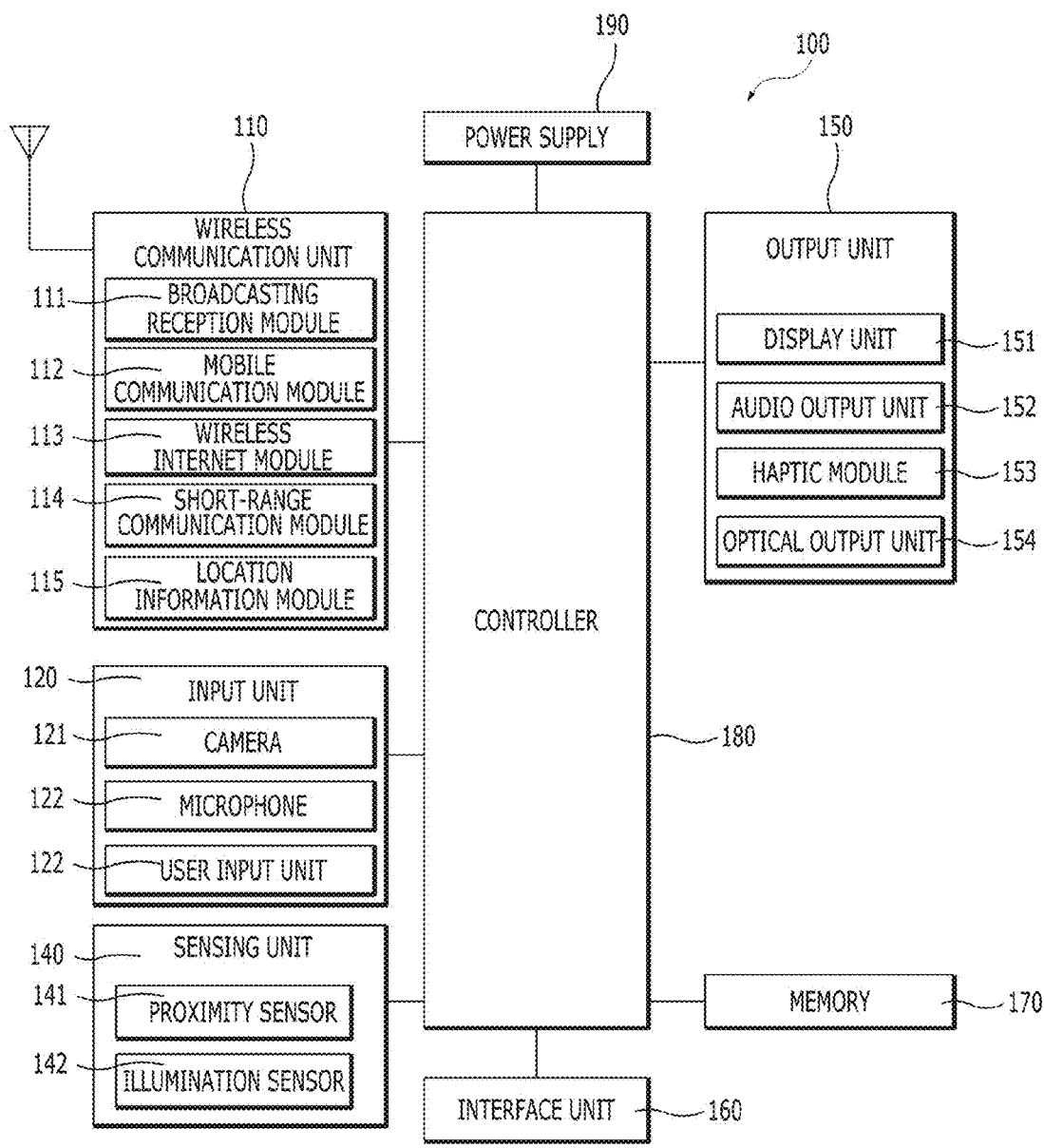
FIG. 4 illustrates another mobile terminal according to an embodiment of the present invention.

FIG. 4 is a block diagram of another mobile terminal according to an embodiment of the present invention. A mobile terminal 100 illustrated in FIG. 4 includes the above-described components of the mobile terminal 10 illustrated in FIG. 3, with the same functions.

Referring to FIG. 4, the mobile terminal 100 may include a wireless communication unit 110, an input unit 120, a sensing unit 140, an output unit 150, an interface unit 160, a memory 17, a controller 18, and a power supply 190. The components illustrated in FIG. 4 are not mandatory to implement the mobile terminal 100. Accordingly, the mobile terminal 100 may include more or fewer than the above components.

More specifically, the wireless communication unit 110 may include at least one module that enables wireless communication between the mobile terminal 100 and a wireless communication system, between the mobile terminal 100 and another mobile terminal 100, or between the mobile terminal and an external server. The wireless communication unit 110 may also include at least one module that connects the mobile terminal 100 to one or more networks.

The wireless communication unit 110 may include at least one of a broadcasting reception module 111, a mobile communication module 113, a wireless Internet module 113, a short-range communication module 114, and a location information module 115. The input unit 120 may include a camera 121 or a video input unit for inputting a video signal, a microphone 122 or an audio input unit for inputting an audio signal, and a user input unit 123 for receiving information from a user (e.g., a touch key, a mechanical key, etc.). Voice data or image data collected by the input unit 120 may be analyzed and processed as a control command of a user.

The sensing unit 140 may include one or more sensors for sensing at least one of internal information about the mobile terminal 100, information about an ambient environment of the mobile terminal 100, or user information. For example, the sensing unit 140 may include at least one of a proximity sensor 141, an illumination sensor 142, a touch sensor, an acceleration sensor, a magnetic sensor, a gravity sensor, a gyroscope sensor, a motion sensor, a Red, Green, Blue (RGB) sensor, an IR sensor, a finger scan sensor, an ultrasonic sensor, an optical sensor (e.g., the camera 121), the microphone 122, a battery gauge, an environment sensor (e.g., a barometer, a humidity meter, a thermometer, a radioactivity sensor, a gas sensor, etc.), or a chemical sensor (e.g., an electronic nose, a health care sensor, a biometric sensor, etc.). The mobile terminal disclosed in the specification may use information sensed by at least two of the above sensors, in combination.

The output unit 150 is configured to generate an output related to vision, hearing, or tactile sensation. The output unit 150 may include at least one of a display unit 151, an audio output unit 152, a haptic module 153, or an optical output unit 154. The display unit 151 and a touch sensor may be stacked in layers or incorporated, thus forming a touch screen. The touch screen may serve as at once the user input unit 123 to provide an input interface and an output interface between the user and the mobile terminal 100.

The interface unit 160 functions as a path to various types of external devices connected to the mobile terminal 100. The interface unit 160 may include at least one of a wired/wireless headset port, an external charger port, a wired/wireless data port, a memory card port, a port that connects to a device having an identification module, an audio Input/Output (I/O) port, a video I/O port, or an earphone port. The mobile terminal 100 may perform appropriate control on an external device connected to the mobile terminal 100 via the interface unit 160.

The memory 170 may store a plurality of application programs or applications executed by the mobile terminal 100 and data and commands required for operations of the mobile terminal 100. At least a part of these application programs may be downloaded from an external server by wireless communication. At least another part of the application programs may be installed in the mobile terminal 100 when the mobile terminal 100 is released, in order to provide basic functions (e.g., call termination, call origination, message reception, message transmission, etc.). The application programs may be stored in the memory 170, installed in the mobile terminal 100, and executed to perform an operation (function) of the mobile terminal 100 under the control of the controller 180.

In addition to operations related to the application programs, the controller 180 generally provides overall control to the mobile terminal 100. The controller 180 can provide or process appropriate information or an appropriate function to the user by processing a signal, data, information, etc. input or output through the afore-described components or executing an application program stored in the memory 170.

The controller 180 can control at least a part of the components described above with reference to FIG. 4 in order to execute an application program stored in the memory 170. Further, the controller 180 can operate at least two of the components included in the mobile terminal 100 in combination to execute the application program.

The power supply 190 receives external power or internal power and supplies the power to each component of the mobile terminal 100 under the control of the controller 180. The power supply 190 includes a battery which may be a built-in battery or a replaceable battery.

At least a part of the above components may cooperate with each other to implement an operation of the mobile terminal, to control the mobile terminal, or to perform a control method of the mobile terminal according to various embodiments of the present invention as described below. The operation, control, or control method of the mobile terminal may be implemented by executing at least one application program stored in the memory 170.

Now, a detailed description will be given of the foregoing components to describe various embodiments implemented by the mobile terminal 100 with reference to FIG. 4. The wireless communication unit 110 will first be described. The broadcasting reception module 111 of the wireless communication unit 110 receives a broadcast signal and/or broadcasting information from an external broadcasting management server on a broadcast channel. The broadcast channel may include a satellite channel and a terrestrial channel. Two or more broadcasting reception modules may be provided to the mobile terminal 100, for simultaneous broadcasting reception on at least two broadcast channels or switching between the broadcasting channels.

The mobile communication module 112 transmits and receives wireless signals to and from at least one of a Base Station (BS), an external terminal, or a server over a mobile communication network complying with a mobile communication standard or scheme (e.g., Global System for Mobile communication (GSM), Code Division Multiple Access (CDMA), CDMA2000, Enhanced Voice Data Optimized or Enhanced Voice Data Only (EV-DO), Wideband CDMA (WCDMA), HSDPA, HSUPA, LTE, LTE-A, etc.).

The wireless signals may include various types of data during transmission and reception of a voice call signal, a video call signal, or a text/multimedia message. The wireless Internet module 113 is a module for providing wireless Internet connectivity. The wireless Internet module 113 may be built inside or outside the mobile terminal 100. The wireless Internet module 113 is configured to transmit and receive wireless signals over a communication network complying with a wireless Internet technology.

The wireless Internet technology may be, for example, WLAN, Wi-Fi, Wi-Fi Direct, DLNA, WiBro, WiMAX, HSDPA, HSUPA, LTE, LTE-A, etc. The wireless Internet module 113 transmits and receives data in compliance with at least one wireless Internet technology from a range of Internet technologies including those other than described above.

The wireless Internet module 113 that provides wireless Internet connectivity through a mobile communication network may be regarded as a kind of mobile communication module 112 in the sense that wireless Internet connectivity based on WiBro, HSDPA, HSUPA, GSM, CDMA, WCDMA, LTE, LTE-A, etc. is provided through the mobile communication network.

The short-range communication module 114 is used for short-range communication. The short-range communication module 114 may support short-range communication using at least one of Bluetooth, RFID, IrDA, UWB, ZigBee, NFC, Wi-Fi, Wi-Fi Direct, or Wireless USB. The short-range communication module 114 may support wireless communication between the mobile terminal 100 and a wireless communication system, between the mobile terminal 100 and another mobile terminal 100, or between the mobile terminal 100 and a network in which another mobile terminal 100 (or an external server) resides, through a short-range wireless communication network. The short-range wireless communication network may be a short-range wireless personal area network. Particularly, the mobile terminal 100 may determine its location by communicating with the reference devices 30 through the short-range communication module 114.

The other mobile terminal 100 may be a wearable device (e.g., a smartwatch, smart glasses, or an HMD) that may exchange data with the mobile terminal 100 (or interwork with the mobile terminal 100) according to an embodiment of the present invention. The short-range communication module 114 may sense (or recognize) a wearable device that may communicate with the mobile terminal 100 in the vicinity of the mobile terminal 100. Further, if the sensed wearable device is authorized to communicate with the mobile terminal 100 of the present invention, the controller 180 can transmit at least a part of data processed in the mobile terminal 100 to the wearable device through the short-range communication module 114. Accordingly, a user of the wearable device may use the data processed in the mobile terminal 100 through the wearable device. For example, in the event of an incoming call to the mobile terminal 100, the user can answer the call through the wearable device. Or when the mobile terminal 100 receives a message, the user can read the received message on the wearable device.

The location information module 115 is a module used to determine the location (or current location) of the mobile terminal 100. A major example of the location information module 115 is a GPS module or a Wi-Fi module. For example, if the mobile terminal 100 uses a GPS module, the mobile terminal 100 may determine its location using a signal received from a GPS satellite. In another example, if the mobile terminal 100 uses a Wi-Fi module, the mobile terminal 100 may determine its location based on information of a wireless AP that transmits or receives a signal to or from the Wi-Fi module. Alternatively or additionally, the location information module 115 may perform the function of any other module of the wireless communication unit 110 to obtain data about the location of the mobile terminal 100, when needed. The location information module 115, which is used to determine the location (or current location) of the mobile terminal 100, is not limited to a module that directly calculates or determines the location of the mobile terminal.

The input unit 120 is used to receive video information (or a video signal), audio information (or an audio signal), or user-input information. To receive video information, the mobile terminal 100 may include one or more cameras 121. A camera 121 processes a still image or a video obtained by an image sensor in a video call mode or a capturing mode. A processed video frame may be displayed on the display unit 151. A plurality of cameras 121 may be arranged in a matrix in the mobile terminal 100. A plurality of pieces of video information having various angles or focuses may be input to the mobile terminal 100 through the matrix of the cameras 121. The cameras 121 may be arranged in a stereo structure to acquire left and right images that are combined into a 3D image.

The microphone 122 processes an external audio signal to electrical voice data. The processed voice data may be used in various manners according to an ongoing function (or application) in the mobile terminal 100. The microphone 122 may implement various noise cancellation algorithms to remove noise generated during reception of an external audio signal.

The user input unit 123 is used to receive information from a user. Upon receipt of information through the user input unit 123, the controller 180 can control an operation of the mobile terminal 100 according to the input information. This user input unit 123 may include a mechanical input means (or mechanical keys, for example, buttons disposed on the front, rear, or side surface of the mobile terminal 100, a dome switch, a jog wheel, a jog switch, etc.) and a touch input means. For example, the touch input means may include a virtual key, a soft key, or a visual key that is displayed on a touch screen, for software processing, or may include a touch key disposed outside the touch screen. The virtual key or the visual key may be displayed on the touch screen in various forms, for example, a graphic image, text, an icon, a video, or a combination of them.

The sensing unit 140 senses at least one of internal information about the mobile terminal 100, information about an ambient environment of the mobile terminal 100, or user information and generates a signal corresponding to the sensed information. The controller 180 can operate or control an operation of the mobile terminal 100, or may process data related to an application program installed in the mobile terminal 100 or perform a function or operation related to the application program. Some of various sensors that may be included in the sensing unit 140 will be described in detail.

The proximity sensor 141 is a sensor that detects the presence or absence of an object approaching a predetermined detection plane or an object in its vicinity by force of an electronic field or IR light without mechanical contact. The proximity sensor 141 may be disposed inside the mobile terminal 100 covered by the afore-described touch screen or in the vicinity of the touch screen.

The proximity sensor 141 may be, for example, a transmissive opto-electrical sensor, a direct reflective opto-electrical sensor, a mirror reflective opto-electrical sensor, a Radio Frequency (RF) oscillation-type proximity sensor, a capacitive proximity sensor, a magnetic proximity sensor, or an IR proximity sensor. If the touch screen is a capacitive type, the proximity sensor 141 may be configured to detect the presence of a nearby conductive object by a change in an electrical field caused by the approaching object. In this instance, the touch screen (or touch sensor) may be classified as a proximity sensor.

For the convenience of description, an action of advancing an object toward the touch screen without contacting the touch screen so that the disposition of the object above the touch screen may be recognized is referred to as "proximity touch", whereas an action of bringing an object into contact with the touch screen is referred to as "contact touch". The disposition of the object above the touch screen means that the object is disposed at a position vertically above the touch screen, when the object makes a "proximity touch". The proximity sensor 141 may sense a proximity touch and a proximity touch pattern (e.g., a proximity touch distance, a proximity touch direction, a proximity touch speed, a proximity touch time, a proximity touch position, a proximity touch movement state, etc.). As described before, the controller 180 can process data (or information) corresponding to the sensed proximity touch and proximity touch pattern and may further output visual information corresponding to the processed data on the touch screen. The controller 180 can control the mobile terminal 100 to perform different operations or process different data (or information) depending on whether a touch at the same position of the touch screen is a proximity touch or a contact touch.

The touch sensor senses a touch (or touch input) on the touch screen (or the display unit 151) using at least one of a resistive scheme, a capacitive scheme, an IR scheme, an ultrasonic scheme, or a magnetic scheme. For example, the touch sensor may be configured to convert a variation in pressure applied to a specific part of the touch screen or capacitance generated at the specific part of the touch screen to an electrical input signal. The touch sensor may be configured to detect the touch position, touch area, touch pressure, and touch capacitance of a touched object on the touch screen. The touched object is an object touching the touch sensor, for example, a finger, a touch pen, a stylus pen, a pointer, etc.

If the touch sensor senses a touch input, the touch sensor transmits a signal (or signals) corresponding to the sensed touch input to a touch controller. The touch controller processes the signal(s) and transmits the processed signal(s) to the controller 180. Thus, the controller 180 can determine a touched area of the display unit 151. The touch controller may be configured separately from the controller 180 or incorporated into the controller 180.

The controller 180 can perform the same or different control operations according to the types of objects touching the touch screen (or a touch key disposed outside the touch screen). The controller 180 can determine whether to perform a different or the same control operation according to the type of a touched object according to the current operation state of the mobile terminal 100 or an ongoing application in the mobile terminal 100.

The above-described touch sensor and proximity sensor may sense, independently or in combination, various types of touches such as a short (or tap) touch, a long touch, a multi-touch, a drag touch, a flick touch, a pinch-in touch, a pinch-out touch, a swipe touch, a hovering touch, etc. on the touch screen.

The ultrasonic sensor may sense location information about a touched object using ultrasonic waves. The controller 180 can calculate the location of a wave generation source based on information sensed by means of an optical sensor and a plurality of ultrasonic sensors. The location of the wave generation source may be calculated relying on the property that light is much faster than ultrasonic waves, that is, the arrival time of light to the optical sensor is much shorter than that of ultrasonic waves to the ultrasonic sensor. More specifically, the location of the wave generation source may be calculated based on the difference between the arrival time of ultrasonic waves and the arrival time of light used as a reference signal.

The camera 121, which has been described as a component of the input unit 120, includes at least one of a camera sensor (e.g., a Charge Coupled Device (CCD) sensor, a Complementary Metal Oxide Semiconductor (CMOS) sensor, etc.), a photo sensor (or an image sensor), or a laser sensor. The camera 121 and the laser sensor may sense a touch of an object on a 3D image, in combination. The photo sensor may be stacked on a display device. This photo sensor is configured to scan a motion of an object near to the touch screen. More specifically, the photo sensor includes photo diodes and Transistors (TRs) in columns and rows and scans an object placed on the photo sensor using an electrical signal that varies with the amount of light incident on a photo diode. That is, the photo sensor may calculate the coordinates of the touched object according to a variation of light and acquire location information about the touched object using the calculated coordinates.

The display unit 151 displays (outputs) information processed in the mobile terminal 100. For example, the display unit 151 may display information about an execution screen of an application program executed in the mobile terminal 100 or UI or GUI information related to the execution screen information. The display unit 151 may be configured as a 3D display that displays 3D images. The 3D display may adopt a 3D display scheme such as stereoscopy (a glasses scheme), auto stereoscopy (a glasses-free scheme), projection (a holographic scheme), etc.

The audio output unit 152 may output audio data received from the wireless communication unit 110 or stored in the memory 170 during reception of a call signal or in a call mode, a recording mode, a voice recognition mode, or a broadcasting reception mode. The audio output unit 152 outputs an audio signal related to a function performed in the mobile terminal 100 (e.g., a call incoming sound, a message incoming sound, etc.). The audio output unit 152 may include a receiver, a speaker, a buzzer, etc.

The haptic module 153 generates various haptic effects that may be felt by the user. A major example of the haptic effects generated by the haptic module 153 may be vibration. The strength and pattern of vibrations generated from the haptic module 153 may be controlled according to a user selection or a setting of the controller 180. For example, the haptic module 153 may output different vibrations in combination or sequentially.

In addition to vibrations, the haptic module 153 may generate various haptic effects including effects brought about by a pin array that move vertically onto a contact skin surface, the spray force or suction force of air through a spray or suction hole, a stimulus such as graze against a skin surface, an electrode contact, or a static electric force, or reproduction of cooling/warming by a heat-absorbing or heat-emitting device.

The haptic module 153 may be configured to enable a user to feel a tactile effect through muscular sensation of a finger or an arm as well as to provide a haptic effect by direct contact. The mobile terminal 100 may include two or more haptic modules 153 depending on the specification of the mobile terminal 100. The optical output unit 154 outputs a signal indicating occurrence of an event by light emitted from a light source. Events that occur in the mobile terminal 100 may include, for example, message reception, call signal reception, missing calls, alarm, schedule notification, email reception, information reception by an application, etc.

The optical output unit 154 outputs a signal by illuminating light of one or more colors toward the front or rear of the mobile terminal 100. The signal output may end when the mobile terminal 100 determines that the user has confirmed an event.

The interface unit 160 functions as a path to all external devices connected to the mobile terminal 100. The interface unit 160 receives data from an external device, receives power and supplies the power to each component of the mobile terminal 100, or transmits data inside the mobile terminal 100 to an external device. For example, the interface unit 160 may include at least one of a wired/wireless headset port, an external charger port, a wired/wireless data port, a memory card port, a port that connects to a device having an identification module, an audio I/O port, a video I/O port, or an earphone port.

The identification module is a chip that stores various types of information needed to authenticate the use authority of the mobile terminal 100. The identification module may include a User Identity Module (UIM), a Subscriber Identity Module (SIM), a Universal Subscriber Identity Module (USIM), etc. A device equipped with an identification module (hereinafter, referred to as an 'identification device') may be fabricated as a smart card. Accordingly, the identification device may be connected to the mobile terminal 100 via the interface unit 160.

When the mobile terminal 100 is connected to an external cradle, the interface unit 160 may be a path through which power is supplied from the cradle to the mobile terminal 100 or various user-input command signals are transmitted from the cradle to the mobile terminal 100. A command signal or power received from the cradle may be used as a signal indicating positioning of the mobile terminal 100 in place on the cradle.

The memory 170 may store a program for an operation of the controller 180 and may temporarily store input/output data (e.g., a phone book, a message, a still image, a video, etc.). The memory 170 may store data about various patterns of vibrations and sounds that are output when a touch input is applied to the touch screen. The memory 170 may include at least one of storage medium types including a flash memory type, a hard disk type, an SSD type, a multimedia card micro type, a card-type memory (e.g., an SD or XD memory), a RAM, an SRAM, a ROM, an EEPROM, a PROM, a magnetic memory, a magnetic disk, and an optical disk. The mobile terminal 100 may operate in conjunction with a Web storage that performs the storage functionality of the memory 170 on the Internet.

As described before, the controller 180 generally controls an operation related to an application program and provides overall control to the operations of the mobile terminal 100. For example, if the state of the mobile terminal 100 satisfies a predetermined condition, the controller 180 can lock the mobile terminal 100 to restrict input of a control command for applications from the user or unlock the mobile terminal 100.

In addition, the controller 180 can perform a control operation or a process regarding a voice call, data communication, a video call, etc. or may perform a pattern recognition process to recognize a handwriting input or a drawing input applied to on the touch screen as text and an image, respectively. Further, the controller 180 can control one or more of the foregoing components in combination in order to implement various embodiments described below in the mobile terminal 100 of the present invention.

The power supply 190 receives external power or internal power and supplies power needed to operate each component under the control of the controller 190. The power supply 190 includes a battery. The battery may be a built-in battery that charges the mobile terminal 100 or may be detachably attached to a terminal body, for charging, etc.

The power supply 190 may include a connection port. For charging the battery, the connection port may be, for example, the interface 160 electrically connected to an external charger that supplies power. In another example, the power supply 190 may charge the battery wirelessly without using the connection port. In this instance, the power supply 190 may receive power from an external wireless power transfer device by at least one of inductive coupling based on magnetic induction or magnetic resonance coupling based on electro-magnetic resonance.

Figure 5:
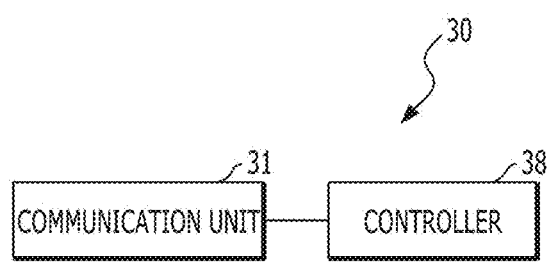
FIG. 5 illustrates an reference device according to an embodiment of the present invention.

FIG. 5 is a block diagram of a reference device 30 according to an embodiment of the present invention. Referring to FIG. 5, the reference device 30 of the present invention includes a communication unit 31 and a controller 38. The components illustrated in FIG. 5 are mandatory to implement the present invention. It is to be clearly understood that the reference device 30 described in the specification may include more than the above components. The reference device 30 of the present invention may be combined with a device such as a light, a fire sensor, a home appliance, or the like.

The communication unit 31 includes a short-range communication module. The short-range communication module may support short-range communication using at least one of Bluetooth, RFID, IrDA, UWB, ZigBee, NFC, Wi-Fi, Wi-Fi Direct, or Wireless USB. The short-range communication module may support wireless communication between the reference device 30 and the mobile terminal 10, between the reference device 30 and the electronic device 50, between reference devices 30, or between the reference device 30 and a network in which the server 70 resides, through a short-range wireless communication network. The controller 38 controls communication between the communication unit 31 and the mobile terminal 10, between the communication unit 31 and the electronic device 50, and between the communication unit 31 and the server 70.

Figure 6:
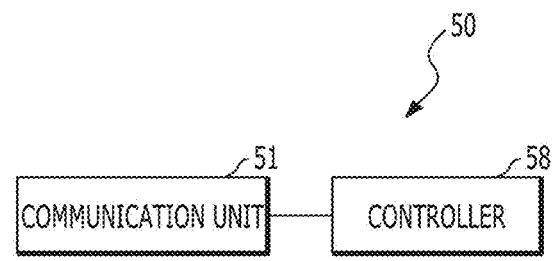
FIG. 6 illustrates an electronic device according to an embodiment of the present invention.

FIG. 6 is a block diagram of an electronic device 50 according to an embodiment of the present invention. Referring to FIG. 6, the electronic device 50 of the present invention includes a communication unit 51 and a controller 58. The components illustrated in FIG. 6 are mandatory to implement the present invention. It is to be clearly understood that the electronic device 50 described in the specification may include more than the above components.

The communication unit 51 may include at least one of a short-range communication module, a wired communication module, or a location information module. The short-range communication module is used for short-range communication. The short-range communication module may support short-range communication using at least one of Bluetooth, RFID, IrDA, UWB, ZigBee, NFC, Wi-Fi, Wi-Fi Direct, or Wireless USB. The short-range communication module may support wireless communication between the electronic device 50 and reference devices 30, between the electronic device 50 and the mobile terminal 10, or between the electronic device 50 and the network in which the server 70 resides, through a short-range wireless communication network. The short-range wireless communication network may be a short-range wireless personal area network. Particularly, the electronic device 50 may determine its location by communicating with the reference devices 30 through the short-range communication module.

The location information module is a module used to determine the location (or current location) of the electronic device 50. A major example of the location information module is a GPS module or a Wi-Fi module. For example, if the electronic device 50 uses a GPS module, the electronic device 50 may determine its location using a signal received from a GPS satellite. In another example, if the electronic device 50 uses a Wi-Fi module, the electronic device 50 may determine its location based on information of a wireless AP that transmits or receives a signal to or from the Wi-Fi module. Alternatively or additionally, the location information module may perform the function of any other module of the communication unit 51 to obtain data about the location of the electronic device 50, when needed.

The controller 58 generally provides overall control to the electronic device 50. The controller 58 may control the communication unit 51 to process an input/output signal, data, information, etc. or to communicate with the mobile terminal 10 or the reference devices 30. The controller 58 may compare location information about the electronic device 50 received from the mobile terminal 10 or the server 70 with a location of the electronic device 50 measured by the electronic device 50 and respond to the mobile terminal 10 or the server 70 according to a comparison result.

Now, a description will be given of embodiments of a control method that may be implemented in the above-described control system with reference to the attached drawings. Those skilled in the art will appreciate that the present invention may be practiced in other ways within the scope and spirit of the present invention.

Figure 7:
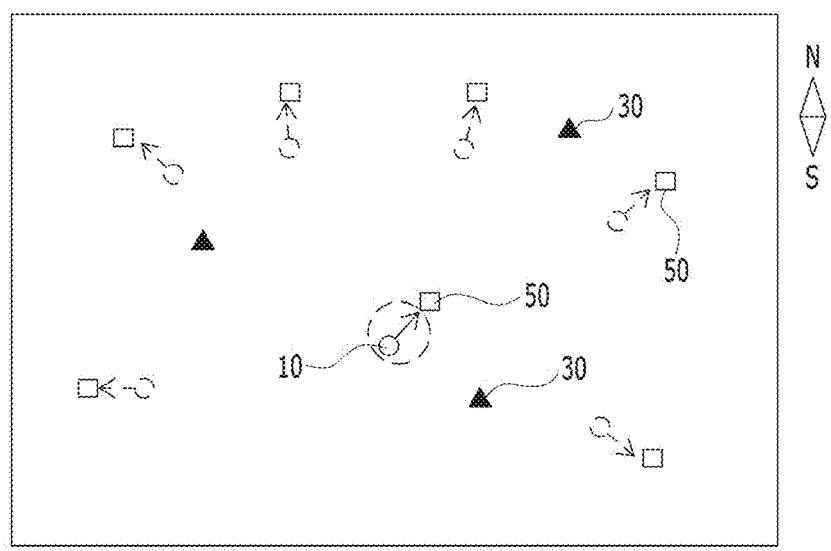
FIGS. 7, 8, and 9 illustrate an method for controlling a system according to an embodiment of the present invention.
Figure 8:
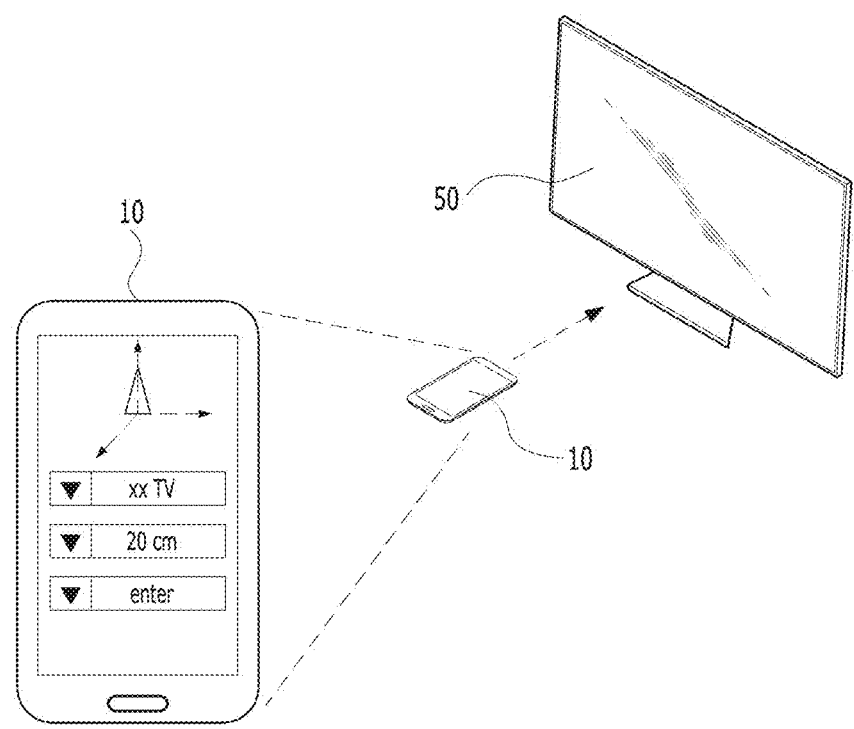
Figure 9:
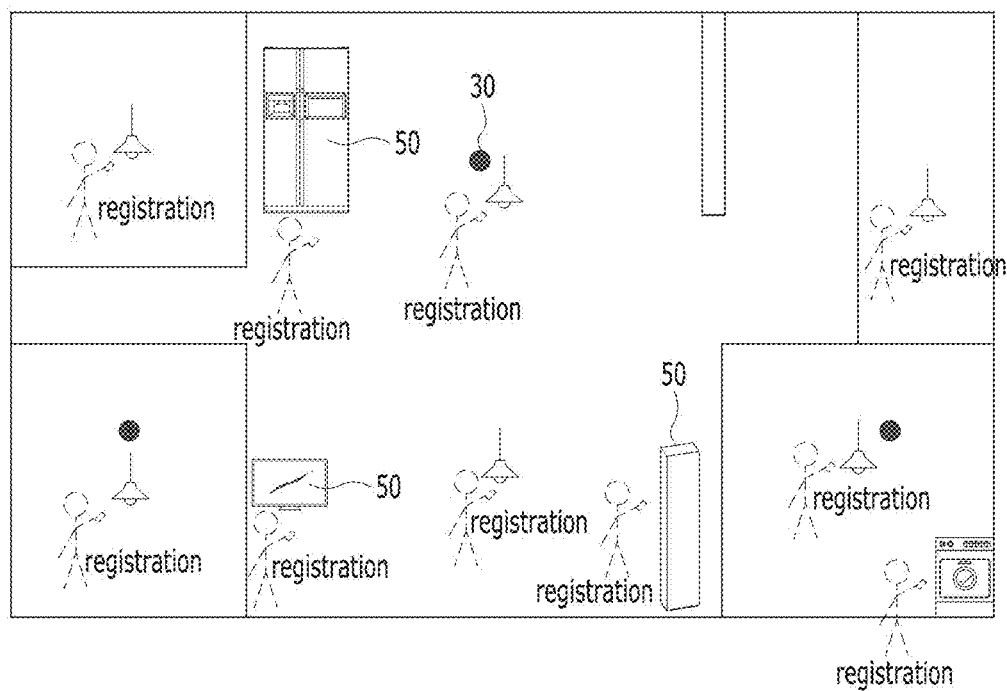

FIGS. 7, 8, and 9 are views illustrating a method for registering one or more electronic devices 50 and generating a map of the electronic devices 50. With a remote control application, which is used to register the locations of electronic devices 50 and control the electronic devices 50, executed in the mobile terminal 10, the user moves the mobile terminal 10 to the vicinity of an electronic device 50 located indoors as illustrated in FIG. 7. Preferably, the mobile terminal 10 moves toward the electronic device 50 so that the distance between the mobile terminal 10 and the electronic device 50 may be smaller than a predetermined maximum allowed distance. The predetermined maximum allowed distance between the mobile terminal 10 and the electronic device 50 may be set/changed by the user. For this purpose, the controller 18 can provide a UI through which the maximum allowed distance is set/changed on the display unit 15, as illustrated in FIG. 8.

Preferably, at least one of the bearing, inclination, or height of the mobile terminal 10 is adjusted to point the mobile terminal 10 toward the electronic device 50. As illustrated in FIG. 8, the top end or any other part of the mobile terminal 10 may point at the electronic device 50. When the mobile terminal 10 approaches the electronic device 50, the controller 18 can display a list of pre-registered electronic devices and other communicable/controllable electronic devices on the display unit 15. Herein, the mobile terminal 10 may list the electronic devices by identifying them by their Personal Identification Numbers (PINs) or Quick Response (QR) codes, by NFC, or by their received signal indication proximity.

When the user selects one of the electronic devices included in the list, the controller 18 measures the location of the mobile terminal 10 through short-range communication between the communication unit 11 and the reference devices 30, senses the direction of the mobile terminal 10 toward the electronic device 50 by means of the sensing unit 14, and measures the distance between the mobile terminal 10 and the electronic device 50. To measure the location of the mobile terminal 10 by triangulation, the controller 18 can measure the distance between the mobile terminal 10 and each reference device 30 using the distances among at least three reference devices 30 and the speed and frequency of short-range wireless communication waves and may measure the location of the mobile terminal 10 using the measured distances. The controller 18 can measure the location of the mobile terminal 10 in another triangulation method. A few schemes are available to measure the distance between the mobile terminal 10 and the electronic device 50. For example, the distance between the mobile terminal 10 and the electronic device 50 may be measured using the ultrasonic sensor of the sensing unit 14.

Subsequently, the controller 18 measures the actual location of the electronic device 50 using the location and direction of the mobile terminal 10 and the distance between the mobile terminal 10 and the electronic device 50. Since the direction of the mobile terminal 10 toward the electronic device 50 and the distance between the mobile terminal 10 and the electronic device 50 are measured at the current location of the mobile terminal 10, the controller 18 can measure a 3D location of the electronic device 50. That is, the location of the electronic device 50 may be represented as coordinates (i.e., 2D coordinates) and a height (high and low) in an indoor environment. Instead of the mobile terminal 10, the server 70 can measure the actual location of the electronic device 50 using the location and direction of the mobile terminal 10 and the distance between the mobile terminal 10 and the electronic device 50.

Then, the controller 18 generates location information about the electronic device 50 and transmits identification information (an Identifier (ID), etc.) of the electronic device 50 along with the generated location information to the memory 17 or the server 70. The transmitted location information and identification information about the electronic device 50 are transmitted to the memory 17 or the server 70.

As illustrated in FIG. 9, location information and identification information about each indoor electronic device are transmitted to and stored in the memory 17 or the server 70 by repeating the above operation. Then the controller 18 or the server 70 can generate a map for controlling the electronic devices using the stored location information and identification information. While a method for registering indoor electronic devices 50 has been described above with reference to FIGS. 7, 8, and 9, outdoor electronic devices may be registered in the same manner.

Figure 10:
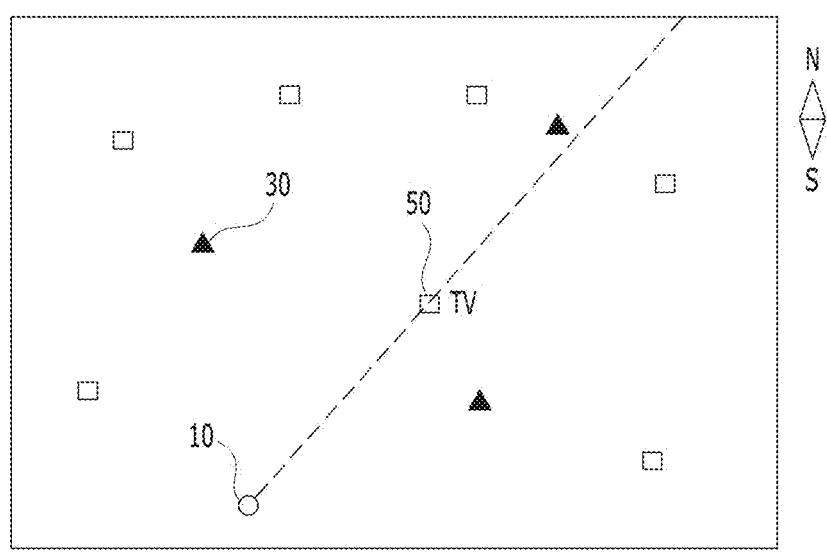
FIGS. 10 and 11 illustrate another method for controlling a system according to an embodiment of the present invention.
Figure 11:
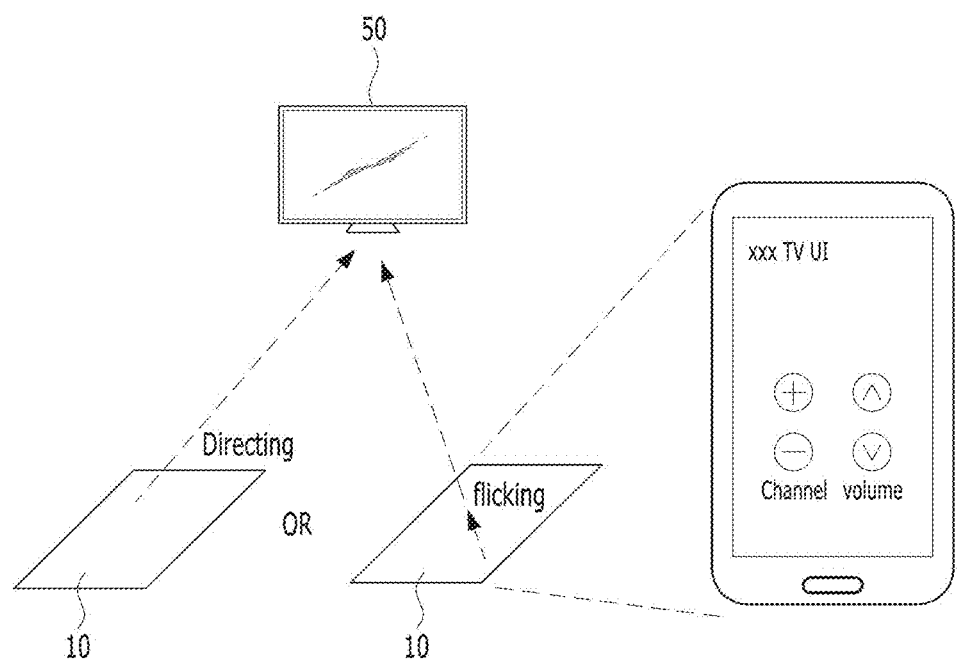

FIGS. 10 and 11 are views illustrating an control method of a control system according to an embodiment of the present invention. In a situation where the mobile terminal 10, a plurality of reference devices 30, and one or more electronic devices 50 are located indoors and a remote control application is executed in the mobile terminal 10 as illustrated in FIG. 10, if the user directs the mobile terminal 10 toward an intended electronic device 50 or applies a touch input (dragging or flicking) to the display unit 15, the controller 18 determines whether the direction of the mobile terminal 10 or the direction of the touch input matches the location of the electronic device 50 registered on a map. Herein, after determining the current location of the mobile terminal 10 and the direction of the mobile terminal 10 or the touch input at the current location of the mobile terminal 10 through wireless communication with the reference devices 30, the controller 18 determines whether the direction of the mobile terminal 10 or the touch input matches the registered location of the electronic device 50. Meanwhile, if the map is stored in the server 70, the server 70, instead of the mobile terminal 10, may determine whether the direction of the mobile terminal 10 or the touch input matches the registered location of the electronic device 50.

If the direction of the mobile terminal 10 or the touch input matches the registered location of the electronic device 50, the controller 18 selects the electronic device 50 and displays a UI for controlling the electronic device 50 on the display unit 15. For example, if the selected electronic device 50 is a TV as illustrated in FIG. 11, the controller 18 can display a UI for controlling channels or volume levels of the TV on the display unit 15. The controller 18 can control the electronic device 50 directly by outputting a control command according to a user's request or through the server 70 according to a command of the mobile terminal 10.

While a method for controlling indoor electronic devices 50 has been described above with reference to FIGS. 10 and 11, if the reference devices 30 and the electronic device 50 are located outdoors, the outdoor electronic device 50 may be controlled in the same manner.

Figure 12:
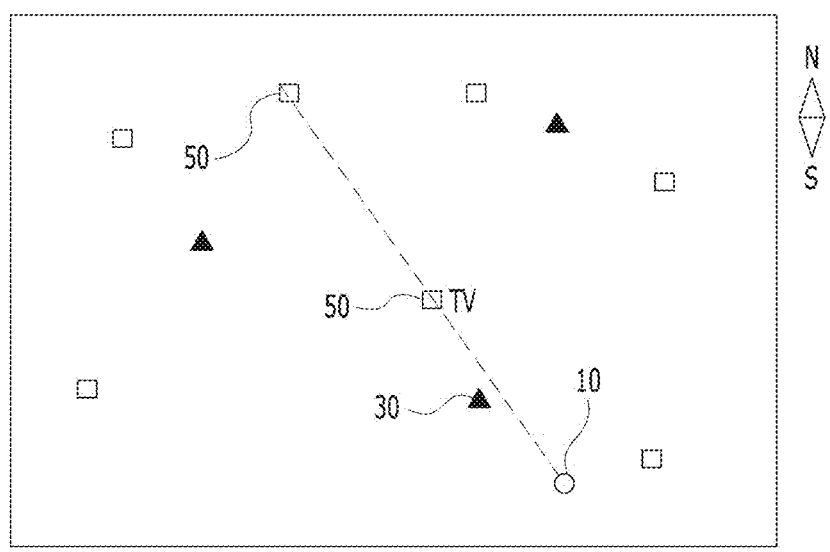
FIGS. 12, 13, and 14 illustrate another method for controlling a system according to an embodiment of the present invention.
Figure 13:
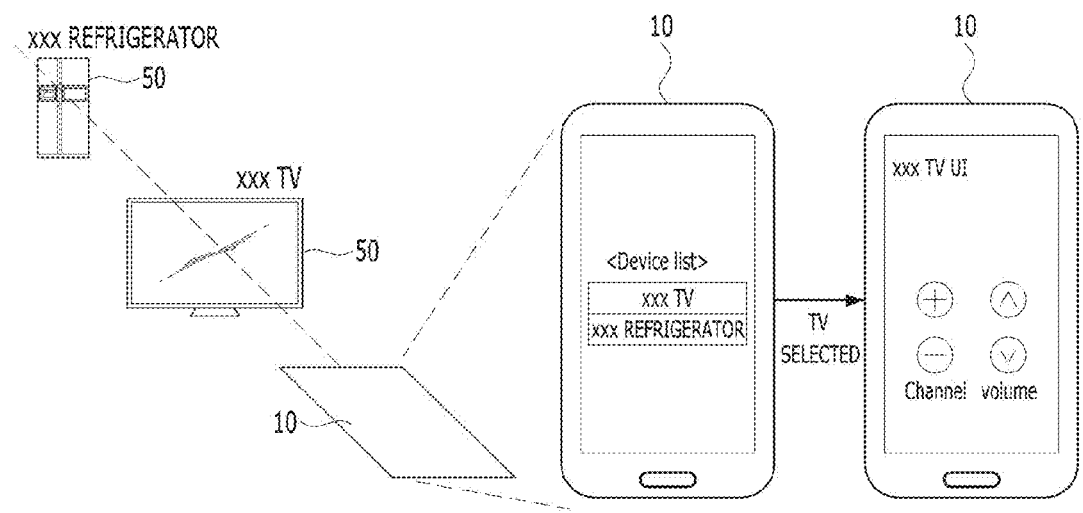
Figure 14:
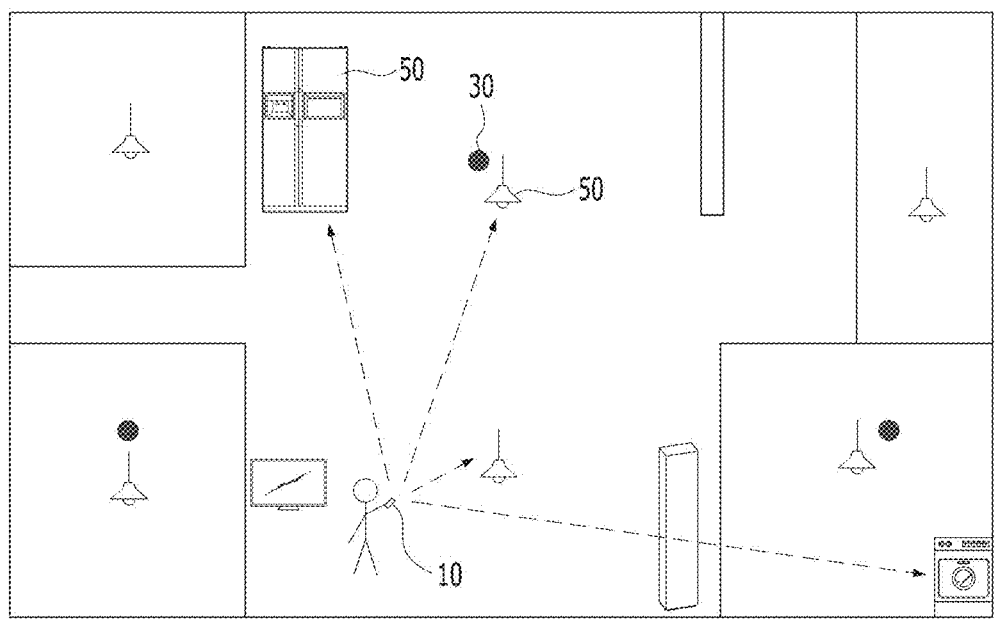

FIGS. 12, 13, and 14 are views illustrating another control method of a control system according to an embodiment of the present invention. In a situation where the mobile terminal 10, a plurality of reference devices 30, and one or more electronic devices 50 are located indoors and a remote control application is executed in the mobile terminal 10 as illustrated in FIG. 12, if the user directs the mobile terminal 10 toward an intended electronic device 50 or applies a touch input (dragging or flicking) to the display unit 15 as illustrated in FIGS. 13 and 14, the controller 18 determines whether the electronic device 50 matching the direction of the mobile terminal 10 or the touch input has been registered on a map. Herein, after determining the current location of the mobile terminal 10 and determining the direction of the mobile terminal 10 or the touch input at the current location of the mobile terminal 10, through wireless communication with the reference devices 30, the controller 18 determines whether an electronic device 50 on a virtual line drawn from the direction of the mobile terminal 10 or the touch input has been registered. Meanwhile, if the map is stored in the server 70, instead of the mobile terminal 10, the server 70 can determine whether an electronic device 50 on a straight virtual line drawn from the direction of the mobile terminal 10 or the touch input has been registered. In this instance, the server 70 can transmit identification information about the electronic device 50 located on the virtual straight line to the mobile terminal 10.

The length of the virtual straight line can be changed/set by the user. For this purpose, the controller 18 can provide a UI for setting the length of the virtual straight line. If one or more registered electronic devices 50 are located on the virtual straight line, the controller 18 displays a list of the electronic devices 50 on the display unit 15, as illustrated in FIG. 13. The list may include identification information about the electronic devices 50. The controller 18 can arrange the identification information about the electronic devices 50 in order of the distances between the mobile terminal 10 and the electronic devices 50.

If the user selects one of the electronic devices 50 based on the identification information included in the list, the controller 18 can display a UI for controlling the selected electronic device 50 on the display unit 150. For example, if the selected electronic device 50 is a TV as illustrated in FIG. 13, the controller 18 can display a UI for controlling channels or volume levels of the TV on the display unit 15. The controller 18 can control the electronic device 50 directly by outputting a control command according to a user's request or through the server 70 according to a command of the mobile terminal 10.

While a method for controlling an indoor electronic device 50 has been described above with reference to FIGS. 12, 13, and 14, if the reference devices 30 and the electronic device 50 are located outdoors, the outdoor electronic device may be controlled in the same manner.

Figure 15:
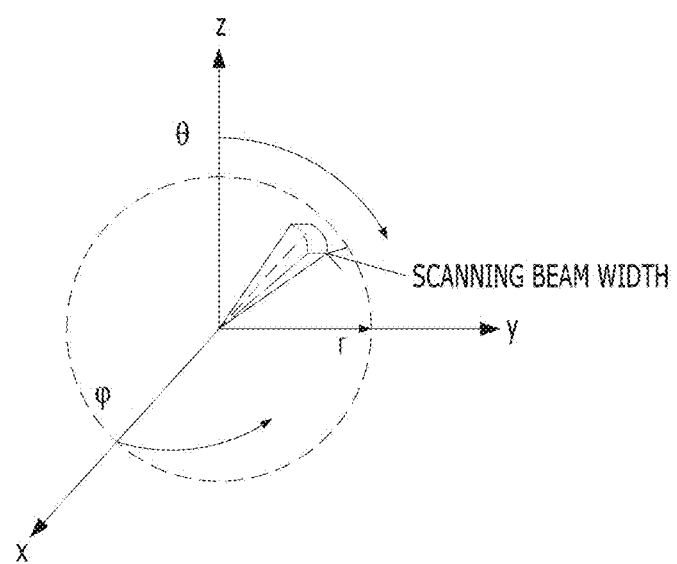
FIGS. 15, 16, and 17 illustrate another method for controlling a system according to an embodiment of the present invention.
Figure 16:
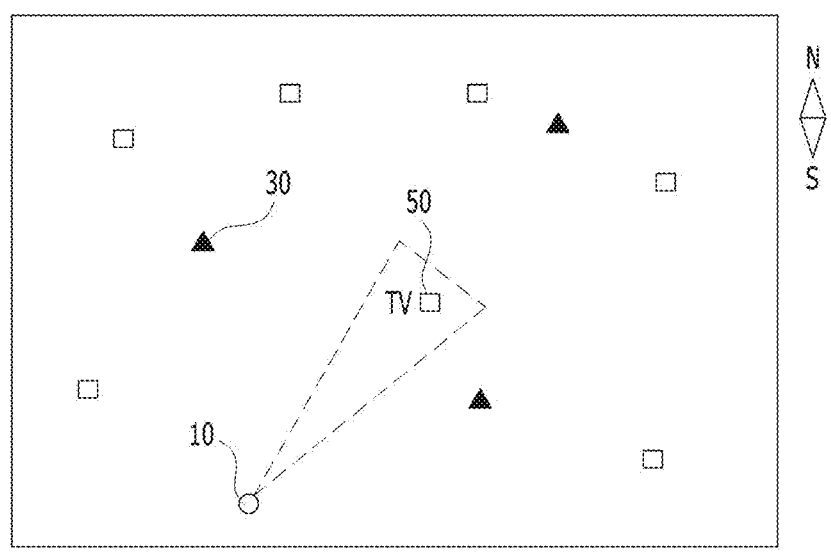
Figure 17:
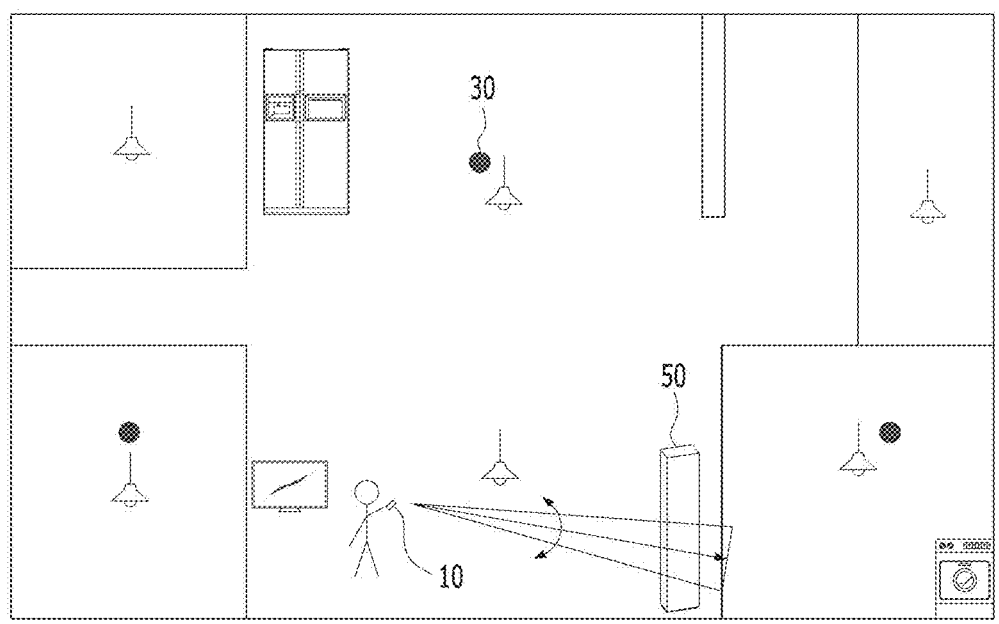

FIGS. 15, 16, and 17 are views illustrating another control method of a control system according to an embodiment of the present invention. In a situation where the mobile terminal 10, a plurality of reference devices 30, and one or more electronic devices 50 are located indoors and a remote control application is executed in the mobile terminal 10 as illustrated in FIG. 16, the user can scan for a controllable electronic device 50, while changing the direction of the mobile terminal 10 as illustrated in FIGS. 15 and 17. Herein, the width of a scanning beam illustrated in FIG. 15 can be changed/set by the user. For this purpose, the controller 18 can provide a UI for setting/changing the width of a scanning beam. The scanning beam may be configured to be cylindrical as well as radial. The scanning beam may be configured in any other shape.

The controller 18 determines whether an electronic device 50 located in the direction of the scanning beam has been registered on a map. The controller 18 determines the current location of the mobile terminal 10 through wireless communication with the reference devices 30, determines the direction and range of the scanning beam at the current location of the mobile terminal 10, and determines whether an electronic device 50 within the range of the scanning beam has been registered. If one or more registered electronic devices 50 are located within the range of the scanning beam, the controller 18 displays a list of the electronic devices 50 on the display unit 15. The list may include identification information about the electronic devices 50. The controller 18 can arrange the identification information about the electronic devices 50 in order of the distances between the mobile terminal 10 and the electronic devices 50.

If the user selects one of the electronic devices 50 using the identification information included in the list, the controller 18 can display a UI for controlling the selected electronic device 50 on the display unit 150. For example, if the selected electronic device 50 is a TV, the controller 18 can display a UI for controlling channels or volume levels of the TV on the display unit 15. The controller 18 can control the electronic device 50 directly by outputting a control command according to a user's request or through the server 70 according to a command of the mobile terminal 10.

While a method for controlling an indoor electronic device 50 has been described above with reference to FIGS. 15, 16, and 17, if the reference devices 30 and the electronic device 50 are located outdoors, the outdoor electronic device 50 may be controlled in the same manner.

Figure 18:
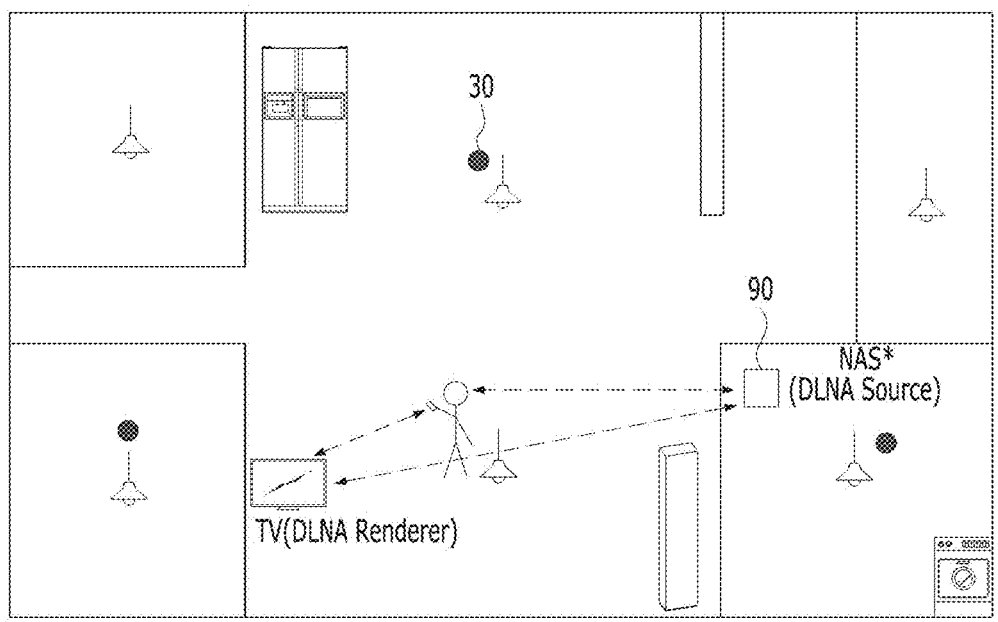
FIG. 18 illustrates another method for controlling a system according to an embodiment of the present invention.

FIG. 18 is a view illustrating another control method of a control system according to an embodiment of the present invention. Referring to FIG. 18, the control system includes the mobile terminal 10, a plurality of reference devices 30, one or more electronic devices 50, and a DLNA source. The mobile terminal 10 may be used as a DLNA control device and the electronic devices 50 may be used as Digital Media Renderers (DMRs). The DLNA source provides a protocol that enables sharing of content such as an image, music, a video, etc. using an Internet protocol using HyperText Transfer Protocol (HTTP), Real-time Transport Protocol/Real Time Streaming Protocol (RTP/RTSP), etc. in a network environment based on Wi-Fi, Ethernet, or Bluetooth as a network technology standard for media transmission and control between terminals in a home. The DLNA source may be configured as a data storage device connected to a network, such as a Network Attached Storage (NAS) or a Digital Media Server (DMS). That is, the controller 18 can register the electronic devices 50 as DMRs or DMSs as illustrated in FIGS. 7, 8, and 9 and may control the DMRs and DMSs using one of the control methods illustrated in FIGS. 10 to 17.

Figure 19:
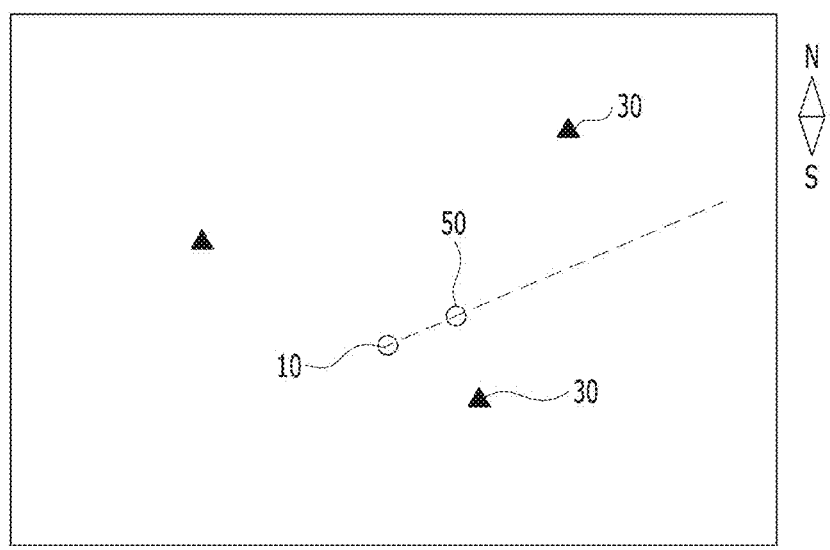
FIGS. 19 and 20 illustrate another method for controlling a system according to an embodiment of the present invention.
Figure 20:
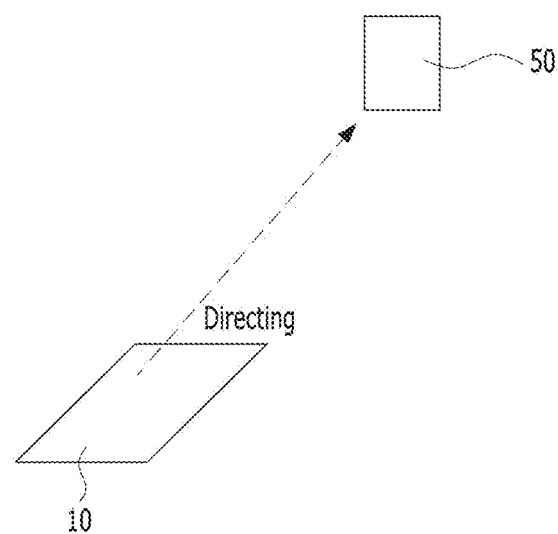

FIGS. 19 and 20 are views illustrating another control method of a control system according to an embodiment of the present invention. Referring to FIG. 19, in a situation where the mobile terminal 10, a plurality of reference devices 30, and one or more electronic devices 50 are located indoors and a remote control application is executed in the mobile terminal 10, if the user directs the mobile terminal 10 toward an intended electronic device 50 or applies a touch input (dragging or flicking) to the display unit 15 as illustrated in FIG. 20, the controller 18 reads the registered location of the electronic device 50 from the memory 170 or the server 70, or measures the current location of the electronic device 50. Herein, the controller 18 measures the current location of the electronic device 50 using the location and direction of the mobile terminal 10 and the distance between the mobile terminal 10 and the electronic device 50.

Then the controller 18 generates location information using the registered location or measured current location of the electronic device 50 and transmits the location information to the electronic device 50. The controller 18 can transmit identification information about the electronic device 50 as well as the location information to the electronic device 50.

Subsequently, the electronic device 50 compares the location information received from the controller 18 with a location of the electronic device 50 measured by wireless communication with reference devices 30 and responds to the mobile terminal 10 according to a comparison result. Herein, since the electronic device 50 has an IPS function, it can measure its location through communication with the reference devices 30.

If the received location information matches the measured location, the electronic device 50 responds to the mobile terminal 10 and performs a pairing procedure to be controlled by the mobile terminal 10. On the contrary, if the received location does not match the measured location, the electronic device 50 does not respond to the mobile terminal 10.

Figure 21:
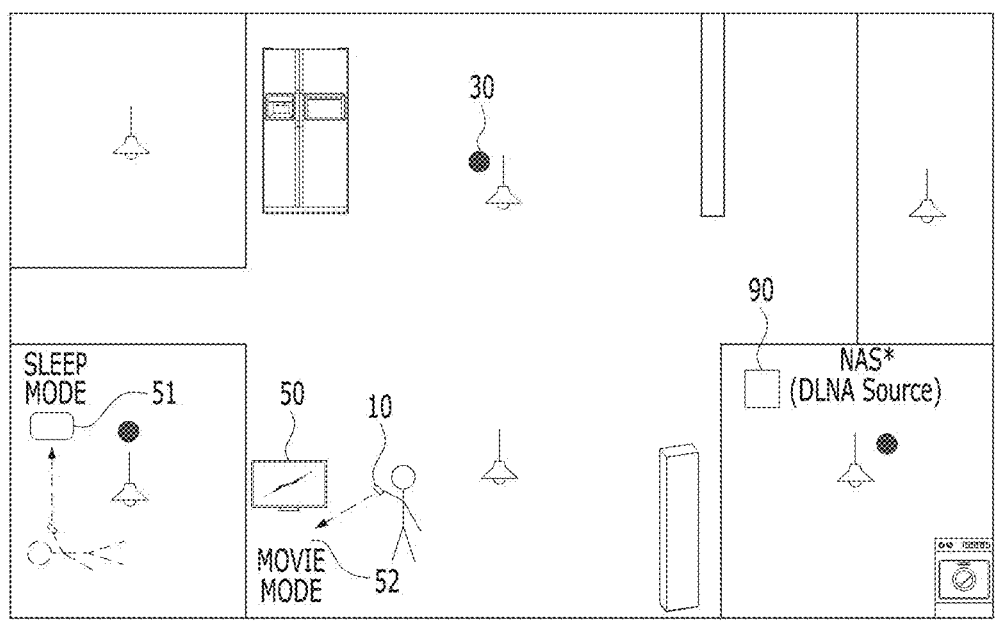
FIGS. 21 to 24 illustrate other methods for controlling a system according to an embodiment of the present invention.

FIG. 21 is a view illustrating another control method of a control system according to an embodiment of the present invention. The controller 18 can register a specific location in an indoor space in the methods illustrated in FIGS. 7, 8, and 9 and map at least one of functions of an electronic device 50 or the mobile terminal 10 to the specific location. Functions of the electronic devices 50 or the mobile terminal 10 mapped to respective locations of the indoor space may be registered on a map stored in the memory 17 or the server 70. For example, a specific location around a TV may be set as a movie mode execution location or a specific location around a light may be set as a sleep mode execution location, as illustrated in FIG. 21. In addition, a specific application (e.g., a calendar application) of the mobile terminal 10 may be mapped to a calendar located indoors. Herein, the size of the specific location registered on the map may be changed/set by the user. For this purpose, the controller 18 can provide a UI for changing/setting the size of the specific location.

Then, if the user directs the mobile terminal 10 toward a specific location of the indoor space or applies a touch input (dragging or flicking) to the display unit 15, the controller 18 executes at least one of functions of an electronic device 50 or the mobile terminal 10 mapped to the specific location that the mobile terminal 10 or the touch input points at. Herein to determine the specific location pointed by the mobile terminal 10 or the touch input, the controller 18 measures the current location of the mobile terminal 10 in the afore-described method, determines the direction of the mobile terminal 10 or the touch input at the current location of the mobile terminal, and determines the specific location pointed by the mobile terminal 10 or the touch input.

If the mobile terminal 10 or the touch input points at the specific location around the TV, the controller 18 can control the TV to execute the movie mode. If the mobile terminal 10 or the touch input points at the indoor calendar, the controller 18 can execute the calendar application of the mobile terminal 10.

Figure 22:
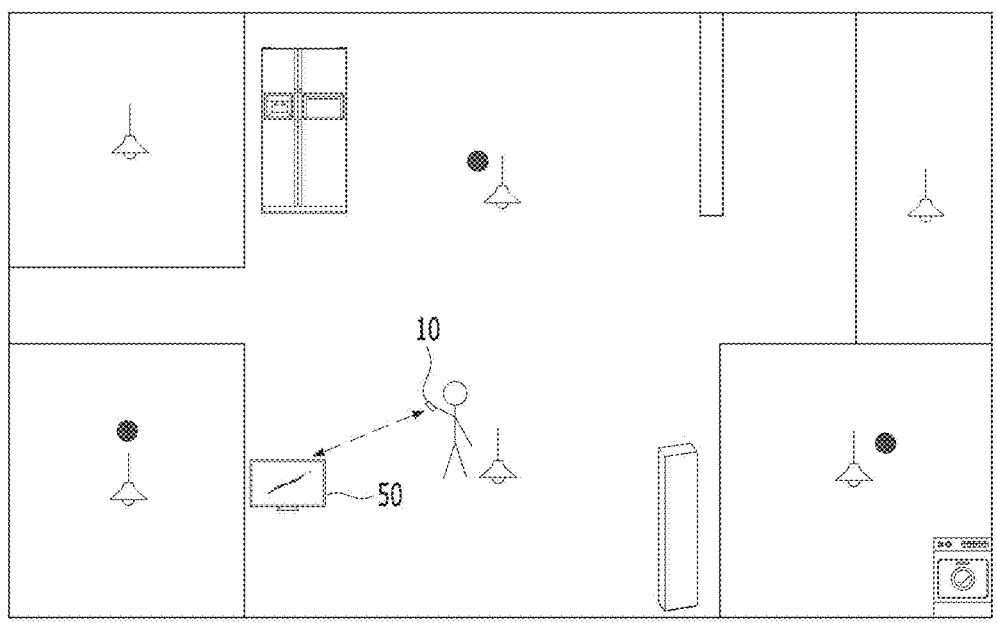

FIG. 22 is a view illustrating another control method of a control system according to an embodiment of the present invention. Referring to FIG. 22, the control system includes the mobile terminal 10, a plurality of reference devices 30, and one or more electronic devices 50 in an indoor space. The mobile terminal 10 may have a miracast function of connecting to an electronic device by Wi-Fi Direct. The electronic device 50 may have an IPS function. In this instance, the mobile terminal 10 and the electronic device 50 may be paired by Peer to Peer (P2P) pairing.

Figure 23:
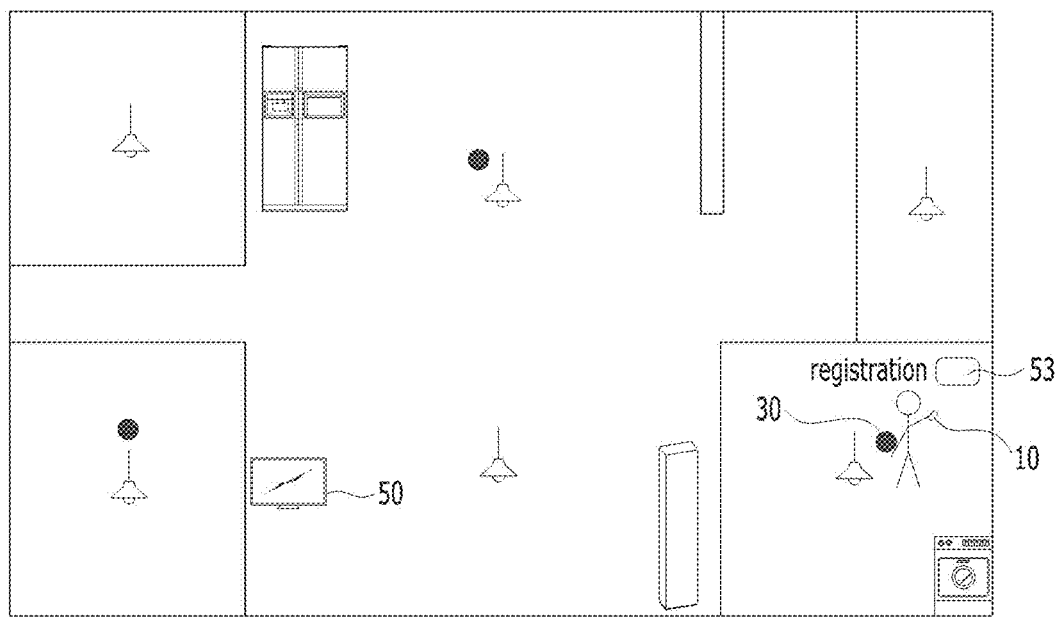

FIG. 23 is a view illustrating another control method of a control system according to an embodiment of the present invention. The controller 18 can register a specific location of an indoor space in the method illustrated in FIGS. 7, 8, and 9 and map an object that the user frequently loses to the specific location. For example, the controller 18 can measure the location of a frequently lost object 53 and register the location of the object 53 on a map stored in the memory 17 or the server 70 as illustrated in FIG. 23. If the frequently lost object 53 is input to the mobile terminal 10 later, the controller 18 indicates the specific location mapped to the object 53 to the user.

Figure 24:
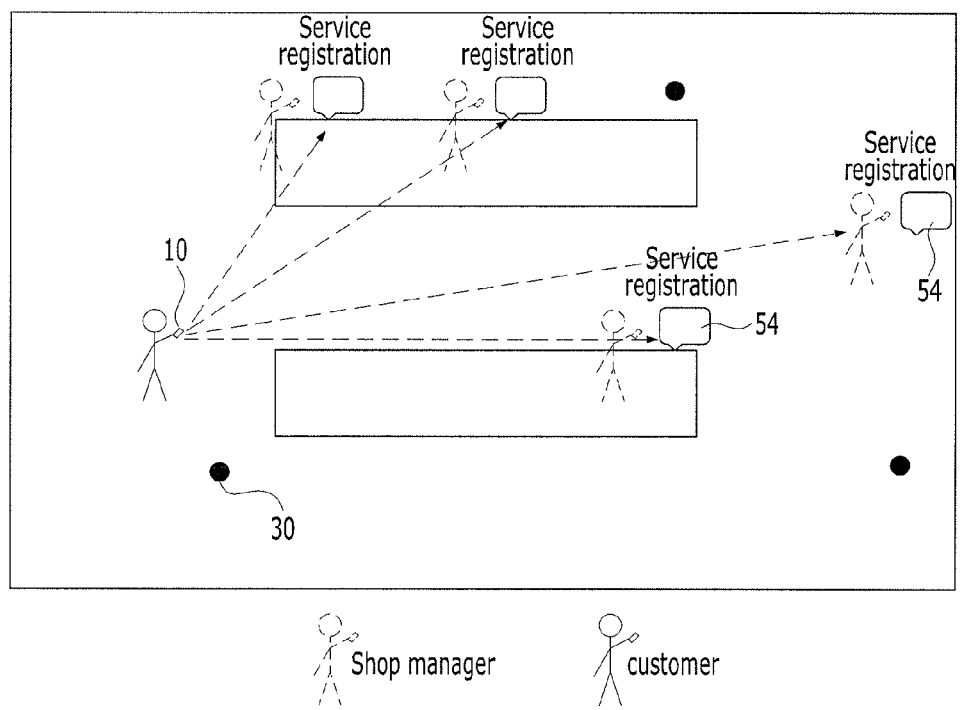

FIG. 24 is a view illustrating another control method of a control system according to an embodiment of the present invention. The controller 18 can register the location of each item in an indoor store in the method illustrated in FIGS. 7, 8, and 9. The locations of the items and information about the items may be registered on a map stored in the memory 17 or the server 70. The information about an item includes the name, price, manufacturer, manufacture date, sales/stock quantity of the item.

If the user directs the mobile terminal 10 toward the location of an item, the controller 18 displays information about the item on the display unit 15. It is also possible to display information about a plurality of items simultaneously by widening the range of a scanning beam of the mobile terminal 10.

Figure 25:
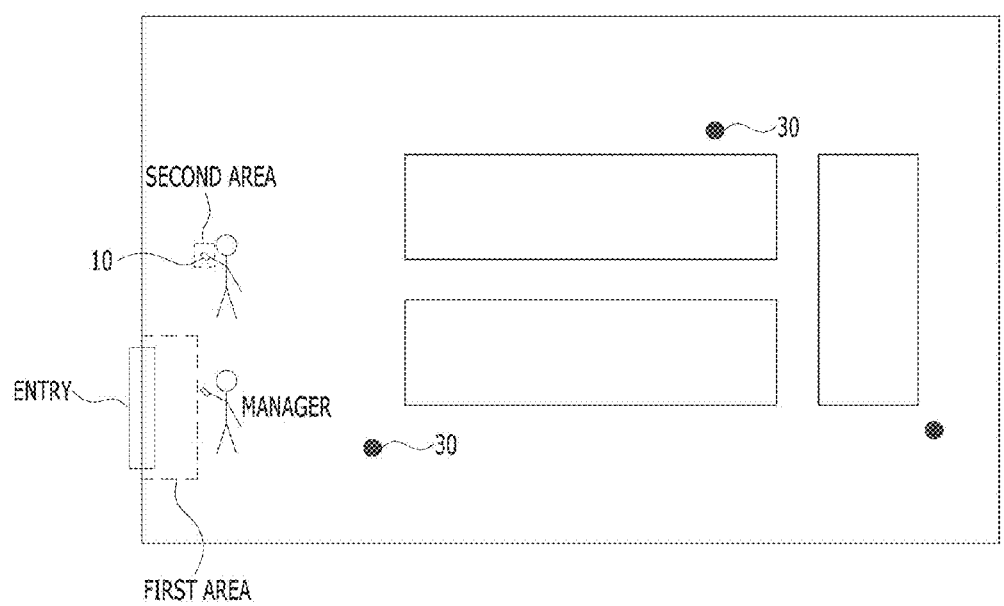
FIGS. 25 and 26 illustrate other methods for controlling a system according to an embodiment of the present invention.
Figure 26:
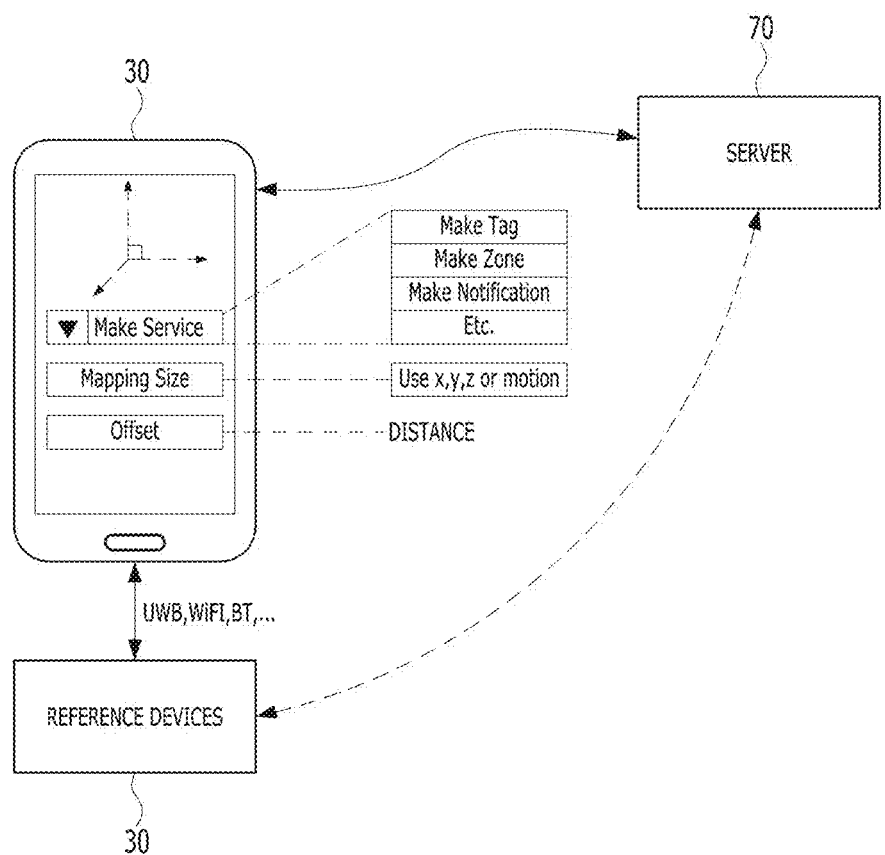

FIGS. 25 and 26 are views referred illustrating a method for registering the location of a specific indoor area and generating a map of the specific area. In a situation where the locations of specific areas (e.g., first and second areas) are registered and an application used to control the mobile terminal 10 is executed in the mobile terminal 10, a user (e.g., a host or a manager) moves the mobile terminal 10 to an indoor specific area (e.g., a conference room), as illustrated in FIG. 25. Herein, the user can set an intended indoor area as a specific area. Preferably, the user moves the mobile terminal 10 toward the specific area so that the distance between the mobile terminal 10 and the specific area may be smaller than a preset maximum allowed distance. The preset maximum allowed distance may be set/changed by the user. For this purpose, the controller 18 can provide a UI for setting/changing the maximum allowed distance on the display unit 15. Further, the controller 18 can set a virtual NFC tag for the specific area, set an intended message or data in the NFC tag, and change/set the size of the specific area upon user request. For this purpose, the controller 18 can provide a UI for setting a tag and a UI for changing/setting the size of a specific area.

It is preferred that at least one of the bearing, inclination, or height of the mobile terminal 10 is adjusted so that the mobile terminal 10 may point at a specific area to be registered. The top end or any other part of the mobile terminal 10 may point at the specific area.

Then, the controller 18 measures the location of the mobile terminal 10 by short-range wireless communication between the communication unit 11 and the reference devices 30, senses the direction of the mobile terminal 10 toward the specific area by means of the sensing unit 14, and measures the distance between the mobile terminal 10 and the specific area. To measure the location of the mobile terminal 10 by triangulation, the controller 18 can measure the distance between the mobile terminal 10 and each of at least three reference devices 30 using the distances among the reference devices 30 and the speed and frequency of short-range wireless communication waves and may measure the location of the mobile terminal 10 using the measured distances. Aside from this method, the controller 18 can measure the location of the mobile terminal 10 in another triangulation method. A few schemes are available to measure the distance between the mobile terminal 10 and the specific area. For example, the distance between the mobile terminal 10 and the specific area may be measured using the ultrasonic sensor, etc. of the sensing unit 14.

Subsequently, the controller 18 measures the actual location of the specific area using the location and direction of the mobile terminal 10 and the distance between the mobile terminal 10 and the specific area. Since the direction of the mobile terminal 10 toward the specific area and the distance between the mobile terminal 10 and the specific area are measured at the current location of the mobile terminal 10, the controller 18 can measure a 3D location of the specific area. That is, the location of the specific area may be represented as coordinates (i.e. 2D coordinates) and a height (high or low) in an indoor environment. Instead of the mobile device 10, the server 70 can measure the actual location of the specific area using the location and direction of the mobile terminal 10 and the distance between the mobile terminal 10 and the specific area.

Then, the controller 18 generates location information about the specific area and transmits identification information (an ID, etc.) of the specific area along with the generated location information to the memory 17 or the server 70. The transmitted location information and identification information about the specific area are transmitted to the memory 17 or the server 70. Location information and identification information about each indoor specific area (the first and second areas) are transmitted and stored in the memory 17 or the server 70 by repeating the above operation. Then the controller 18 or the server 70 can generate a map of the specific areas using the stored location information and identification information.

Figure 27:
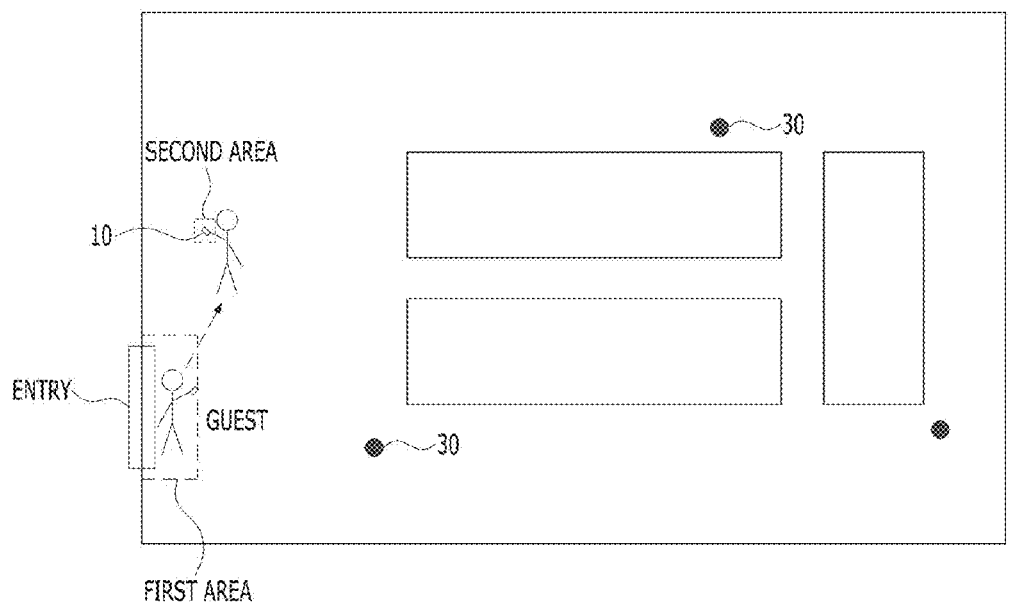
FIGS. 27 and 28 illustrate other methods for controlling a system according to an embodiment of the present invention.
Figure 28:
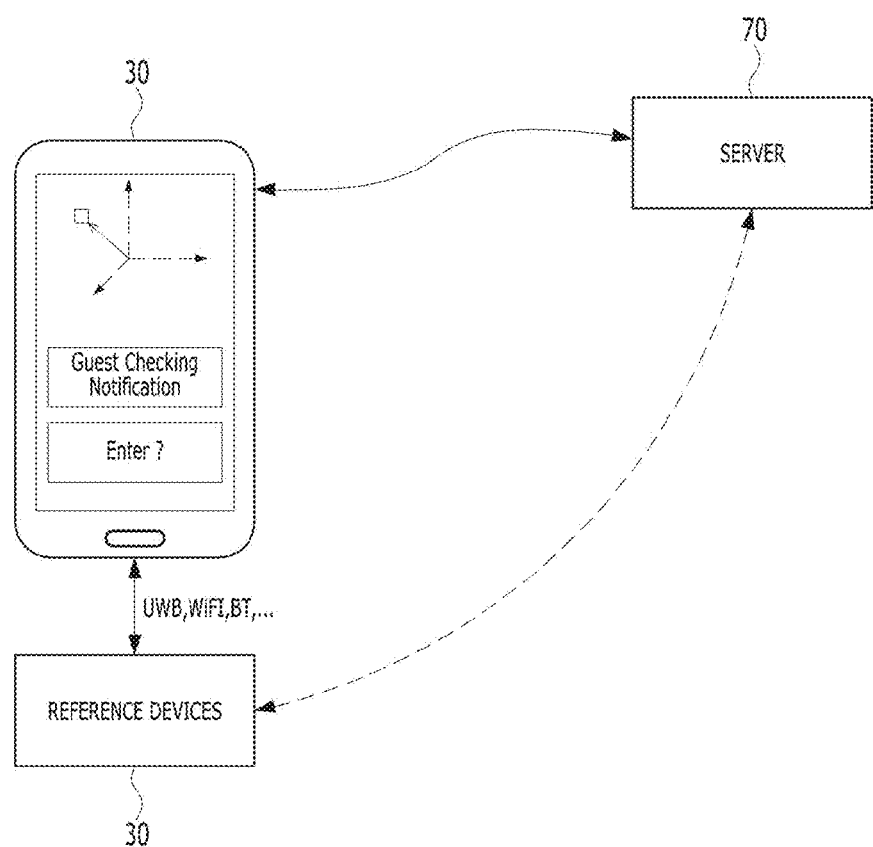

FIGS. 27 and 28 are views illustrating an system control method using the specific areas registered in FIGS. 25 and 26. Referring to FIG. 27, if a mobile terminal 10 of another user (e.g., a guest) moves to or passes through the first area, the mobile terminal 10 of the guest measures its location by wireless communication with the reference devices 30 and transmits location information indicating the measured location to the mobile terminal 10 of the host or the server 70.

Subsequently, the mobile terminal 10 of the host or the server 70 determines whether the mobile terminal 10 of the guest has moved to the second area based on the received location information. If the mobile terminal 10 of the guest has not moved to the second area, the mobile terminal 10 of the host or the server 70 can control the mobile terminal 10 of the guest to display at least one of information indicating the distance or proximity between the mobile terminal 10 of the guest and the second area, or information for guiding the mobile terminal 10 of the guest to a direction or path to the second area.

When the mobile terminal 10 of the guest moves to the second area, the mobile terminal 10 of the host or the server 70 can transmit a message or data set for a virtual NFC tag of the second area, for example, a message or data asking whether the guest will join to the mobile terminal 10 of the guest and control the mobile terminal 10 of the guest to display the data or message on the mobile terminal 10 of the guest. Herein, the mobile terminal 10 of the host or the server 70 can store data or a message set for each specific area.

If the guest indicates whether the guest will join by pressing the "Enter" button of his or her mobile terminal 10, the mobile terminal 10 of the host or the server 70 can determine whether the guest will join. Whether the guest will join may be automatically determined and notified without human intervention using the system illustrated in FIGS. 27 and 28.

Figure 29:
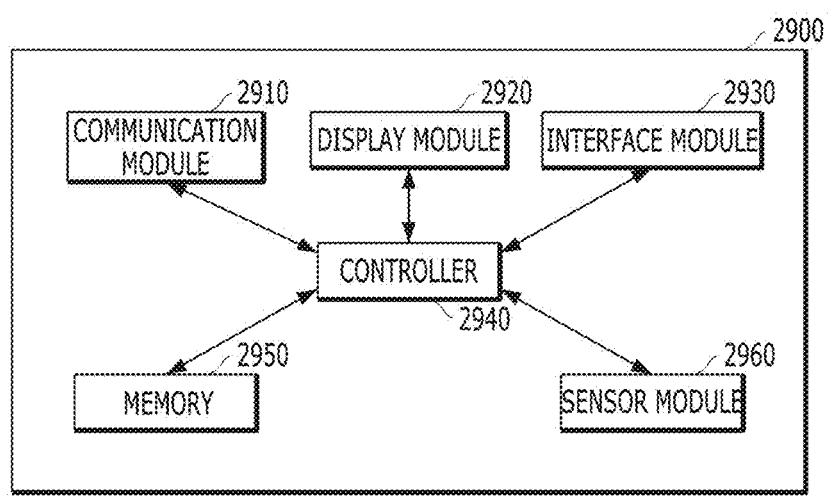
FIG. 29 is a block diagram illustrating components of a mobile terminal according to an embodiment of the present invention.

With reference to FIG. 29, two embodiments will be additionally described below. First, a protocol for pre-registering a legacy device if a mobile terminal to be controlled is the legacy device will be defined. Second, a process for automatically changing a communication means of a mobile terminal to be controlled and switching to a graphic image related to the controlled device according to the pointing direction of the mobile terminal in order to control the mobile terminal will be described in detail.

Conventionally, if a plurality of devices are controlled by a general IR or RF remote controller, a user should select a device from among the plurality of devices using a button and control the selected device, which is rather inconvenient. In accordance with an embodiment of the present invention, a user-intuitive device selection method may be provided, in which a legacy device controlled usually by IR or RF technology is selected by pointing or flicking a mobile terminal equipped with an IPS and at least 3-axis, 6-axis, or 9-axis sensor (e.g., a 3-axis acceleration sensor, a 3-axis gyroscope sensor, and under circumstances, a 3-axis geomagnetic sensor).

That is, it is possible to control an IR- or RF-controlled legacy device as well as a smart device that may be connected to at least one of networks operating based on Zigbee, Wi-Fi. Bluetooth, and Z-wave.

FIG. 29 is a block diagram illustrating components of a mobile terminal according to an embodiment of the present invention. Those skilled in the art may understand the configuration of the mobile terminal illustrated in FIG. 29 in conjunction with the previously described drawings. Some of the modules illustrated in FIG. 29 may be deleted or modified, or a module may be added to the illustrated modules. Further, the mobile terminal as described herein may be configured as a separate ISP controller as well as a general portable phone, tablet PC, etc.

Referring to FIG. 29, a mobile terminal 2900 according to an embodiment of the present invention includes a communication module 2910, a display module 2920, an interface module 2930, a controller 2940, a memory 2950, and a sensor module 2960. The communication module 2910 is configured to start setup of communication connections with a plurality of reference devices, for a location-based service. The reference devices are, for example, IPS anchor nodes or nodes at known positions. That is, the reference devices may determine the locations of the mobile terminal or other devices by communicating with the mobile terminal and provide location information about the mobile terminal or other devices to the mobile terminal.

The display module 2920 is configured to display a list of devices to be controlled and select a specific device from among the listed devices. The controller 2940 outputs a graphic image for controlling a first device corresponding to the location and direction of the mobile terminal 2900. According to another embodiment of the present invention, the memory 2950 is configured to store the location information about the selected specific device and the sensor module 2960 is configured to sense at least one of the location or direction of the mobile terminal 2900.

According to another embodiment of the present invention, upon sensing a change in at least one of the location or direction of the mobile terminal 2900 through the sensor module 2960, the controller 2940 discontinues output of the graphic image for controlling the first device and controls the display module 2920 to output a graphic image for controlling a second device corresponding to the changed location or direction of the mobile terminal 2900. This operation will be described later in detail with reference to FIGS. 39 to 42.

While not shown in FIG. 29, the mobile terminal 2900 includes a first transmission module for transmitting a first wireless signal to the first device upon selection of a specific area of the graphic image for controlling the first device, and a second transmission module for transmitting a second wireless signal to the second device upon selection of a specific area of the graphic image for controlling the second device according to another embodiment of the present invention. The first and second wireless signals comply with different communication schemes. For example, the first wireless signal is an IR signal and the second wireless signal is an RF signal.

According to another embodiment of the present invention, the controller 2940 is configured to output an option of selecting a device not displayed in the list, and the memory 2950 is configured to download additional information needed to control the device. Further, the controller 2940 is configured to calculate the distance between the mobile terminal 2900 and the selected specific device and location information about the selected specific device based on location information about the mobile terminal 2900 and the calculated distance.

According to another embodiment of the present invention, the memory 2950 stores all of an ID of the selected specific device, location information about the selected specific device, and an allowed distance for controlling the selected specific device by mapping them to one another.

Figure 30:
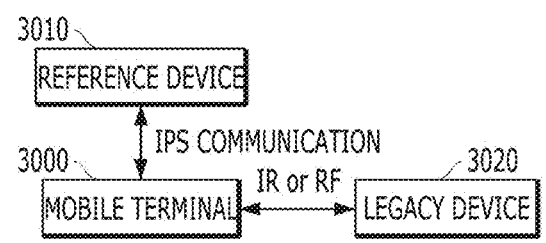
FIG. 30 is a block diagram of a system including a mobile terminal and a legacy device according to an embodiment of the present invention.

FIG. 30 is a block diagram of a system including a mobile terminal and a legacy device according to an embodiment of the present invention. Referring to FIG. 30, a mobile terminal 3000 according to an embodiment of the present invention is connected to a reference device 3010 by IPS communication. The IPS communication may be conducted by UWB, Wi-Fi, Bluetooth, etc. Accordingly, the mobile terminal 3000 may calculate its location by IPS communication with the reference device 3010 and location information about a legacy device 3020. As described later with reference to FIG. 35 and its following drawings, the mobile terminal 3000 may estimate the location of the legacy device 3020 by pointing at the legacy device 3020. This is possible because the mobile terminal 3000 may determine its location by communicating with the reference device 3010. Therefore, the legacy device 3020 does not need to have an additional communication function and has only to be controllable by an IR signal.

Figure 31:
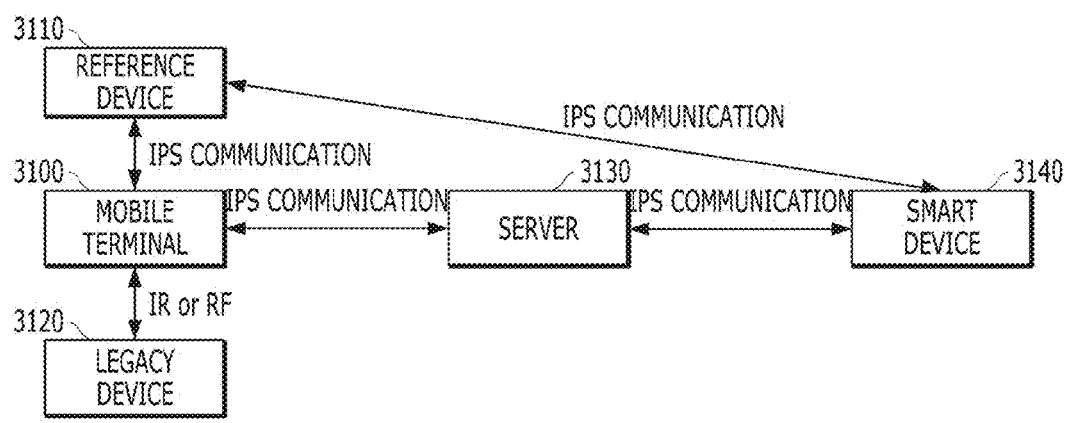
FIG. 31 is a block diagram of a system including a mobile terminal, a legacy device, and a smart device according to an embodiment of the present invention.

FIG. 31 is a block diagram of a system including a mobile terminal, a legacy device, and a smart device according to an embodiment of the present invention. Compared to the system illustrated in FIG. 30, the system illustrated in FIG. 31 further includes a smart device 3140. The smart device 3140 does not necessarily include the IPS function. If the smart device 3140 includes the IPS function as illustrated in FIG. 31, the smart device 3140 may determine its location via an IPS communication connection to a reference device 3110.

Similarly to the case illustrated in FIG. 30, the mobile terminal 3100 may determine its location by communicating with the reference device 3110 and may further calculate the location of the legacy device 3120. In addition, a server 3130 is configured to store location information about the mobile terminal 3100 and the legacy device 3120 according to one aspect of the present invention. The server 3130 may be configured, for example, as a home gateway, a cloud server, or an IPS reference device.

Figure 32:
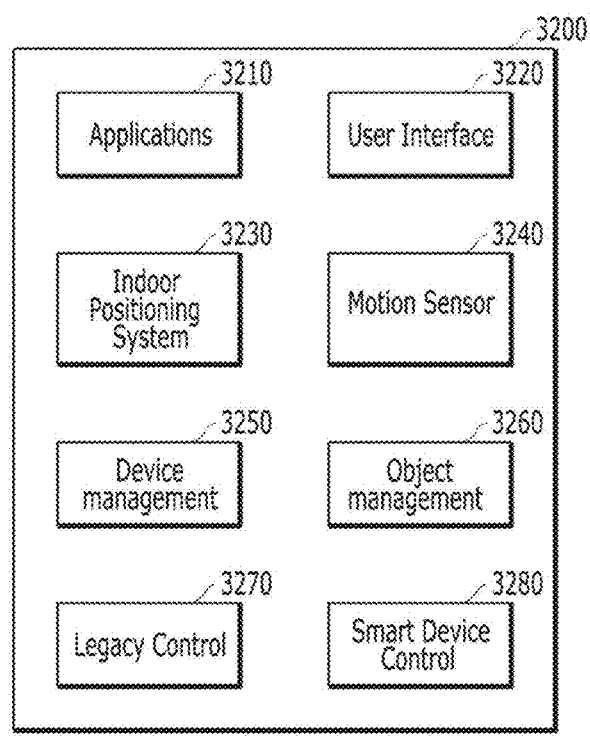
FIG. 32 is a detailed block diagram illustrating components of a mobile terminal according to an embodiment of the present invention.

FIG. 32 is a block diagram illustrating components of a mobile terminal according to an embodiment of the present invention. FIG. 32 is a detailed version of FIG. 29. Referring to FIG. 32, a mobile terminal 3200 according to an embodiment of the present invention includes applications 3210, a UI 3220, an IPS 3230, a motion sensor 3240, a device management module 3250, an object management module 3260, a legacy device controller 3270, and a smart device controller 3280. Each module illustrated in FIG. 32 may be configured in hardware or software.

The applications 3210 are computer software programs configured to control each module or execute a specific task. The UI 3220 may be configured with a touch module that receives a command from a user. The IPS 3230 determines its location by communicating with a reference device (an IPS anchor device) using a communication means such as UWB, Bluetooth, Wi-Fi, etc. The motion sensor 3240 determines the angle, pointing direction, etc. of the mobile terminal 3200 with respect to the ground surface using a 6-axis sensor or a 9-axis sensor. For example, the motion sensor 3240 may be a geomagnetic sensor, a gravity sensor, a gyroscope sensor, an acceleration sensor, an altitude sensor, etc.

The device management module 3250 stores commands required to control indoor controllable devices. The indoor controllable devices include, for example, a TV, an air conditioner, a light, etc. The object management module 3260 stores commands required to control a sleep mode, a movie mode, a calendar mode, etc. For example, with a virtual object set to the sleep mode, if the mobile terminal points in a specific direction, a light and a TV are automatically turned off in an embodiment of the present invention. That is, the virtual object is not an actual device. Rather, the virtual object refers to pointing of the mobile terminal in a specific direction at a specific location.

The legacy device controller 3270 includes a communication means for controlling a legacy device. For example, if the legacy device is controlled by IR, the legacy device controller 3270 transmits an IR signal to the legacy device. Further, if the legacy device is controlled by RF, the legacy device controller 3270 transmits an RF signal to the legacy device.

The smart device controller 3280 includes a communication means for controlling a smart device other than a legacy device. For example, if the smart device is controlled by Wi-Fi, the smart device controller 3280 transmits a Wi-Fi signal to the smart device. Further, if the smart device is controlled by Bluetooth, the smart device controller 3280 transmits a Bluetooth signal to the smart device.

Figure 33:
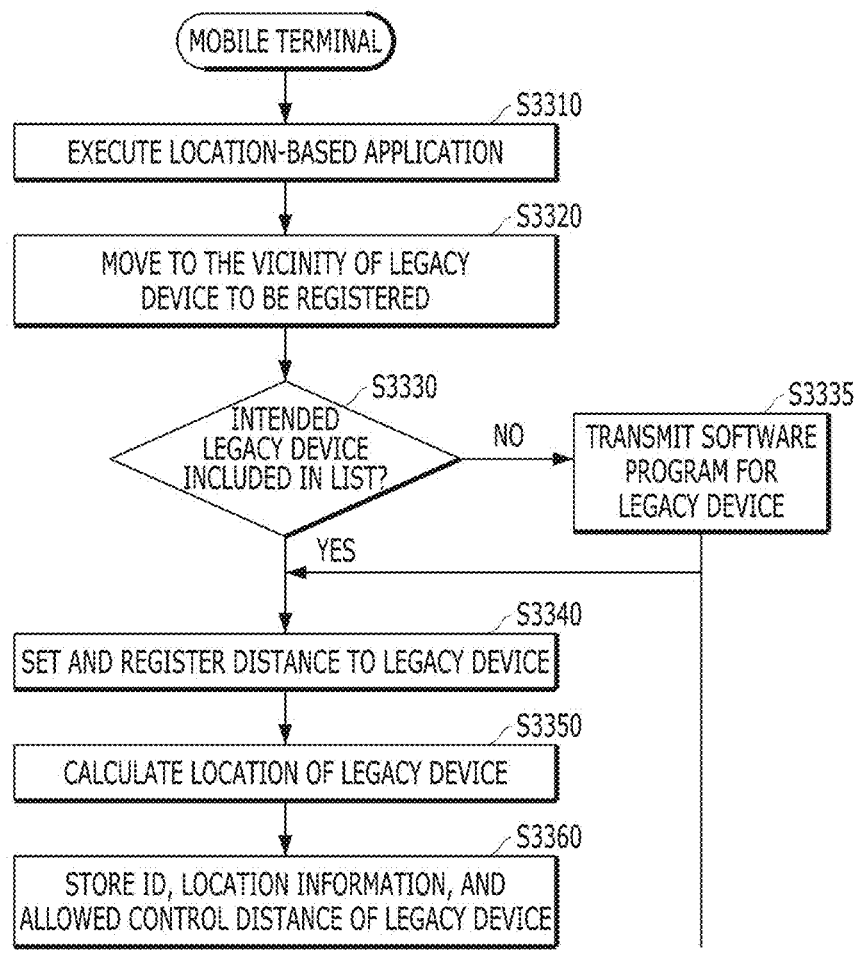
FIG. 33 is a flowchart illustrating an operation between a mobile terminal and a server according to an embodiment of the present invention.
Figure 38:
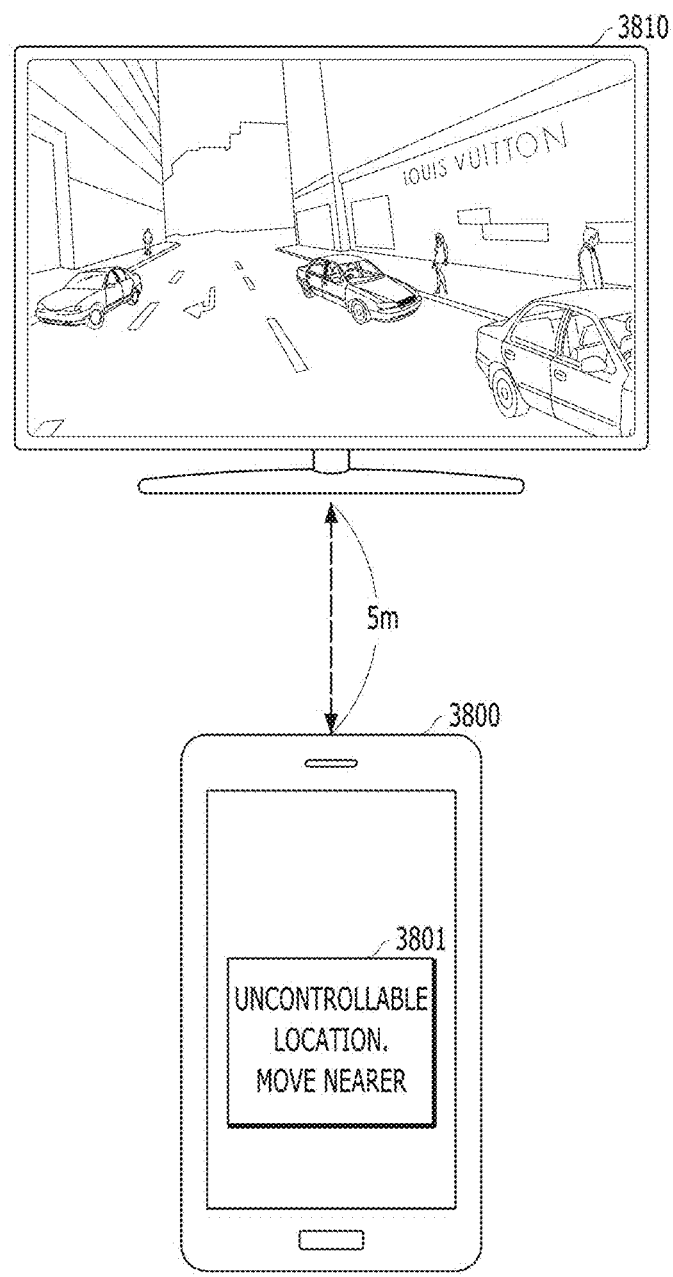
FIG. 38 illustrates a graphic image used to overcome a situation in which a mobile terminal may not control a legacy device according to an embodiment of the present invention.

FIG. 33 is a flowchart illustrating an operation between a mobile terminal and a server according to an embodiment of the present invention. With reference to FIG. 38, a process of pre-registering information about a legacy device to control the legacy device using a mobile terminal in a location-based manner will be described.

The mobile terminal executes a location-based application (S3310). Step S3310 may be performed in the applications 3210 illustrated in FIG. 32. The mobile terminal moves near to a legacy device to be registered (S3320). The registration is a pre-procedure for controlling the legacy device using the mobile terminal. The mobile terminal displays a list of least one legacy device, stored in the memory or acquired by communication with an external server and determines whether the legacy device is included in the list (S3330).

In the absence of the legacy device in the list in step S3330, the mobile terminal requests information about the legacy device to a server and the server transmits a software program for the legacy device to the mobile terminal (S3335). The software program is used to control the legacy device. Instead of the server, a smart phone, a PC, a cloud device, a storage device, etc. may be adopted.

Further, in the presence of the legacy device in the list in step S3330, a distance between the mobile terminal and the legacy device is set and registered (S3340). If the mobile terminal includes a distance measurement module such as an ultrasonic sensor, a Time Of Flight/Time of Arrival (TOF/TOA) sensor, a camera, etc., step S3340 may not be performed, which also falls into the scope of the present invention.

Since the mobile terminal knows its location by communication with reference devices, the mobile terminal calculates the location of the legacy device using its location information and the distance information (S3350). That is, the location of the legacy device may be calculated using location information about the mobile terminal, data measured by a geomagnetic sensor, a gravity sensor, an acceleration sensor, and/or an altitude sensor, and the distance between the mobile terminal and the legacy device to be controlled. Further, location information about a legacy device located in a vertical direction, such as a light may be calculated using the data measured by the foregoing sensor(s). If four or more anchor devices (or reference devices) are deployed for 3D triangulation, it is possible to record a 3D location of the legacy device to be controlled.

The mobile terminal stores the ID, location information, allowed control distance of the legacy device in the memory by mapping them with one another (S3360). While steps S3350 and S3360 are performed in the mobile terminal as illustrated in FIG. 33, they may be performed in a home gateway or a cloud server, which also falls into the scope of the present invention.

Figure 34:
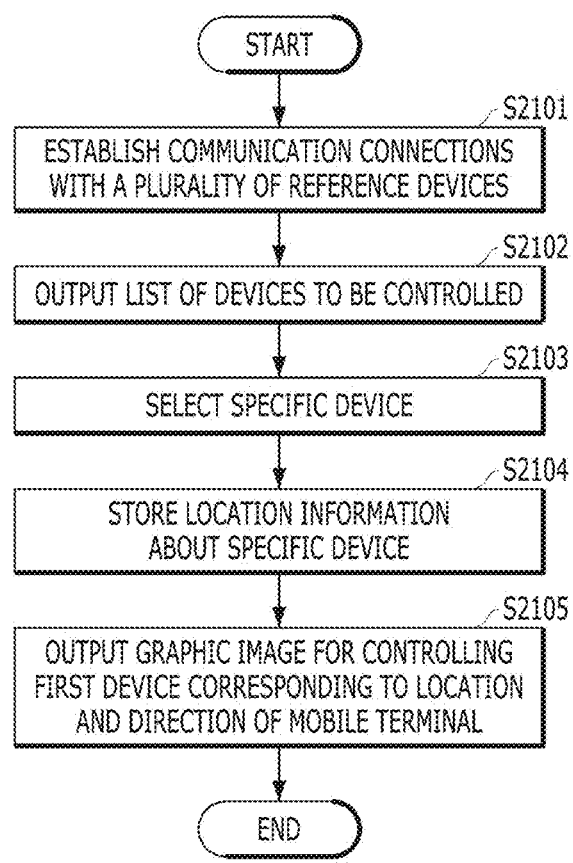
FIG. 34 is a flowchart illustrating a control method of a mobile terminal according to an embodiment of the present invention.

FIG. 34 is a flowchart illustrating a control method of a mobile terminal according to an embodiment of the present invention. Another embodiment of the present invention may be achieved by deleting or modifying a part of the steps illustrated in FIG. 34 within the scope of the present invention. According to an embodiment of the present invention, the mobile terminal starts to establish communication connections with a plurality of reference devices, for a location-based service (S2101). For example, this is a procedure required to calculate the location of the mobile terminal in an IPS. The mobile terminal displays a list of devices to be controlled (S2102).

Upon selection of a specific device from among the listed devices (S2103), the mobile terminal stores location information about the selected device in an internal or external memory (S2104). The mobile terminal outputs a graphic image for controlling a corresponding first device according to the location and direction of the mobile terminal (S2105).

According to an embodiment of the present invention, if at least one of the location or direction of the mobile terminal has changed, the mobile terminal discontinues output of the graphic image for controlling the first device and outputs a graphic image for controlling a second device corresponding to the changed location or direction. Further, upon selection of a specific area of the graphic image for controlling the first device, the mobile terminal transmits a first wireless signal to the first device. Upon selection of a specific area of the graphic image for controlling the second device, the mobile terminal transmits a second wireless signal to the second device. The first and second wireless signals are based on the same or different communication schemes. For example, the first signal is based on RF communication and the second signal is based on IR communication, which will be described later with reference to FIGS. 39 to 42.

According to another embodiment of the present invention, the method further includes outputting an option of selecting a device other than included in the list and downloading additional information required to control the selected device to the memory, while not shown in FIG. 34. This will be described with reference to FIGS. 35 and 36.

FIG. 35 illustrates a procedure for registering a legacy device using a mobile terminal according to an embodiment of the present invention. In FIG. 35, it is assumed that a legacy device 3510 may not conduct data communication. Accordingly, the legacy device 3510 located indoors may not calculate its location information. As described before, it is assumed that a mobile terminal 3500 may calculate its location information by communication with reference devices in FIG. 35. Therefore, as illustrated in FIG. 35, a pre-registration procedure is needed to calculate location information about a legacy device.

The mobile terminal 3500 executes an application for registering an indoor location service, in the vicinity of the legacy device 3510 to be controlled indoors. As illustrated in FIG. 35, the mobile terminal 3500 displays a legacy device list 3501 pre-stored in a memory. Thus, a user may select a legacy device type to be controlled. However, the list 3501 may not include an intended product type in FIG. 35. In this instance, the mobile terminal is configured to automatically search for the new product type by accessing a server or the Internet.

FIG. 36 illustrates another procedure for registering a legacy device using a mobile terminal according to an embodiment of the present invention. In FIG. 36, it is assumed that the mobile terminal has selected a TV as the legacy device in FIG. 35. Since a different IR code value may be defined for each TV manufacturer (product manufacturing company), it is necessary to determine the manufacturer of the TV to be controlled in order to control a legacy device 3610 being the TV.

Accordingly, the mobile terminal 3600 displays a list of TV manufacturers, as illustrated in FIG. 36. Herein, the user selects the manufacturer of a TV to be controlled referring to the list 3601. It is also possible for the mobile terminal 3600 to capture the legacy device 3610 directly and then estimate the type and manufacturer of the legacy device 3610 by analyzing the captured image data. For example, the mobile terminal 3600 may estimate the type and manufacturer of the legacy device 3610 from image data of a logo attached to the front surface of the legacy device 3610.

However, the list 3601 illustrated in FIG. 36 may not include the manufacturer of the legacy device 3610. In this instance, the mobile terminal 3600 is configured to automatically search for information about the new manufacturer by accessing a server or the Internet.

FIG. 37 illustrates another procedure for registering a legacy device using a mobile terminal according to an embodiment of the present invention. After the registration procedures of FIGS. 35 and 36 are completed, the registration procedure of FIG. 37 is finally needed. This is because the legacy device was assumed to be unable to determine its location information, as described before.

As illustrated in FIG. 37, a mobile terminal 3700 displays a message 3701 prompting input of a distance between the mobile terminal 3700 and a legacy device 3710. As described before, the mobile terminal 3700 has its location information by communication with IPS reference devices. Hence, the mobile terminal 3700 may determine the location of the legacy device 3710 based on its location information and information about the distance to the legacy device 3710. Information about a direction in which the mobile terminal points may be used through a motion sensor, etc. of the mobile terminal 3700, according to an aspect of the present invention. Finally, identification information and location information about the legacy device 3710 are stored in a memory or a server. A command and a graphic image that are used to control the legacy device identified by the identification information are also stored in the memory of the mobile terminal 3700 or the server. Therefore, if the mobile terminal 3700 determines that the mobile terminal 3700 and the legacy device 3710 are within a predetermined distance range, the mobile terminal 3700 automatically displays a graphic image for controlling the legacy device 3710. This operation will be described later with reference to FIGS. 39 to 42.

FIG. 38 illustrates a graphic image for handling a situation in which a mobile terminal is not capable of controlling a legacy device according to an embodiment of the present invention. For example, a distance for which an IR signal may be recognized is limited for a legacy device that is controlled by an IR signal. Accordingly, if the distance between the legacy device and the mobile terminal exceeds a distance range in which an IR signal may be recognized, there is a need for a solution to this situation. This will be described with reference to FIG. 38.

When a mobile terminal 3800 points in a direction in which a legacy device 3810 is located, the mobile terminal 3800 may be aware that the legacy device 3810 exists in the pointing direction and may also determine location information about the legacy device 3810. If the legacy device 3810 is controlled by an IR signal, a maximum range for IR-based control of the legacy device 3810 is preset. For example, it is assumed that the legacy device 3810 may receive an IR control signal within 4 meters at maximum.

However, the mobile terminal 3800 is apart from the legacy device 3810 by about 5 meters in FIG. 38. As a consequence, even though the mobile terminal 3800 transmits an IR signal to the legacy device 3810, the legacy device 3810 may not recognize the IR signal. From the user's view, it is highly likely to be mistaken for an error of the mobile terminal 3800 or the legacy device 3810. To avert this problem, if the mobile terminal 3800 is apart from the legacy device 3810 by a distance exceeding a predetermined IR signal sensing range, the mobile terminal 3800 displays a notification message 3801 to correct the error.

Figure 39:
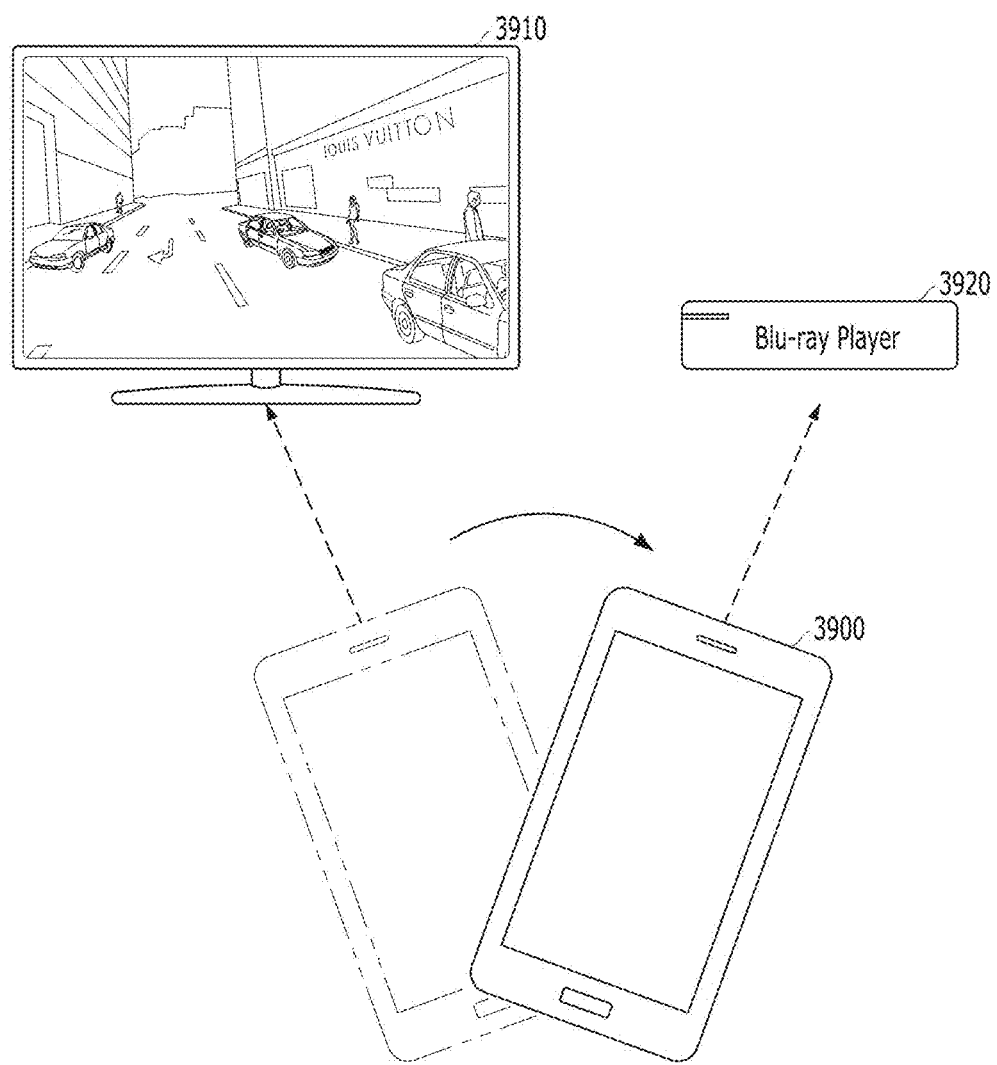
FIG. 39 illustrates an operation for sequentially controlling a first device and a second device by a mobile terminal according to an embodiment of the present invention.
Figure 40:
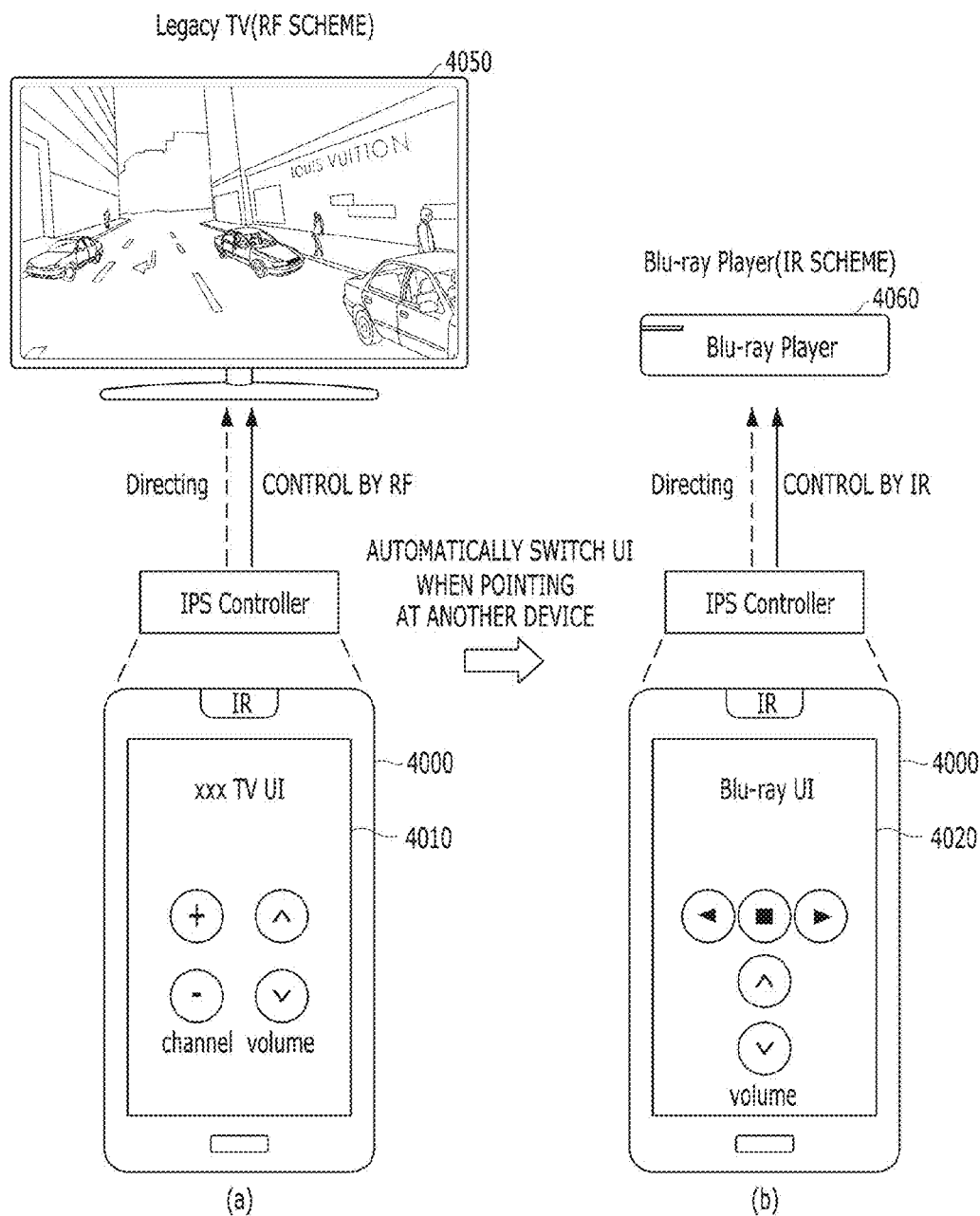
FIG. 40 illustrates a detailed operation for sequentially controlling a first device and a second device by a mobile terminal in relation to FIG. 39 according to an embodiment of the present invention.

FIG. 39 illustrates an operation for controlling first and second devices sequentially by a mobile terminal according to an embodiment of the present invention. FIG. 40 is a detailed view of the operation illustrated in FIG. 39. With reference to FIGS. 39 and 40, an operation for controlling first and second devices sequentially by a mobile terminal according to an embodiment of the present invention will be described below. Devices 3910, 3920, 4050, and 4060 illustrated in FIGS. 39 and 40 are not limited to legacy devices. Rather, they may be smart devices capable of data communication.

For example, as illustrated in FIG. 39, it is assumed that a mobile terminal 3900 according to an embodiment of the present invention initially points in the direction of a TV (a first device) 3910 and then points in the direction of a Blu-ray player (a second device) 3920.

FIG. 40(*a*) corresponds to the case in which the mobile terminal points in the direction of the TV in FIG. 39 and FIG. 40(*b*) corresponds to the case in which the mobile terminal points in the direction of the Blue-ray player in FIG. 39. Referring to FIG. 40(*a*), when a mobile terminal 4000 points in the direction of the TV 4050, the mobile terminal 4000 displays a graphic image 4010 for controlling the TV 4050. Upon selection of a specific function in the graphic image 4010, the mobile terminal 4000 transmits a command corresponding to the selected function by an RF signal. That is, the TV 4050 is a device that may receive an RF signal from a remote controller. If the pointing direction of the mobile terminal 4000 is changed, the mobile terminal 4000 automatically switches to a changed graphic image.

Referring to FIG. 40(*b*), when the mobile terminal 4000 points in the direction of the Blue-ray player 4060, the mobile terminal 4000 displays a graphic image 4020 for controlling the Blue-ray player 4060. Upon selection of a specific function in the graphic image 4020, the mobile terminal 4000 transmits a command corresponding to the selected function by an IR signal. That is, the Blue-ray player 4060 is a device that may receive an IR signal from a remote controller. That is, since the mobile terminal 4000 has prior knowledge of the location of a controlled device, a graphic image needed to control each device, and a communication path (IR or RF) needed to control each device, the mobile terminal 4000 outputs a different graphic image according to its pointing direction and transmits a command (e.g., a channel up/down command in a TV or a start/stop/back command in a Blue-ray player) through a communication path suitable for each device.

Figure 41:
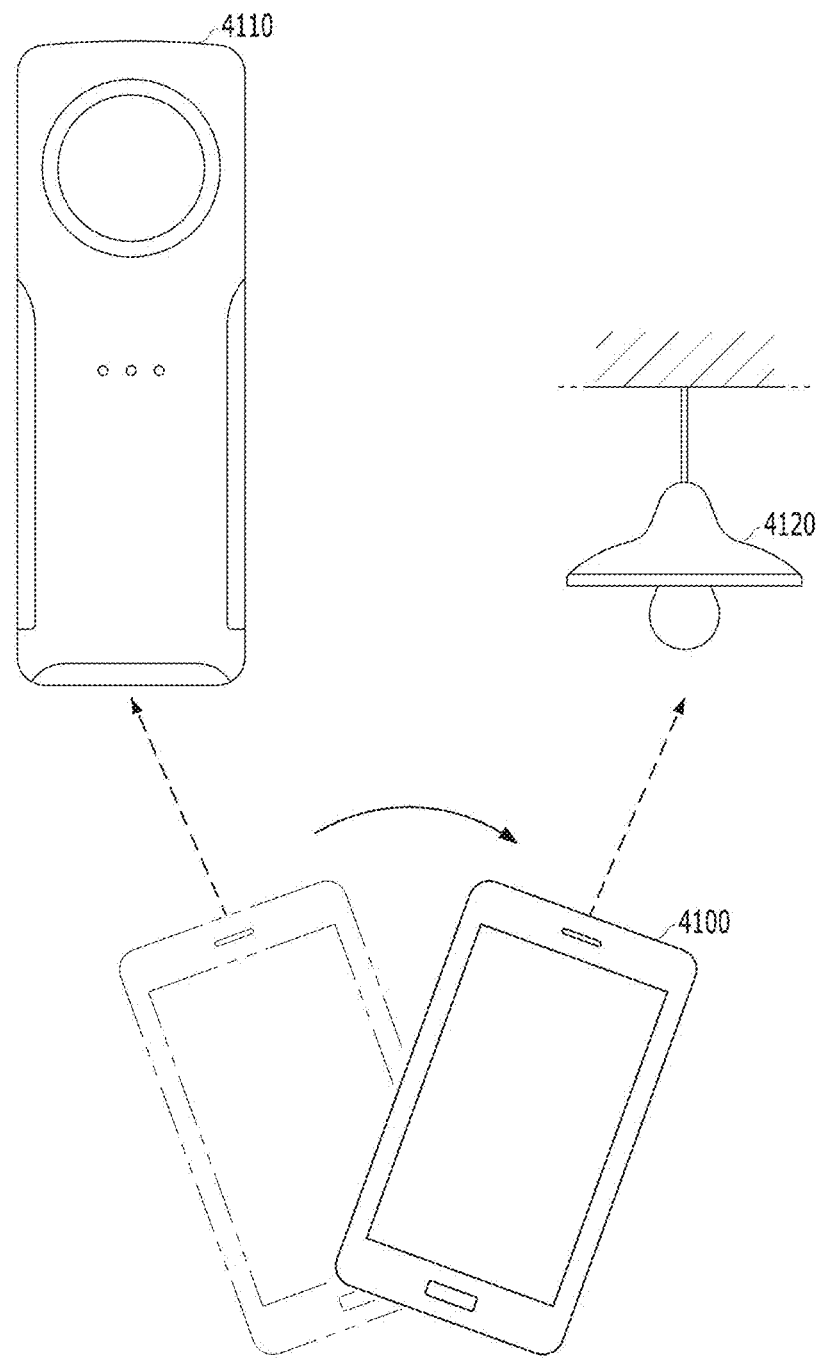
FIG. 41 illustrates an operation for sequentially controlling a third device and a fourth device by a mobile terminal according to an embodiment of the present invention.
Figure 42:
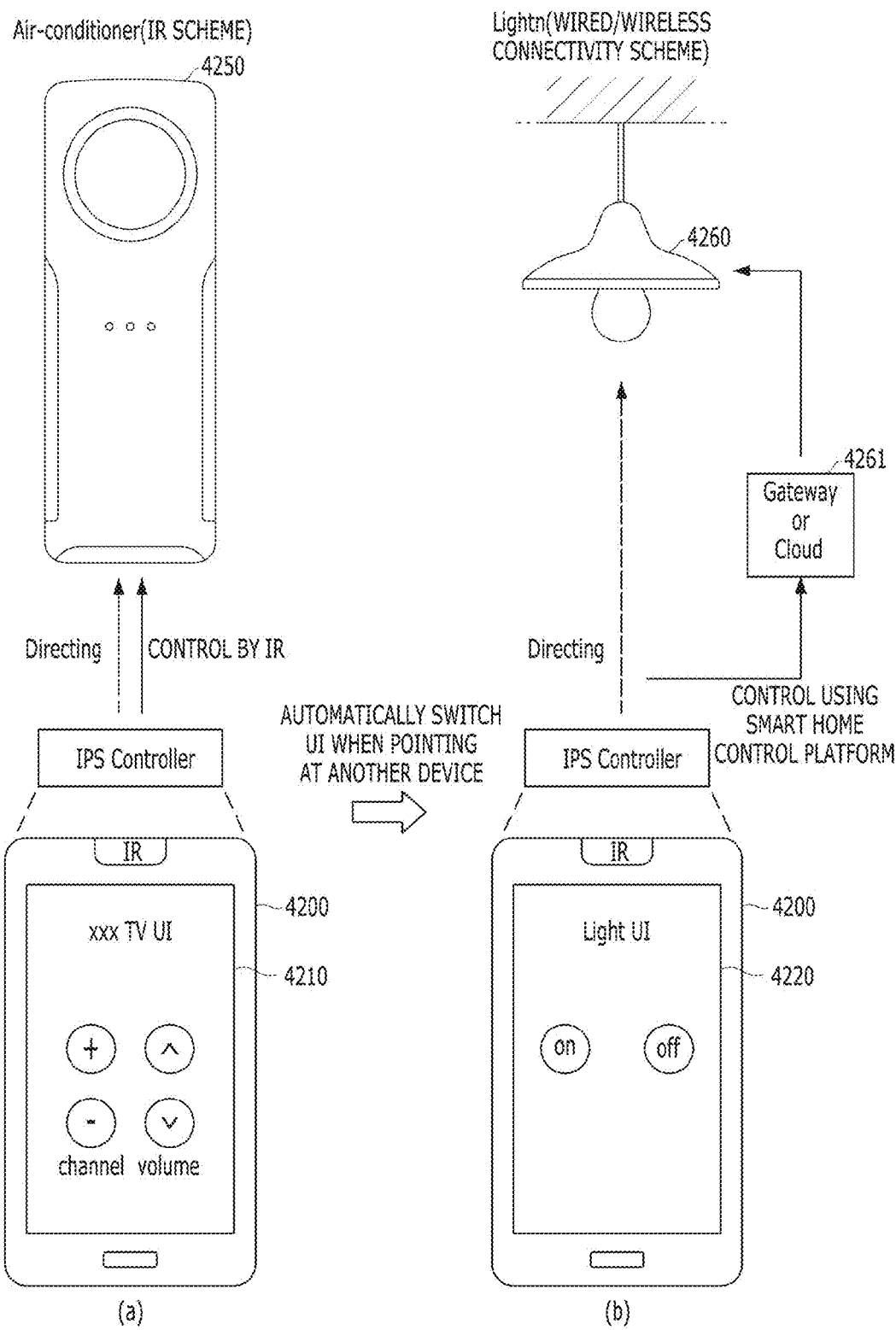
FIG. 42 illustrates a detailed operation for sequentially controlling a third device and a fourth device by a mobile terminal in relation to FIG. 41 according to an embodiment of the present invention.

FIG. 41 illustrates an operation for controlling third and fourth devices sequentially by a mobile terminal according to an embodiment of the present invention. FIG. 42 is a detailed view of the operation illustrated in FIG. 41. With reference to FIGS. 41 and 42, an operation for controlling third and fourth devices sequentially by a mobile terminal according to an embodiment of the present invention will be described below. Devices 4110, 4120, 4250, and 4260 illustrated in FIGS. 41 and 42 are not limited to legacy devices. Rather, they may be smart devices capable of data communication.

For example, as illustrated in FIG. 41, it is assumed that a mobile terminal 4100 according to an embodiment of the present invention initially points in the direction of the air conditioner (a third device) 4110 and then points in the direction of the light (a fourth device) 4120.

FIG. 42(*a*) corresponds to the case in which the mobile terminal points in the direction of the air conditioner in FIG. 41 and FIG. 42(*b*) corresponds to the case in which the mobile terminal points in the direction of the light in FIG. 41. Referring to FIG. 42(*a*), when a mobile terminal 4200 points in the direction of the air conditioner 4250, the mobile terminal 4200 displays a graphic image 4210 for controlling the air conditioner 4250. Upon selection of a specific function in the graphic image 4210, the mobile terminal 4200 transmits a command corresponding to the selected function by an IR signal. That is, the air conditioner 4250 is a device that may receive an IR signal from a remote controller. If the operation of FIG. 42(*a*) follows the operation of FIG. 40(*b*), the mobile terminal does not need to change a communication means for controlling each device. However, if the operation of FIG. 42(*a*) follows the operation of FIG. 40(*a*), the mobile terminal needs to change a communication means for controlling each device (RF->IR). If the pointing direction of the mobile terminal is changed, the mobile terminal automatically switches to a changed graphic image.

Referring to FIG. 42(*b*), when the mobile terminal 4200 points in the direction of the light 4260, the mobile terminal 4200 displays a graphic image 4220 for controlling the light 4260. Upon selection of a specific function in the graphic image 4220, the mobile terminal 4200 transmits a command corresponding to the selected function by a different wireless signal. However, if the light 4260 is wireless communication-disabled, the mobile terminal 4220 transmits a command for controlling the light 4260 to a gateway 4261 installed in a home and the gateway 4261 forwards the command to the light 4260 as illustrated in FIG. 42(*b*). That is, it may be assumed that the gateway 4261 is connected to the light 4260 by cable. That is, since the mobile terminal 4200 has prior knowledge of the location of each controlled device, a graphic image needed to control each device, and a communication path (IR or gateway) needed to control each device, the mobile terminal 4200 outputs a different graphic image according to its pointing direction and transmits a command (e.g., a temperature up/down command in an air conditioner or a power on/off command in a light) through a communication path suitable for each device.

The mobile terminal as described herein includes both an IPS and a 9-axis sensor. The 9-axis sensor may include, for example, a 3-axis acceleration sensor, a 3-axis gyroscope sensor, and a 3-axis magnetic sensor. With reference to FIGS. 43 to 63, a method for providing a different graphic image according to a relationship between a mobile terminal and a controlled device and a location and direction of the mobile terminal by the mobile terminal according to an embodiment of the present invention will be described with reference to the foregoing description. The mobile terminal may be configured, for example, as a portable phone or any other device in the specification. Thus, the mobile terminal is not limited to a portable phone.

A description will also be given of a method for receiving icon information, shape information, connection path information, etc. related to a controlled device, when a user points a mobile terminal equipped with an IPS and a 9-axis sensor at the controlled device. Accordingly, the mobile terminal described herein may be referred to as an IPS controller. To increase user convenience, a protocol for processing a Line Of Sight (LOS) mode and a Non Line Of Sight (NLOS) separately will be defined. Further, a solution for selecting devices located at a specific location of a mobile terminal with priority will be described below in detail.

Figure 43:
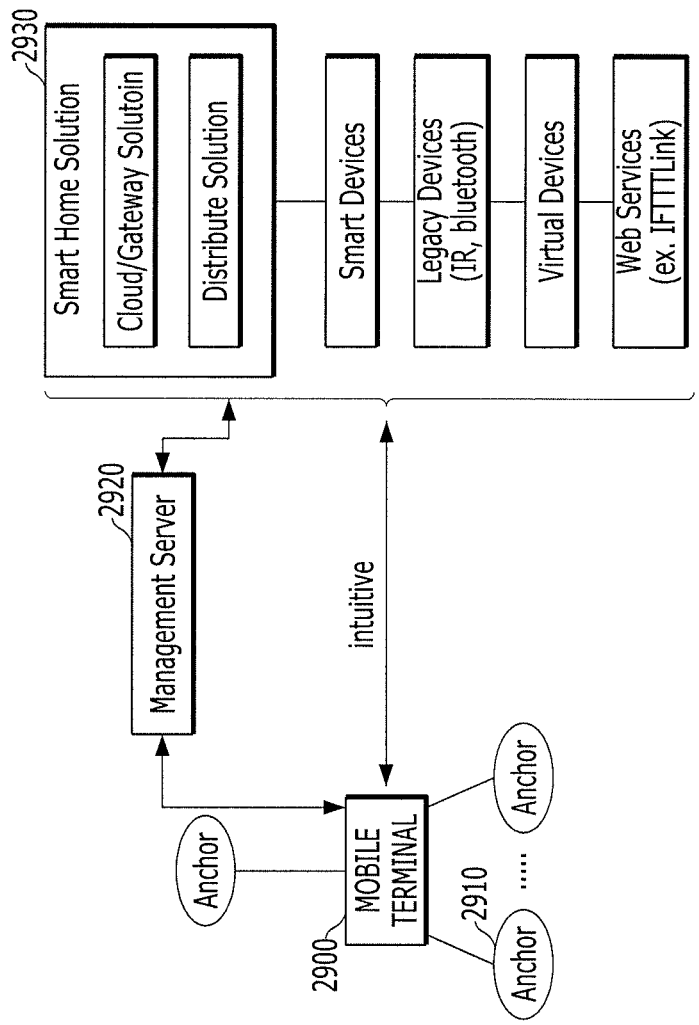
FIG. 43 illustrates a system including a mobile terminal and at least one server according to an embodiment of the present invention.

FIG. 43 illustrates a system including a mobile terminal and at least one server according to an embodiment of the present invention. A management server 2920 and a smart home solution server 2930 may be incorporated into one server, which also falls into the scope of the present invention. Referring to FIG. 43, a mobile terminal 2900 includes, for example, both an IPS and a 9-axis sensor. Specifically, the 9-axis sensor includes, for example, a 3-axis gyroscope, a 3-axis acceleration sensor, a 3-axis magnetic field sensor, etc.

The mobile terminal 2900 may determine its location through communication with indoor anchor devices 2910. A typical IPS needs two anchor devices to determine a Two Dimensional (2D) location and three anchor devices to determine a Three Dimensional (3D) location.

The smart home solution server 2930 manages location information about the mobile terminal 2900 and location information about other indoor devices. Particularly, the smart home solution server 2930 has smart device-related information, legacy device-related information, virtual device-related information, etc. and may provide a Web service. For example, if the smart home solution server 2930 does not have information about a specific legacy device, the smart home solution server 2930 may receive the information about the specific legacy device by the Web service.

The management server 2920 is configured to function as a gate between the mobile terminal 2900 and the smart home solution server 2930. An anchor device 2910, the mobile terminal 2900, or the smart home solution server 2930 may play the role of the gate, which falls into the scope of the present invention.

Figure 44:
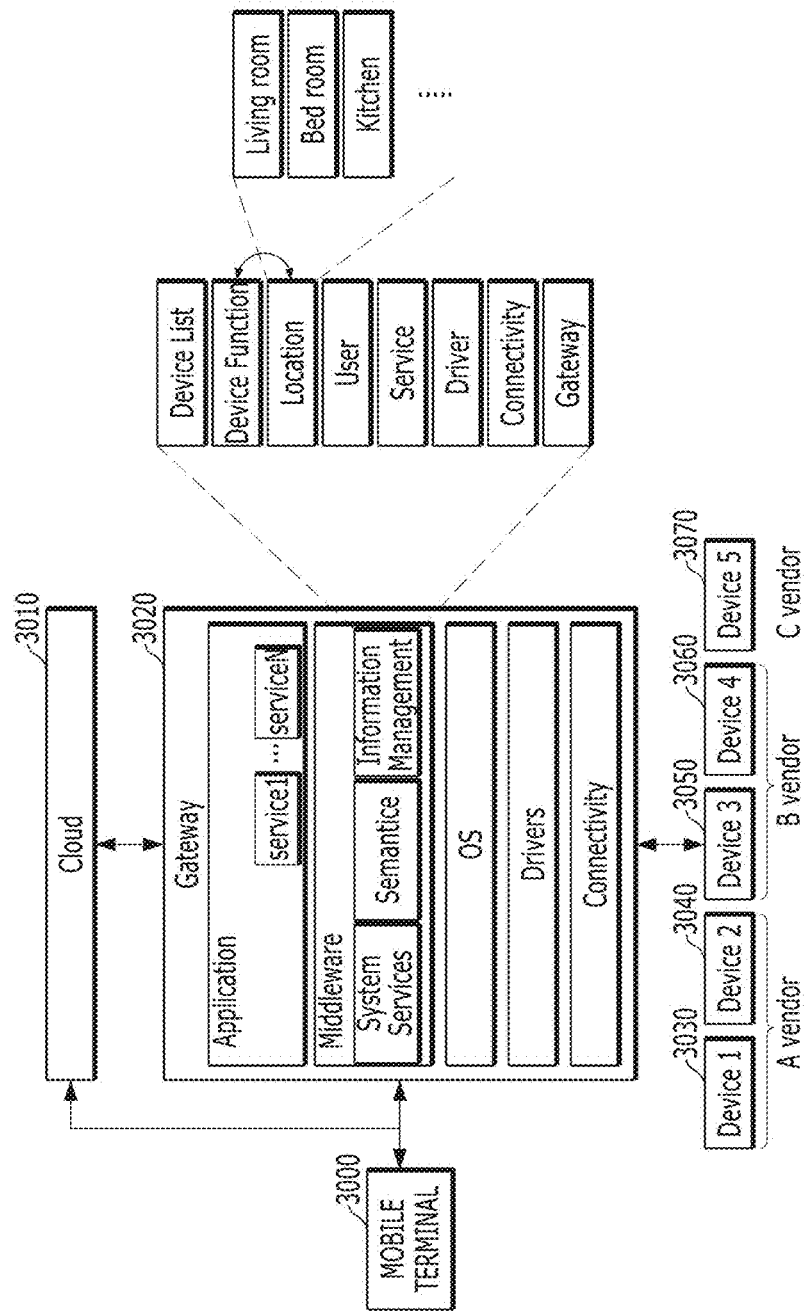
FIG. 44 is a detailed block diagram of the smart home solution server illustrated in FIG. 43.

FIG. 44 is a detailed block diagram of the smart home solution server illustrated in FIG. 43. With reference to FIG. 44, the smart home solution server 2930 illustrated in FIG. 43 will be described in detail. A smart home solution server 3020 receives location information about a mobile terminal 3000 by direct communication with the mobile terminal 3000 or via a cloud server 3010. The smart home solution server 3020 is configured to transmit location information about indoor controllable devices to the mobile terminal 3000.

First, second, third, fourth, and fifth devices 3030, 3040, 3050, 3060, and 3070, which are indoor controllable devices, are configured to establish communication connections with the smart home solution server 3020 and transmit and receive location information to and from the smart home solution server 3020.

As illustrated in FIG. 44, the smart home solution server 3020 manages at least one data in middleware. For example, the middleware includes a list of controllable devices and information about a function, location, user, service, driver, connection path, and gateway of each device, etc. Particularly, more fine control is possible by grouping location information in the present invention. For example, a relative location of a controlled device (e.g., a living room, a bedroom, or a kitchen) as well as an absolute location of the controlled device is pre-stored in a memory.

Figure 45:
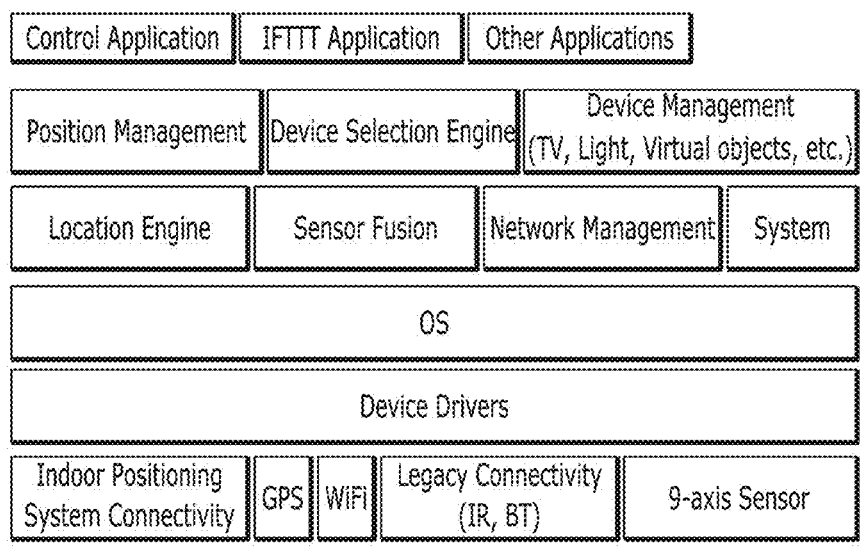
FIG. 45 is a detailed block diagram of main components of the mobile terminal illustrated in FIG. 43.

FIG. 45 is a detailed block diagram of main components of the mobile terminal illustrated in FIG. 43. With reference to FIG. 45, the main components of the mobile terminal 2900 illustrated in FIG. 43 will be described in detail. Referring to FIG. 45, a location engine manages location information, direction information, etc. determined by the IPS and the 9-axis sensor. A position management module manages location information and shape information about controlled devices.

A device selection engine manages scan zone information for selecting a controlled device and LOS/NLOS mode selection information. The device management module has connection path information or device icon information about each device and may be applied to virtual objects instead of the devices. A network management module controls communication connectivity to an anchor device, a gateway, a cloud server, etc. and controls transmission and reception of data/a command to and from each device in connection with the connection path information in the afore-described device management module.

Figure 46:
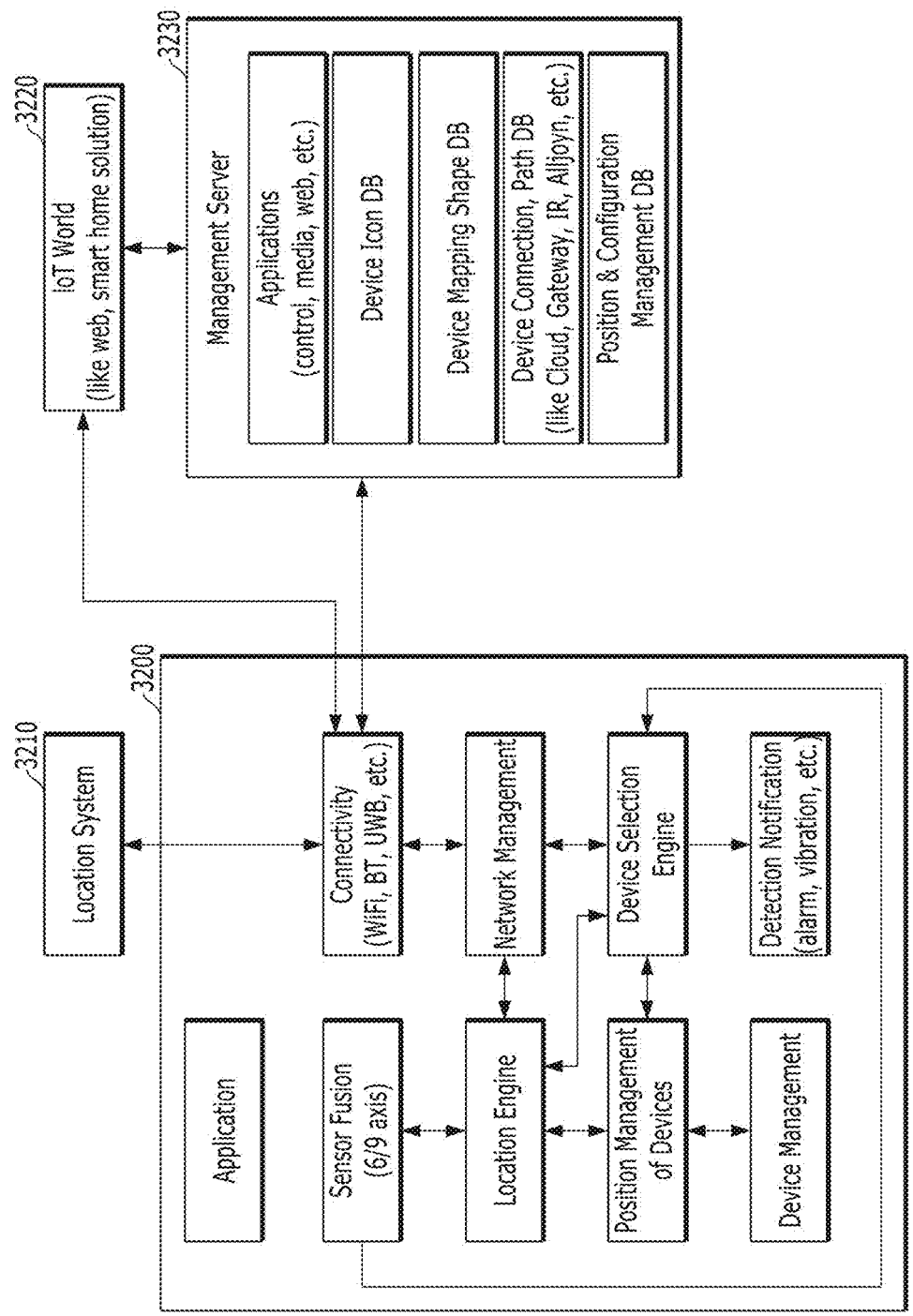
FIG. 46 is a detailed block diagram of the management server illustrated in FIG. 43.

FIG. 46 is a detailed block diagram of the management server illustrated in FIG. 43. With reference to FIG. 46, main components of the management server 2920 illustrated in FIG. 43 will be described below in detail. A mobile terminal 3200 communicates with a location system 3210, a smart home solution server 3220, and a management server 3230 via a connectivity module.

Particularly, the management server 3230 includes applications, a device icon DataBase (DB), a device mapping shape DB, a device connection path DB, a position and configuration management DB, etc. The applications execute general Web, media, and control functions. The device icon DB includes graphic images of icons that identify controlled devices. The device mapping shape DB includes graphic images identifying rough shapes of controlled devices or menus for controlling the controlled devices.

The device connection path DB includes information about a communication scheme (e.g., cloud, gateway, IR, Alljoyn, etc.) between a controlled device and the mobile terminal 3200. The position and configuration management DB includes information about absolute/relative locations of controlled devices. Therefore, when registering a location of a specific controlled device, the mobile terminal 3200 may download or upload a graphic image related to the shape of the specific device from or to the management server 3230. For example, an image of the specific device captured by the mobile terminal 3200 may be uploaded.

Since the icon of each device is stored in the management server 3230, if the mobile terminal 3200 points at the specific device, the mobile terminal 3200 may display the icon of the specific device through communication with the management server 3230. The mobile terminal 3200 may upload or download information about a communication connection between a controlled device and the mobile terminal 3200 to or from the management server 3230.

Figure 47:
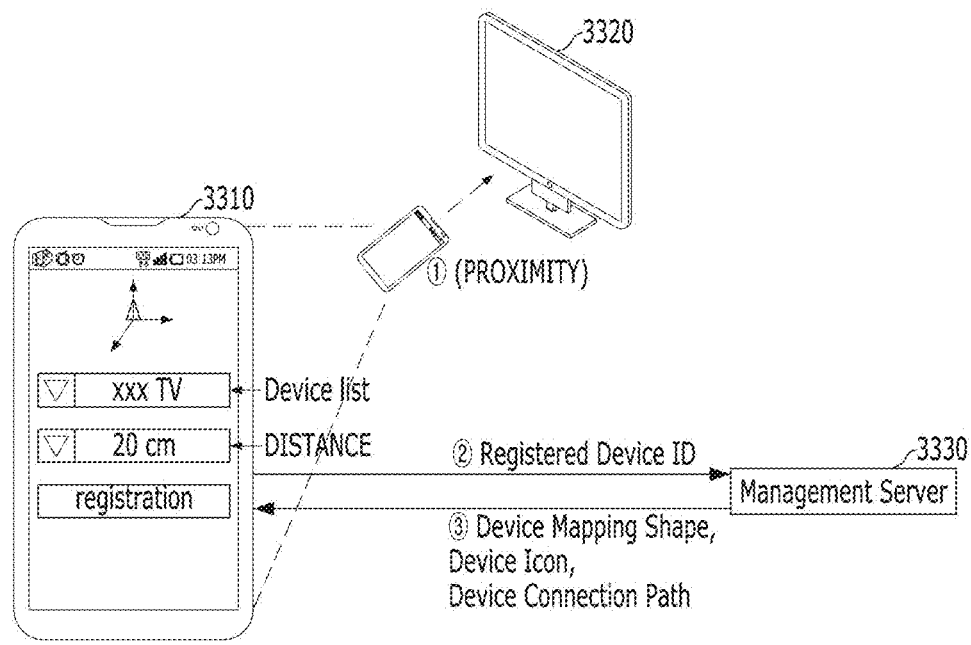
FIG. 47 illustrates an overall process for registering the location of an indoor device using a mobile terminal according to an embodiment of the present invention.

FIG. 47 illustrates an overall process for registering the location of an indoor device using a mobile terminal according to an embodiment of the present invention. In FIG. 47, a mobile terminal 3310 and a management server 3330 include a part or all of the afore-described functions. To implement an embodiment of the present invention, there is a need for a process for registering a specific controlled device among indoor devices.

Referring to FIG. 47, it is assumed that the mobile terminal 3310 and a specific controlled device 3320 are near to each other according to the embodiment of the present invention. The specific device 3320 is not limited to any device and may be even a legacy device. The legacy device is, for example, a device without communication functionality or an analog TV.

As illustrated in FIG. 47, the mobile terminal 3310 displays some information needed for registration on a screen. For example, a device list is output to determine the type of the specific controlled device 3320. In the absence of information about the specific device 3320 in the list, the mobile terminal 3310 requests the information about the specific device 3320 to the management server 3330. Further, a distance within which the specific device 3320 is controlled using the mobile terminal 3310 is set. If the distance exceeds a maximum controllable distance within which the mobile terminal 3310 may control the specific device 3320, the mobile terminal 3310 may display a notification message for readjustment.

Upon completion of inputting the two conditions (i.e., the device identification information and the controllable distance), the mobile terminal 3310 transmits related information to the management server 3330. The management server 3330 accesses an internal DB, extracts device mapping shape information, device icon information, device connection path information, etc. from the internal DB, and transmits the extracted information to the mobile terminal 3310.

An arrow indicator is displayed on a top part of the screen of the mobile terminal 3310 in FIG. 47. For example, if the mobile terminal 3310 points at the controlled device 3320 beyond a controllable range, the arrow indicator may be used as an indicator that re-guides a direction.

Figure 48:
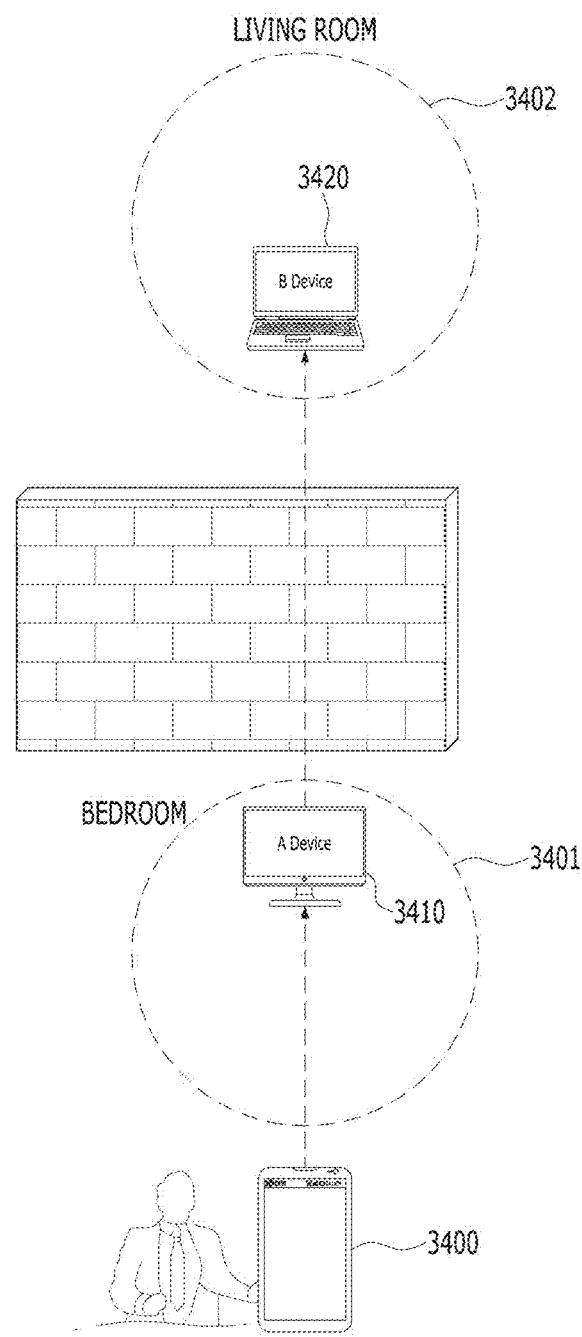
FIG. 48 illustrates a case in which controlled devices are located in different areas.

FIG. 48 illustrates an case in which controlled devices are located in different areas. As described before, the absolute location of each indoor device may be determined using an anchor device (or a reference device) to which an IPS is applied, according to an embodiment of the present invention. As illustrated in FIG. 44, information about the relative location of each device (e.g., in a living room or a bedroom) may also be shared.

As illustrated in FIG. 48, for example, a B device 3420 is located in a living room 3401 and an A device 3410 is located in a bedroom 3401. It is assumed that the A device 3410 or the B device 3420 is to be controlled using the mobile terminal 3400 according to an embodiment of the present invention. If information about a relative location of each device is not shared, the mobile terminal 3400 may not be aware that the A device 3410 and the B device 3420 are located in different areas. Particularly if the A device 3410 and the B device 3420 are near to each other, a problem is highly likely to happen. However, since information about the relative location of each device is shared according to one aspect of the present invention, the mobile terminal 3400 may differently control the A device 3410 in the area of the mobile terminal 3400 and the B device 3420 in a different area from the area of the A device 3410. Solutions that solve the problem encountered with the situation of FIG. 48 will be described with reference to FIG. 49.

FIG. 49 illustrates an embodiment of solving the problem encountered with the case of FIG. 48. In FIG. 49, an embodiment of a LOS mode in the situation illustrated in FIG. 48 is illustrated. The LOS mode refers to a mode in which a mobile terminal provides only information about controlled devices visible to a user or only information about controlled devices in the same area as the mobile terminal.

Referring to FIG. 49(*a*), a mobile terminal 3500 according to an embodiment of the present invention and a controlled (pre-registered) A device 3510 are co-located in the same area. Further, a B device 3520 is located in a different area from the A device 3510 and a wall exists between the A device 3510 and the B device 3520. Therefore, the B device 3520 is not visible to a user of the mobile terminal 3500. However, the mobile terminal 3500 may recognize both the A device 3510 and the B device 3520 using location information, etc. and determine the relative locations of the A device 3510 and the B device 3520 (e.g., a bedroom, a living room, etc.). The mobile terminal 3500 may recognize both the A device 3510 and the B device 3520 according to a pointing direction and distance measurement of the mobile terminal 3500.

Because the LOS mode is assumed in FIG. 49, it is not necessary to display even the B device invisible to the user. Thus, the mobile terminal 3500 displays only a graphic image needed to control the A device 3510 as illustrated in FIG. 49(*b*). If the A device 3510 is a TV, a graphic image 3501 illustrated in FIG. 49(*b*) restrictively includes only options configured to control the TV (e.g., channel up/down, volume up/down, etc.).

FIG. 50 illustrates another embodiment of overcoming the problem encountered with the case of FIG. 48. FIG. 50 illustrates an embodiment of the NLOS mode in the situation of FIG. 48. The NLOS mode refers to a mode in which a mobile terminal according to an embodiment of the present invention provides information about controlled devices invisible to a user as well as information about controlled devices visible to the user, or information about invisible controlled devices as well as information about controlled devices in the same area as the mobile terminal.

Referring to FIG. 50(*a*), a mobile terminal 3600 according to an embodiment of the present invention and a controlled (pre-registered) A device 3610 are co-located in the same area. Further, a B device 3620 is located in a different area from the A device 3610 and a wall exists between the A device 3610 and the B device 3620. Therefore, the B device 3620 is not visible to a user of the mobile terminal 3600. Therefore, a user of the mobile terminal 3600 may not see the B device 3620. It may occur that it is necessary to control even neighboring devices in a different area.

Compared to FIG. 49, the NLOS mode is assumed in FIG. 50. Accordingly, it is necessary to display even the B device in an area invisible to the user. Thus, the mobile terminal 3600 displays a graphic image needed to control both the A device 3610 and the B device 3620 as illustrated in FIG. 50(*b*). If the A device 3610 is a TV and the B device 3620 is a refrigerator, a graphic image 3601 illustrated in FIG. 50(*b*) includes all of options configured to control the TV (e.g., channel up/down, volume up/down, etc.) and options configured to control the refrigerator (e.g., power on/off, temperature control, etc.). That is, icons representing devices located in a path pointed by the mobile terminal are displayed and that with perspective according to the distances between the mobile terminal 3600 and the A device 3610 and the B device 3620, which falls into the scope of the present invention.

In a comparison between FIGS. 49(*a*) and 50(*a*), the LOS mode may be triggered by an action of placing the mobile terminal 3500 in parallel to the ground and the NLOS mode may be triggered by an action of placing the mobile terminal 3500 perpendicularly to the ground. This operation may be performed by a 9-axis sensor, etc. and by a motion other than a rotation angle, a touch signal, a key input, etc. which falls into the scope of the present invention.

FIG. 51 illustrates another embodiment of solving the problem encountered with the case of FIG. 48. FIG. 51 may be pursuant to the description of FIG. 49. However, it is assumed that a specific area is not set for each of an A device and a B device illustrated in FIG. 51(*a*). Referring to FIG. 51(*a*), all of a mobile terminal 3700 according to an embodiment of the present invention, a controlled (pre-registered) A device 3710, and a controlled (pre-registered) B device 3720 are located in front of a wall 3730. The mobile terminal 3700 may calculate the distance to each device based on location information about the device.

In FIG. 51, the LOS mode is assumed. A user of the mobile terminal 3700 may have difficulty in recognizing the B device relatively far from the user and want to control only the A device (i.e., the nearest device). Therefore, the mobile terminal 3700 outputs only a graphic image needed to control the nearest A device 3710, as illustrated in FIG. 51(*b*).

FIG. 52 illustrates another embodiment of solving the problem encountered with the case of FIG. 48. FIG. 52 may be pursuant to the description of FIG. 50. However, it is assumed that a specific area is not set for each of an A device and a B device illustrated in FIG. 52(*a*). Referring to FIG. 52(*a*), all of a mobile terminal 3800 according to an embodiment of the present invention, a controlled (pre-registered) A device 3810, and a controlled (pre-registered) B device 3820 are located in front of a wall 3830. The mobile terminal 3800 may calculate the distance to each device based on location information about the device.

In FIG. 52, the NLOS mode is assumed. A user of the mobile terminal 3800 may have difficulty in recognizing the B device 3820 relatively far from the user and want to control the relatively farthest B device 3820 as well as the A device 3810 (i.e., the nearest device). Therefore, the mobile terminal 3801 outputs a graphic image needed to control both the nearest A device 3810 and the farthest B device 3820, as illustrated in FIG. 52(*b*).

Figure 53:
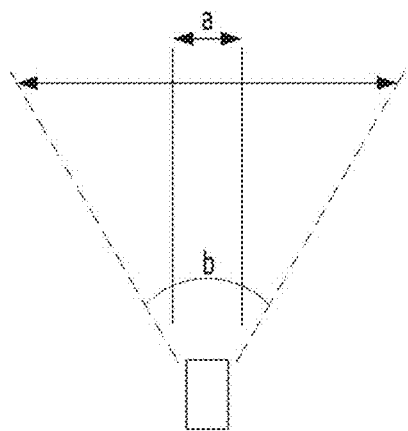
FIG. 53 illustrates a device selection range from which a mobile terminal may select a controlled device and a device recognition range from which the mobile terminal may recognize a controlled device according to an embodiment of the present invention.

FIG. 53 illustrates a device selection range from which a mobile terminal may select a controlled device and a device recognition range from which the mobile terminal may recognize a controlled device according to an embodiment of the present invention. As described before, a specific device may be selected according to a pointing direction of the mobile terminal according to the embodiment of the present invention. In FIG. 53, two ranges perceivable to the mobile terminal according to the embodiment of the present invention will be defined.

Referring to FIG. 53, a device selection range a from which the mobile terminal may select a specific device and a device recognition range b from which the mobile terminal may recognize a device to be displayed on its screen are defined separately. Therefore, while icons representing a plurality of devices recognized in the range B are all displayed on the screen of the mobile terminal, a specific device recognized from the range a is displayed highlighted according to one aspect of the present invention. This will be described with reference to FIGS. 54, 55, and 56.

Figure 54:
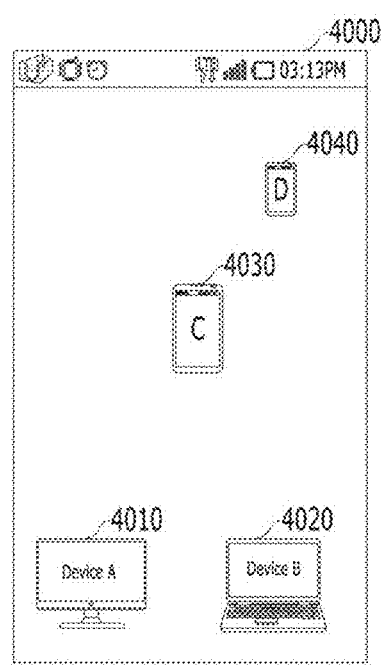
FIG. 54 illustrates a graphic image that a mobile terminal outputs, when a plurality of perceivable controlled devices exist in FIG. 53 according to an embodiment of the present invention.

FIG. 54 illustrates an graphic image that a mobile terminal outputs, when a plurality of perceivable controlled devices exist in FIG. 53 according to an embodiment of the present invention. Referring to FIG. 54, a mobile terminal 4000 displays icons 4010, 4020, 4030, and 4040 representing all devices recognized from the range b illustrated in FIG. 53. Particularly, the icon 4010 representing a specific A device recognized from the range a of FIG. 53 may be displayed highlighted. The icons may be pre-stored in a management server, etc. or may be image data captured by a camera of the mobile terminal. Further, the positions and sizes of the icons illustrated in FIG. 54 are determined in consideration of actual distances between the mobile terminal 4000 and the devices represented by the icons.

Figure 55:
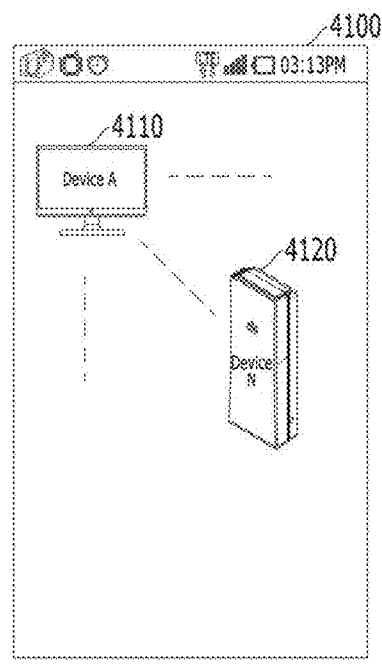
FIG. 55 illustrates another graphic image that a mobile terminal outputs, when a plurality of perceivable controlled devices exist in FIG. 53 according to an embodiment of the present invention.

FIG. 55 illustrates another graphic image that a mobile terminal outputs, when a plurality of perceivable controlled devices exist in FIG. 53 according to an embodiment of the present invention. Referring to FIG. 55, a mobile terminal 4100 displays icons 4110 and 4120 representing all devices recognized from the range b illustrated in FIG. 53. Particularly, the icon 4110 representing a specific A device recognized from the range a of FIG. 53 may be displayed highlighted. Compared to FIG. 55, the icons are displayed in the same size with no regard to the actual position of each device. While not shown in FIGS. 54 and 55, at least one of the sizes or positions of icons (corresponding to controlled devices) displayed on the mobile terminal is changed based on access histories of the controlled devices, which falls into the scope of the present invention.

Figure 56:
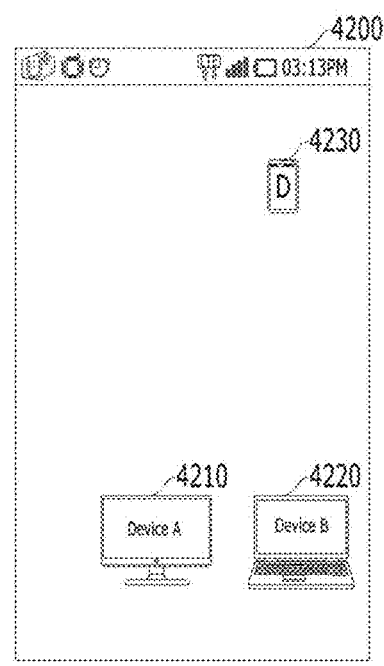
FIG. 56 illustrates another graphic image that a mobile terminal outputs, when a plurality of perceivable controlled devices exist in FIG. 53 according to an embodiment of the present invention.

FIG. 56 illustrates another graphic image that a mobile terminal outputs, when a plurality of perceivable controlled devices exist in FIG. 53 according to an embodiment of the present invention. The position of each device is indicated as much realistically as possible in FIG. 54 and the size of each device is equal without any consideration in FIG. 55.

Further, the graphic image illustrated in FIG. 56 is designed to enhance user convenience. That is, a mobile terminal 4200 displays an icon 4210 representing a specific device recognized from the range a of FIG. 53 at a predetermined position in FIG. 56. That is, although the actual position of each device is not considered, the position of the device recognized from the range a of FIG. 53 is used as a reference. The predetermined position corresponds to the center of the screen of the mobile terminal 4200 unlike FIG. 56, which falls into the scope of the present invention.

Further, icons representing other devices may be disabled so that the user can not select them. While selection of the specific A device 4210 may be indicated visually, the selection of the specific device 4210 may be indicated explicitly to the user by outputting audio data (an audio alarm) or vibrations. While not shown in FIG. 56, a feedback signal is output from the selected A device 4210 as well as from the mobile terminal 4200, which falls into the scope of the present invention. For example, if the A device 4210 is a light, it is configured to blink temporarily.

FIG. 57 illustrates a graphic image that a mobile terminal outputs, when a plurality of perceivable controlled devices exist in the same indoor area in FIG. 53 according to an embodiment of the present invention. In FIGS. 54, 55, and 56, a specific device recognized from the range a of FIG. 53 is displayed highlighted. In contrast, a graphic image may be output irrespective of devices recognized from the range a of FIG. 53 in FIGS. 57 and 58.

Referring to FIG. 57(*a*), a mobile terminal 4300 recognizes a plurality of devices 4310, 4320, and 4330 from the range b of FIG. 53. Referring to FIG. 57(*b*), the mobile terminal 4300 displays icons representing the recognized devices differentially. A C device 4331 is a previous device controlled by a user, a most frequently accessed device, or a device controlled for the longest time. In contrast, an A device 4311 is a device that has been accessed second-most frequently or controlled for a second-longest time. A B device 4321 is a device that has been accessed least frequently or controlled for a shortest time. That is, the size of an icon representing each device is automatically changed according to the above criterion, as illustrated in FIG. 57(*b*).

Figure 58:
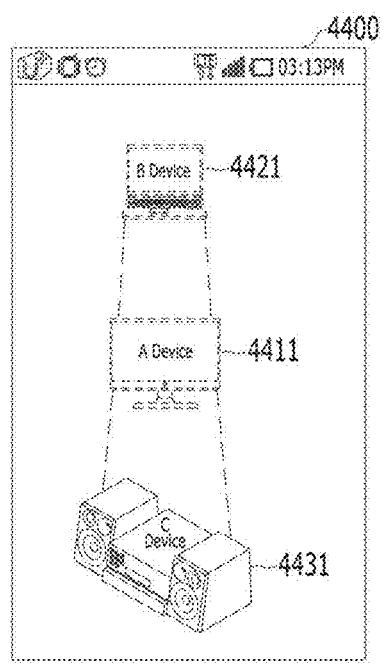
FIG. 58 illustrates an example of FIG. 57, particularly based on FIG. 57(*a*).

FIG. 58 illustrates an example of FIG. 57, particularly based on FIG. 57(*a*). Referring to FIG. 58, a mobile terminal 4400 according to an embodiment of the present invention sequentially displays an icon 4431 representing a C device, an icon 4411 representing an A device, and an icon 4421 representing a B device. The display order is changed according to the actual distances between the devices and the mobile terminal 4400.

Figure 59:
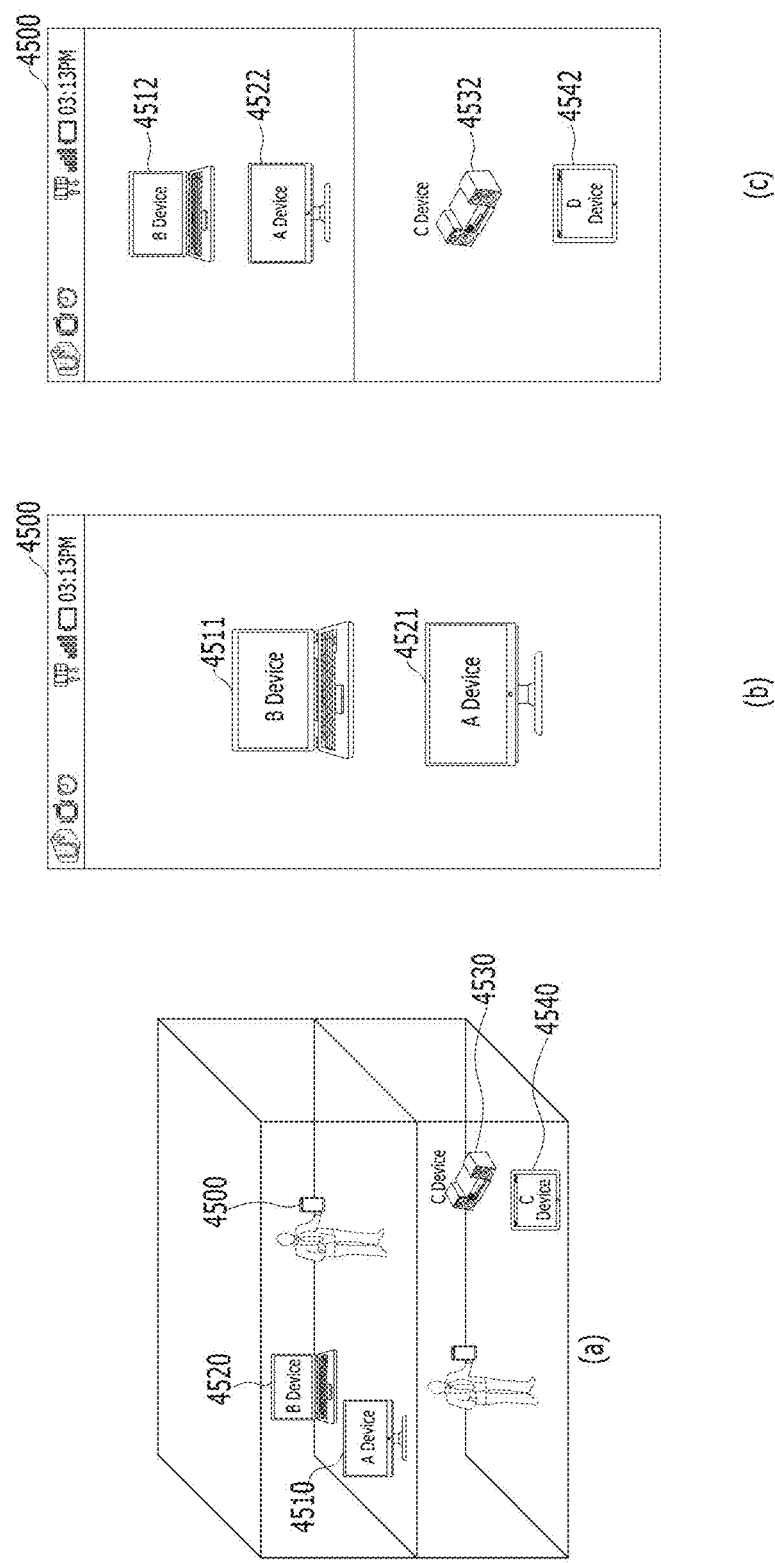
FIG. 59 illustrates a graphic image that a mobile terminal outputs, when controlled devices are located in different indoor areas (particularly, at different heights).

FIG. 59 illustrates an graphic image that a mobile terminal outputs, when controlled devices are located in different indoor areas (particularly, at different heights). Referring to FIG. 59(*a*), it is assumed that a mobile terminal 4500 is located in a 2-story building. A C device 4530 and a D device 4540 are located on the first floor and an A device 4510 and a B device 4520 are located on the second floor. As described before, since the 3D location information of each device is recorded, the mobile terminal 4500 may distinguish devices on the same floor as the mobile terminal 4500 from devices on different floors by communicating with an anchor device and a management server. Especially, it is assumed that the mobile terminal 4500 is located on the second floor.

There are two methods for displaying icons representing devices controllable by the mobile terminal 4500, that is, the LOS mode and the NLOS mode. FIG. 59(*b*) illustrates an embodiment of the LOS mode. The mobile terminal 4500 displays an icon 4511 representing the A device and an icon 4521 representing the B device on the same floor as the mobile terminal 4500, that is, on the second floor. Therefore, a user may identify and control devices within his or her field of vision using the mobile terminal 4500.

FIG. 59(*c*) is an embodiment of the NLOS mode. That is, the mobile terminal 4500 displays an icon 4532 representing a C device and an icon 4542 representing a D device on another floor (first floor) as well as an icon 4512 representing the A device and an icon 4522 representing the B device on the current floor (second floor). Therefore, the user can identify and control devices within and beyond his or her field of vision using the mobile terminal 4500.

Figure 60:
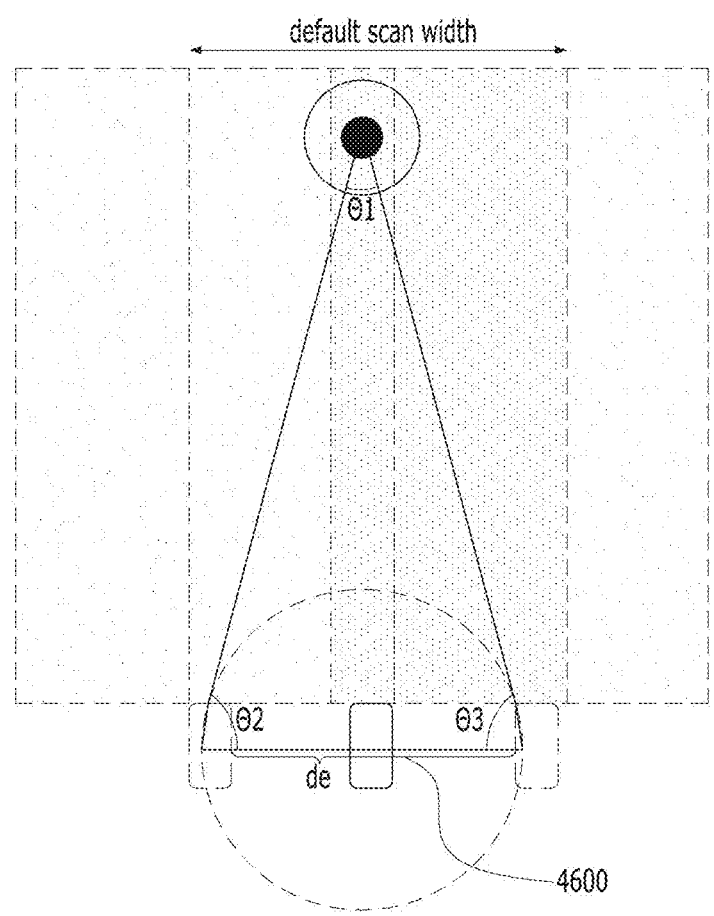
FIG. 60 illustrates an operation for correcting a location error by a mobile terminal according to an embodiment of the present invention.

FIG. 60 illustrates an operation for correcting a location error by a mobile terminal according to an embodiment of the present invention. Referring to FIG. 60, a mobile terminal 4600 may produce a slight location error due to movement of a user. To reduce the location error, a method for setting a scan zone for the mobile terminal 4600 will be provided.

$$\theta 2 = \theta 3 \quad \text{(Equation 1)}$$

$$\theta 1 = 180 - 2^*\theta 2 \quad \text{(Equation 2)}$$

$$\theta 2 = \cos^{-1}\left(\frac{\frac{d_e}{2}}{r}\right) * 180/\pi \quad \text{(Equation 3)}$$

Now, a description will be given of a method for setting a scan zone by (Equation 1), (Equation 2), and (Equation 3). De is a value fixed by an IPS. As r is shorter, $\Theta_1$ is larger. Thus, when the mobile terminal points at a nearby target, a rotation angle increases, thus increasing an error probability.

To avert this problem, a default scan width used during scanning is preferably set to a value larger than a location error of the IPS. It is preferred to set the position size of a target device to a default value. Accordingly, wrong recognition of a target device may be reduced despite an angle error. In the presence of a plurality of nearby targets, all of the targets are displayed on the screen of the mobile terminal.

Figure 61:
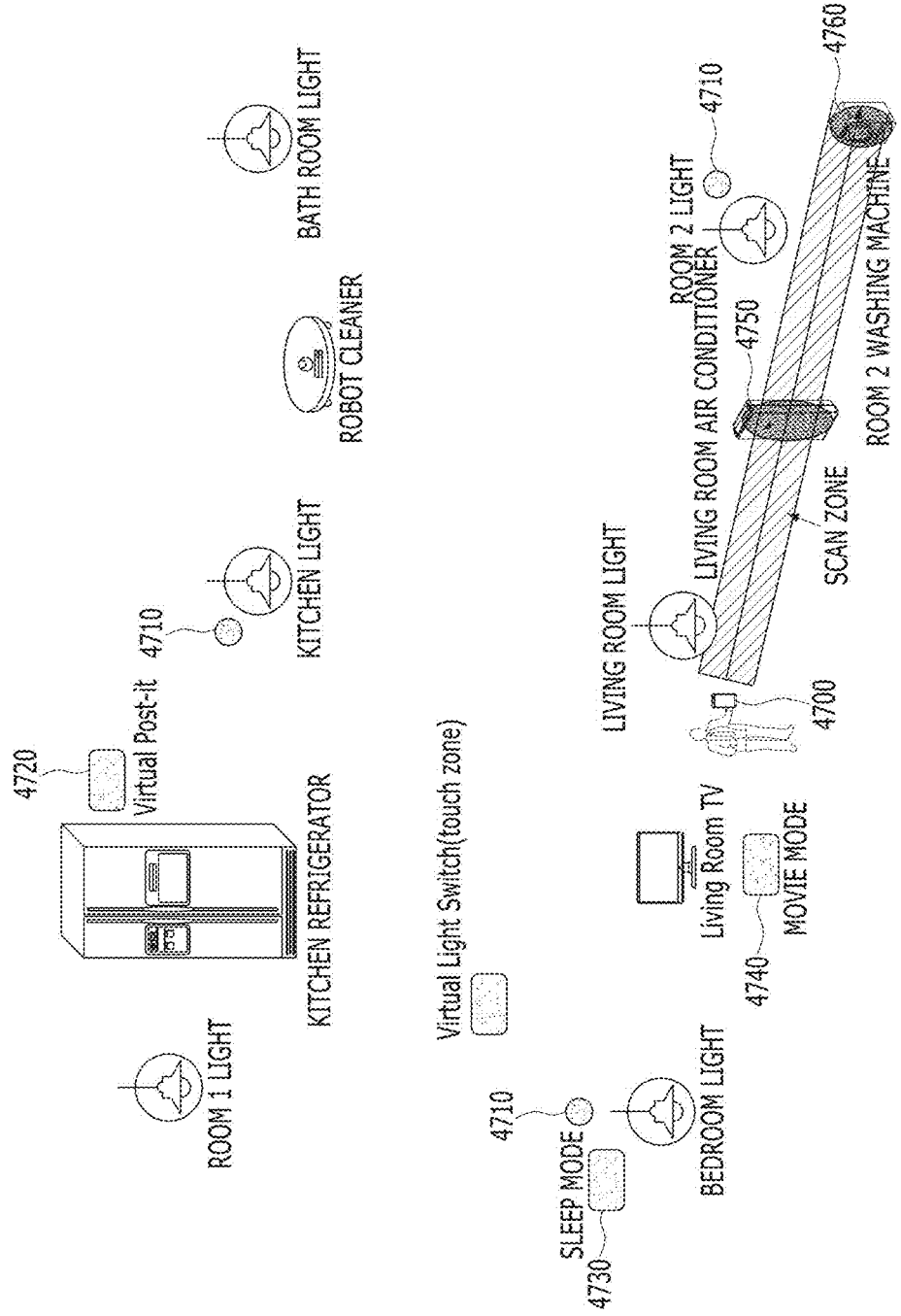
FIG. 61 illustrates a scenario in which a mobile terminal is used indoors according to an embodiment of the present invention.

FIG. 61 illustrates a scenario in which a mobile terminal is used indoors according to an embodiment of the present invention. FIG. 61 illustrates a method for controlling a plurality of indoor devices using a mobile terminal. It is assumed that three IPS anchor devices 4710 are located indoors. Therefore, the locations of a mobile terminal 4700 and each device may be determined preliminarily. For example, location information about a light, a TV, a refrigerator, a robot cleaner, an air conditioner, a washing machine, etc. is pre-registered using the mobile terminal 4700 and the IPS anchor devices 4710 and stored in the mobile terminal 4700 or a management server.

Further, virtual objects may be set according to the location and (pointing) direction of the mobile terminal, while they do not exist actually, as described before. For example, in the case where information indicating that the mobile terminal 4700 points in a specific direction (e.g., toward a ceiling) and a command corresponding to the information (e.g., a sleep mode 4730 and light turn-off) are pre-stored in the management server, if the mobile terminal 4700 points at the ceiling at the same location (a bedroom), the light is automatically turned off. That is, there is no need for pointing the mobile terminal 4700 at the actual light.

In another example, in the case where information indicating that the mobile terminal 4700 points in a specific direction (e.g., toward a ceiling) in a living room and a command (e.g., a virtual post-it mode 4720 and display of a predetermined message) corresponding to the information are pre-stored in the management server by mapping them, when the mobile terminal 4700 points at the ceiling at the same location (i.e., in the living room), the predetermined message is automatically displayed. That is, there is no need for reading a predetermined message attached onto a refrigerator in front of the refrigerator.

If the mobile terminal 4700 points in a direction, both an air conditioner 4750 and a washing machine 4760 included in a scan zone may be identified. Since the washing machine 4760 is located in room 2 other than the living room in which the mobile terminal 4700 is located, the user can not see the washing machine 4760. However, the mobile terminal 4700 has location information about each device and thus may determine the presence of the washing machine 4760 in a different area as well as the air conditioner 4750 in the scan zone matching the pointing direction.

Figure 62:
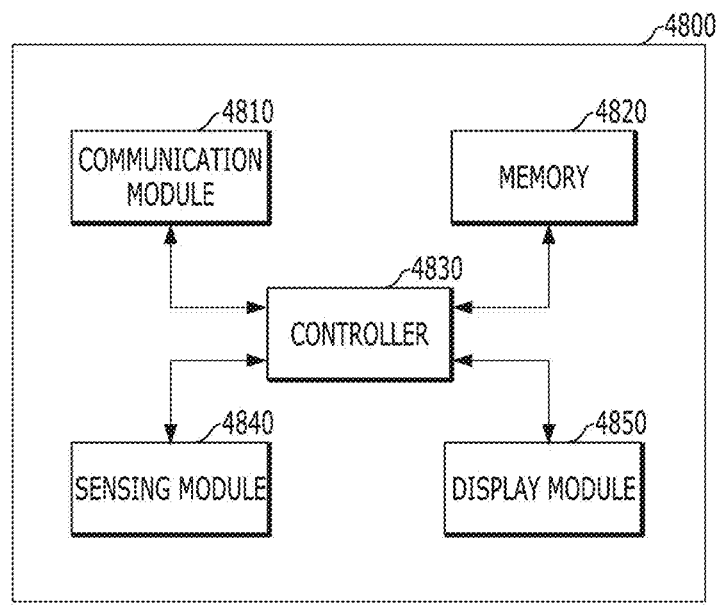
FIG. 62 is a block diagram illustrating components of a mobile terminal according to an embodiment of the present invention.

FIG. 62 is a block diagram illustrating components of a mobile terminal according to an embodiment of the present invention. Those skilled in the art may understand FIG. 62 additionally referring to the afore-described drawings and the present invention may be implemented without some modules, which falls into the scope of the present invention.

Referring to FIG. 62, a mobile terminal 4800 includes a communication module 4810, a memory 4820, a controller 4830, a sensing module 4840, and a display module 4850. The communication module 4810 starts to establish communication connections with a plurality of reference devices, for a location-based service and the memory 4820 registers identification information about devices to be controlled.

The controller 4830 generates a graphic image corresponding to at least one device belonging to a specific group from among devices registered in the memory 4820 based on location/direction information about the mobile terminal 4800 and location information about the devices registered in the memory 4820. The display module 4850 displays the generated graphic image in a predetermined area.

According to another embodiment, the controller 4830 groups devices at a location corresponding to the direction information about the mobile terminal 4800 into a specific group. The direction information refers to a direction in which, for example, a part of the mobile terminal 4800 points. Further, the specific group is divided into a first sub-group of devices at a location corresponding to the location information about the mobile terminal and a second sub-group of devices at a location that does not match the location information about the mobile terminal. For example, information about divided indoor locations (e.g., a living room, a bedroom, a bath room, etc.) may be used as group information.

According to another embodiment, if the sensing module 4840 senses a first action of the mobile terminal 4800, the controller 4830 considers only the first sub-group to be the specific group. If the sensing module 4840 senses a second action of the mobile terminal 4800, the controller 4830 considers only the second sub-group to be the specific group. The sensing module 4840 may be configured with, for example, a 9-axis sensor.

If the specific group includes a plurality of devices, the controller 4830 accesses the memory 4820, acquires use history information from the memory 4820, and changes the size of a graphic image (e.g., an icon) corresponding to each device according to the acquired information. The communication module 4810 transmits at least one of an ID of the device or location information about the device and receives at least one of an icon representing the device or information about a communication connection scheme of the device from the server. The server may be, for example, the afore-described management server.

The direction information about the mobile terminal 4800 may be determined according to a point at which one side surface of the mobile terminal points, as sensed by the sensing module 4840.

Figure 63:
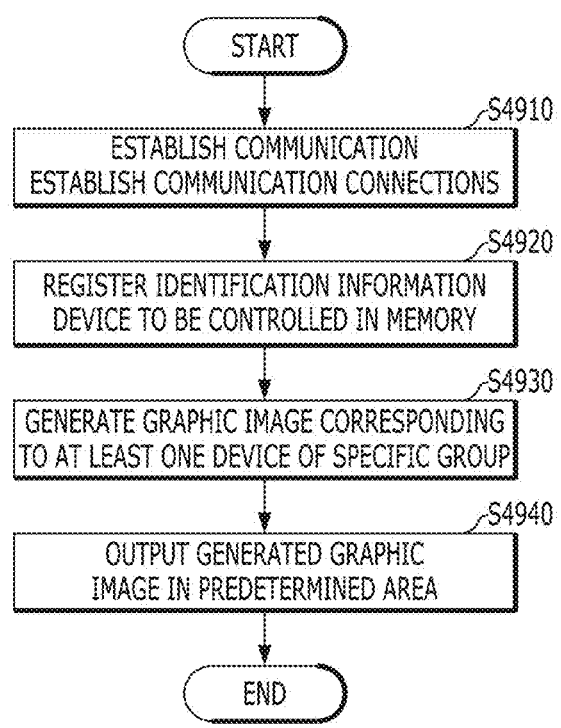
FIG. 63 is a detailed flowchart illustrating a method for controlling a mobile terminal according to an embodiment of the present invention.

FIG. 63 is a detailed flowchart illustrating a method for controlling a mobile terminal according to an embodiment of the present invention. The method for controlling a mobile terminal according to the embodiment of the present invention includes step S4910 for starting to establish communication connections with a plurality of reference devices, for a location-based service, step S4920 for registering identification information about devices to be controlled in a memory, step S4930 for generating a graphic image corresponding to at least one device belonging to a specific group from among the devices registered in the memory based on location/direction information about the mobile terminal and location information about the devices registered in the memory, and step S4940 for displaying the generated graphic image in a predetermined area.

According to another embodiment, the generation step S4930 includes grouping devices at a location corresponding to the direction information about the mobile terminal into a specific group. According to another embodiment, if a sensing module of the mobile terminal senses a first action of the mobile terminal, only a first sub-group is considered to be the specific group. If the sensing module of the mobile terminal senses a second action of the mobile terminal, only a second sub-group is considered to be the specific group. This has been described in greater detail with reference to FIGS. 49 and 50.

According to another embodiment, the step S4920 for registering devices to be controlled in the memory includes transmitting at least one of an ID of the device and location information about the device to the server and receiving at least one of an icon representing the device and information indicating a communication connection scheme of the device from the server.

The descriptions of FIGS. 1 to 63 are applicable to an IPS based on triangulation. For reference, a shortcoming with a Global Positioning System (GSP) is that the GPS does not operate in an indoor place where a satellite signal is not received. For example, although a smartphone with a GPS function may find the main gate of a big shopping mall, it may not find a specific store or a restroom inside the shopping mall. To solve this problem, an IPS has been introduced.

Most of IPS technologies based on Ultra WideBand (UWB), Wi-Fi, Bluetooth, etc. adopt triangulation for location measurement. The triangulation is performed using an anchor device (or reference device) serving as a reference location and a mobile terminal to be measured. In general, three or more reference devices serving as reference locations are needed for 2D location measurement and four or more reference devices serving as reference locations are needed for 3D location measurement.

For an Angle Of Arrival (AOA) algorithm, two or more reference devices are needed. The following description of the present invention with reference to FIG. 64 and the following drawings is also applicable to this case. Even though there is one reference device, it is possible to set an origin reference device by pointing the mobile terminal to the reference device.

Only when reference devices have knowledge of their own coordinates with respect to an origin, they may determine unique location relationships between the reference devices and the mobile terminal. Conventionally, physical measurement is required to acquire location information about each reference device. A problem encountered with this operation will be described in detail with reference to FIGS. 64 and 65.

In contrast, the coordinates of reference devices may be set rapidly using a 6-axis or 9-axis sensor of the mobile terminal according to an embodiment of the present invention, which will be described with reference to FIGS. 66 to 73.

Figure 64:
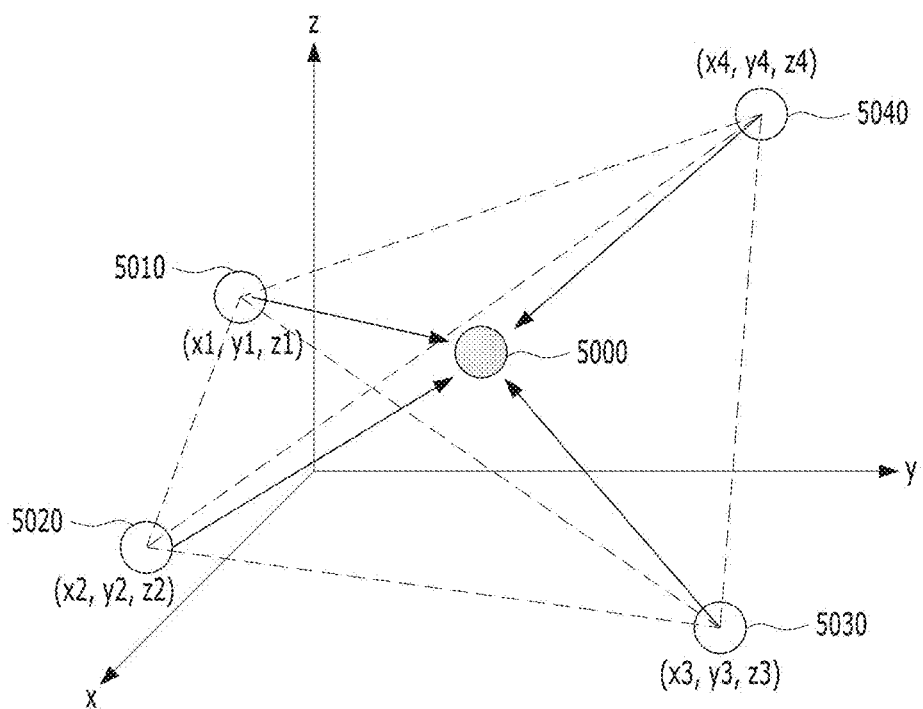
FIG. 64 illustrates an IPS based on triangulation.

FIG. 64 illustrates an IPS based on triangulation. In the illustrated case of FIG. 64, four reference devices (anchors or anchor devices) are required, for 3D location measurement. As stated before, three reference devices are sufficient for 2D location measurement. Referring to FIG. 64, to locate a mobile terminal 5000 in a home, the coordinates of reference devices 5010, 5020, 5030, and 5040 used in an IPS should be determined.

Conventionally, after a user or an expert actually measures the location of each reference device, the user or the expert should input the coordinates of the reference device.

For example, after the user or the expert actually measures the location of each reference device, the user or the expert should store the coordinates (x1, y1, z1) of the first reference device 5010, the coordinates (x2, y2, z2) of the second reference device 5020, the coordinates (x3, y3, z3) of the third reference device 5030, and the coordinates (x4, y4, z4) of the fourth reference device 5040 in the memory. As a result, location measurement accuracy is decreased and unnecessary time is taken. While each reference device may perform distance measurement through communication with other reference devices, this method also faces a problem. This will be described in detail with reference to FIG. 65.

Figure 65:
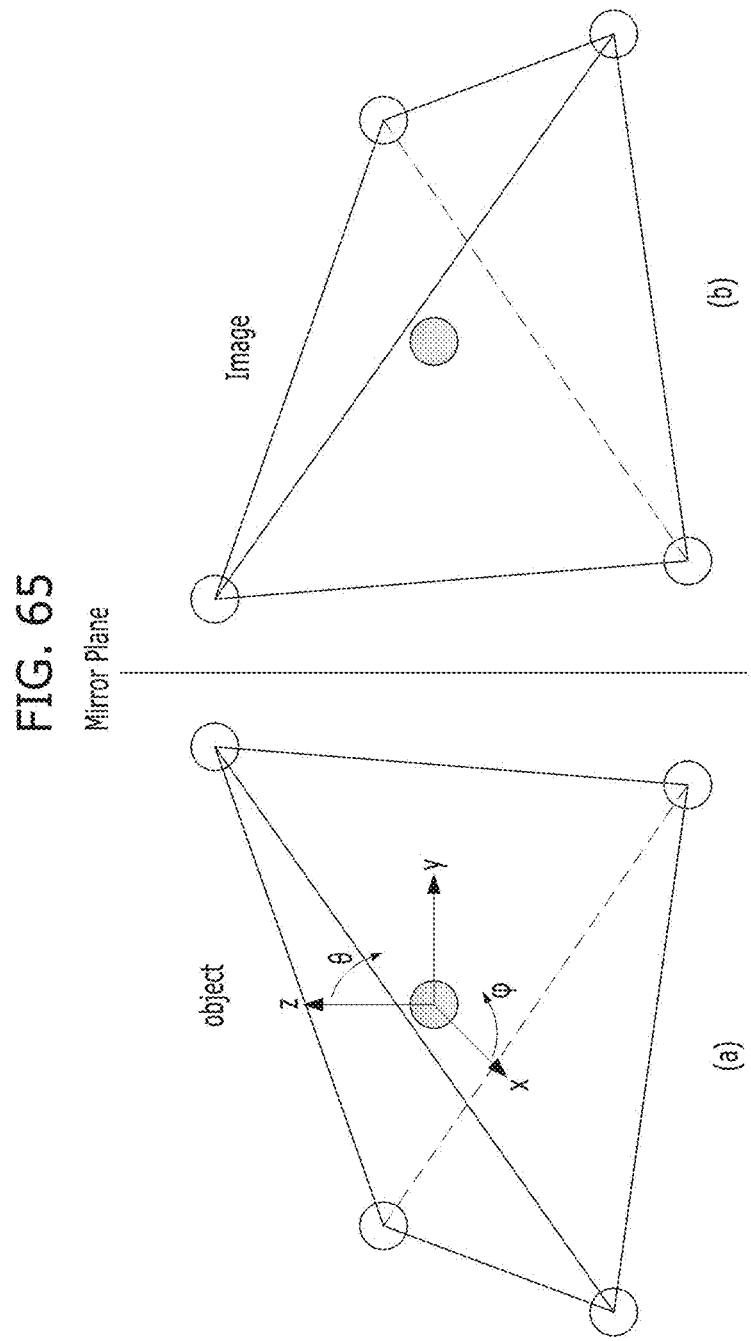
FIG. 65 is a view illustrating a problem with the conventional triangulation-based IPS illustrated in FIG. 64.

FIG. 65 is a view illustrating a problem with the conventional triangulation-based IPS illustrated in FIG. 64. As stated before, it is assumed that the distance between reference devices is calculated through communication between them. However, in the absence of information about the coordinates of the reference devices, the mobile terminal may not determine an accurate direction in which each reference device is located. Especially since the locations of a reference device and the mobile terminal are relative locations, there is no way to determine whether images formed by the reference devices are like images in (a) of FIG. 65 or images formed by a mirror plane in (b) of FIG. 65.

Further, in the absence of the coordinates of each reference, the mobile terminal may not determine a first angle with respect to a z axis and a second angle with respect to an x axis and may not determine rotation information based on the first and second angles. Due to the afore-described problems, there is a pressing need for a solution that enables even a non-expert to set location information about reference devices easily and rapidly in an IPS environment. This will be described with reference to FIGS. 66 to 73.

Figure 66:
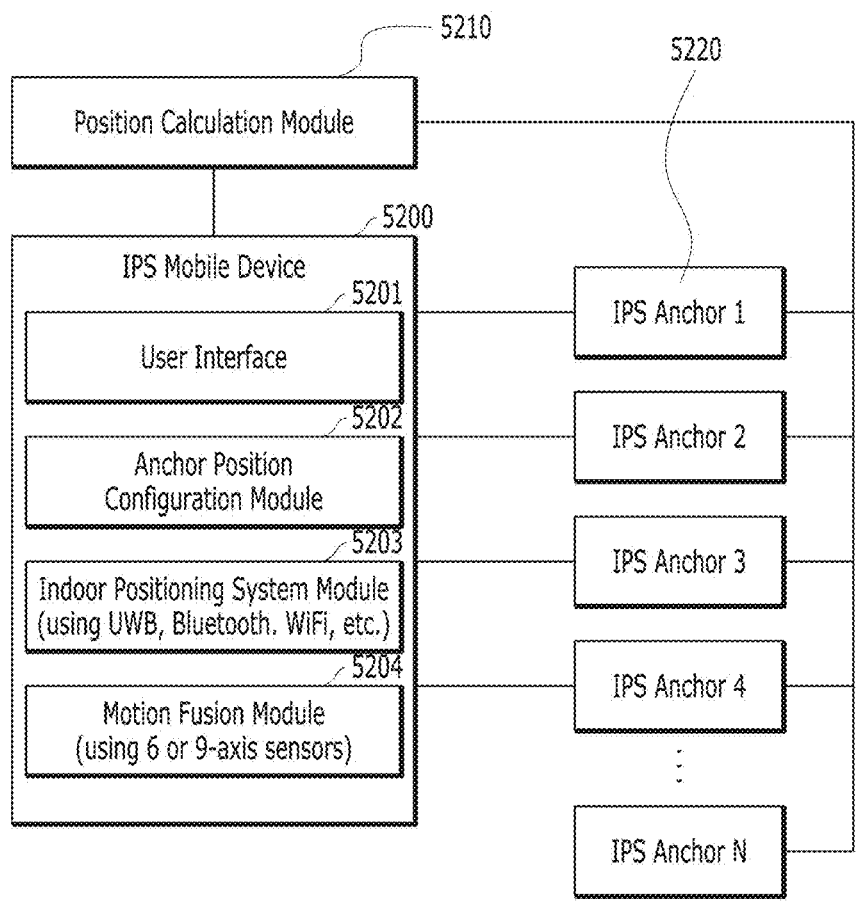
FIG. 66 is a block diagram illustrating components of a mobile terminal according to another embodiment of the present invention.

FIG. 66 is a block diagram illustrating components of a mobile terminal according to another embodiment of the present invention. Referring to FIG. 66, a mobile terminal 5200 is configured to communicate with a position calculation module 5210 and IPS reference devices 5220. The position calculation module 5210 calculates the locations of the mobile terminal 5200 and the reference devices 5220 in an IPS environment. The position calculation module 5210 may be configured as an independent entity such as a gateway, a server, etc. or may be incorporated into the mobile terminal 5200.

According to another embodiment, the mobile terminal 5200 includes a UI 5201, an anchor position configuration module 5202, an IPS module 5203, and a motion fusion module 5204. The IPS module 5203 operates, for example, in UWB, Bluetooth, Wi-Fi, etc. The motion fusion module 5204 includes, for example, a 6-axis sensor or a 9-axis sensor. The 6-axis sensor includes an acceleration sensor for recognizing a motion in space and a geomagnetic sensor for sensing directionality. The 9-axis sensor includes an inclination sensor in addition to the configuration of the 6-axis sensor.

The geomagnetic sensor is configured, for example, to identify the bearings, North, South, East, and West. The inclination sensor is configured to recognize a rotated or reclined state of the mobile terminal. The acceleration sensor is configured to recognize shaking or movement of the mobile terminal.

Therefore, the mobile terminal 5200 including the modules illustrated in FIG. 66 may calculate the locations of the reference devices 5220. The reference devices 5220 may communicate with each other and measure distances to other reference devices based on Time Of Arrival (TOA), Time Of Flight (TOF), RSSI, etc. FIG. 66 will be described in greater detail with reference to the flowchart of FIG. 67.

TOA and triangulation described herein will be detailed below. In the TOA scheme, the distance between a mobile terminal and a stationary device is determined by measuring the TOA of waves between them. A TOA may be calculated synchronously or asynchronously. In the synchronous scheme, a receiver and a beacon are synchronized in time and the beacon transmits a signal indicating an absolute current time to the receiver. Due to the time synchronization between the receiver and the beacon, the receiver may calculate an absolute time taken for signal arrival between the beacon and the receiver by measuring a reception time of the signal. Accordingly, the distance may be calculated based on the transmission rate and TOA of a known signal. Further, there is no need for time synchronization between a receiver and a beacon in the asynchronous scheme. The beacon records a current time and transmits a signal to the receiver immediately. The receiver returns the received signal to the beacon. If a time delay involved in returning the signal to the beacon is constant, the beacon may calculate the distance between the beacon and the receiver using the difference between the transmission time and reception time of the signal and the time delay of the receiver. TWR is a technique of enabling round-trip TOF measurement of a signal between two asynchronous receivers.

In the TWR distance measurement scheme, the distance between a transmitter and a receiver is measured based on the TOA and propagation speed of a signal transmitted from the transmitter to the receiver. The TWR distance measurement scheme is more accurate than a conventional RSSI-based scheme and uses an RF signal that is faster than an ultrasonic wave by about 900,000 times. These schemes are applicable between reference devices or between a reference device and a mobile terminal.

According to the triangulation-based location estimation scheme, the location of the mobile terminal is estimated by calculating the distances between the mobile terminal and three or more reference points (reference devices or anchor devices) with known coordinates. The distance between a reference point and the mobile terminal is calculated using a propagation characteristic value such as RSSI, etc.

Figure 67:
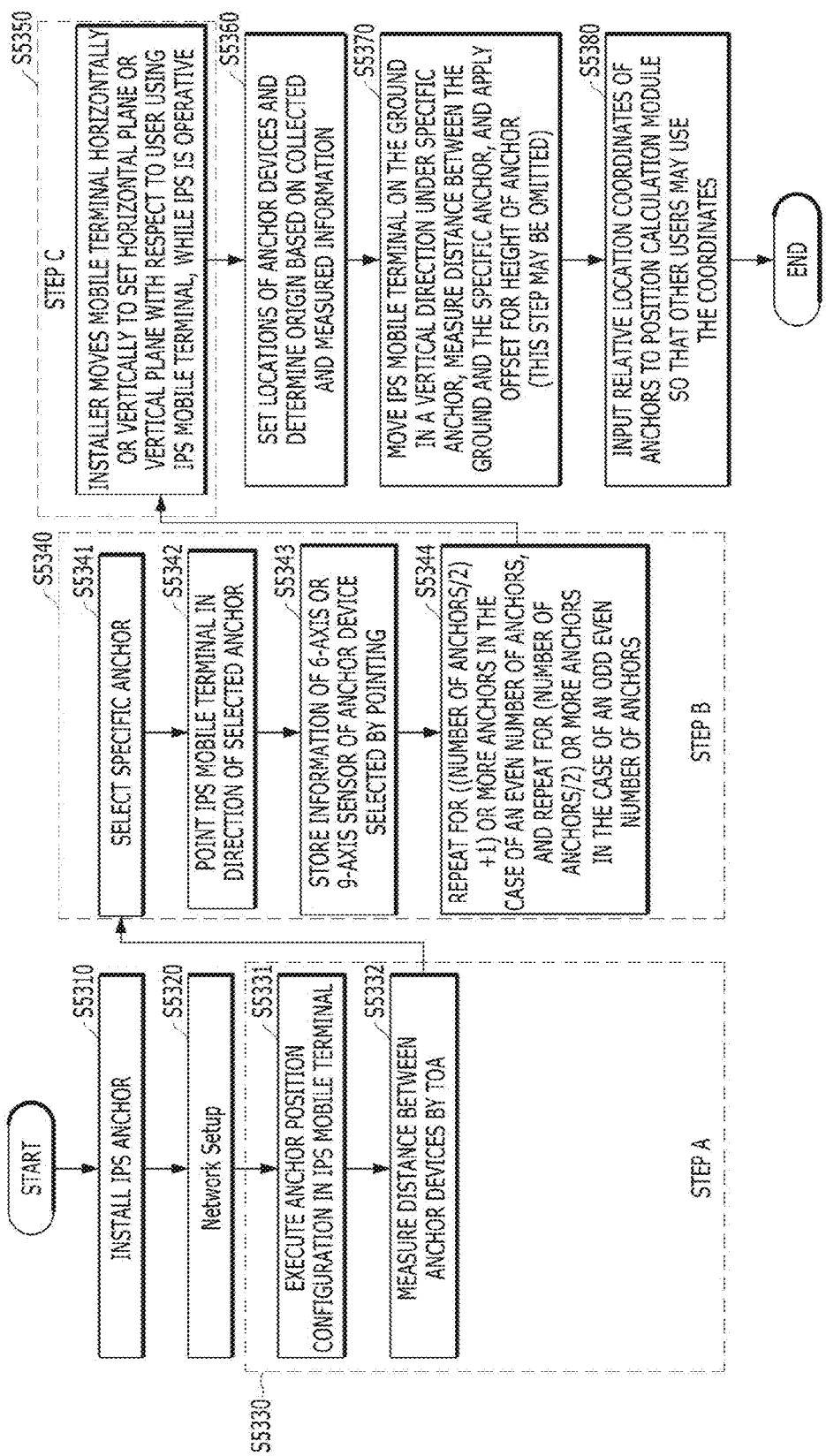
FIG. 67 is a flowchart illustrating a method for controlling a mobile terminal according to another embodiment of the present invention.

FIG. 67 is a flowchart illustrating a method for controlling a mobile terminal according to another embodiment of the present invention. FIG. 67 describes a method for more accurately calculating the locations of reference devices that have not been located in FIG. 65. Particularly, step B is a major feature of the present invention in FIG. 67. Enhancing the technical effects of the present invention by adding step C is another feature of the present invention.

Main steps (steps A, B, and C) of FIG. 67 will be described below. In step A, the distances between the reference devices illustrated in FIG. 65 are determined. The distances between the reference devices may be measured by a TOF or RSSI algorithm. After step A is completed, the reference devices define a polyhedron as illustrated in (b) of FIG. 68.

In step B, images formed by the mirror plane illustrated in FIG. 65 are removed and the rotation angle of each reference device with respect to a horizontal plane in a gravity direction and a magnetic North direction is determined. Step B may be performed using a 6-axis sensor or a 9-axis sensor of the mobile terminal. If a result of step B is within a predetermined error range, step C may be omitted. However, step C is correcting a rotation angle with respect to the gravity-direction horizontal plane more accurately. For example, if the distances between the reference devices are too large or each reference device is outside an LOS range, step C is needed to increase the accuracy of step B.

The operation order of steps A, B, and C illustrated in FIG. 67 is not limited to the alphabetical order. Rather, the operation order of steps A, B, and C may be changed by reordering some of the steps. Each step of FIG. 67 will be described in detail. Referring to FIG. 67, it is assumed that a plurality of reference devices are installed in a home (S5310). A network is setup so that each reference device may communicate with the mobile terminal (S5320).

Step A (S5330) of FIG. 53 includes steps S5331 and 5332, which will be described in detail with reference to FIG. 68. The mobile terminal executes an anchor position configuration function (S5331). The anchor position configuration function corresponds to a command for acquiring the coordinates of reference devices. The reference devices (or anchor devices) measure the distances between them by communicating with one another (S5332).

Step B (S5340) of FIG. 67 includes steps S5341. S5342, S5343, and S5344, which will be described in detail with reference to FIG. 69. A random reference device is selected using the mobile terminal (S5341). The mobile terminal points at the selected reference device (S5342). The mobile terminal stores the distance between the mobile terminal and the reference device by a TOF or RSSI algorithm in the memory and information sensed by a 6-axis or 9-axis sensor in the memory (S5343). It is possible to acquire information about the directionality of each reference device based on the information sensed by the 6-axis or 9-axis sensor and the distance information about the mobile terminal.

Another feature of step B is step S5344. It is possible to estimate the locations of all reference devices without repeating steps S5341, S5342, and S5343 for the reference devices. If an even number of reference devices reside in a home, steps S5341, S5342, and S5343 are repeated only for ((total number of reference devices/2)+1) reference devices, not for the remaining reference devices. Further, if an odd number of reference devices reside in the home, steps S5341, S5342, and S5343 are repeated only for (total number of reference devices/2) reference devices, not for the remaining reference devices, because it is assumed that distance information between the reference devices is known.

Step C (S5340) of FIG. 67 will be described in detail with reference to FIG. 70. Step C may be regarded as another embodiment of the present invention. The location of each reference device is determined based on data collected in the afore-described steps S5310 to S5350 (S5360). Further, the mobile terminal is placed on the ground in a vertical direction from a random reference device. Then the distance between the reference device and the mobile terminal placed on the ground is calculated and an offset is applied to the height of the reference device (S5370). This will be described in detail with reference to FIG. 71.

The location information about each reference device determined in steps S5310 to S5370 is shared with another mobile terminal or other devices through the location calculation module 5210 illustrated in FIG. 66.

Figure 68:
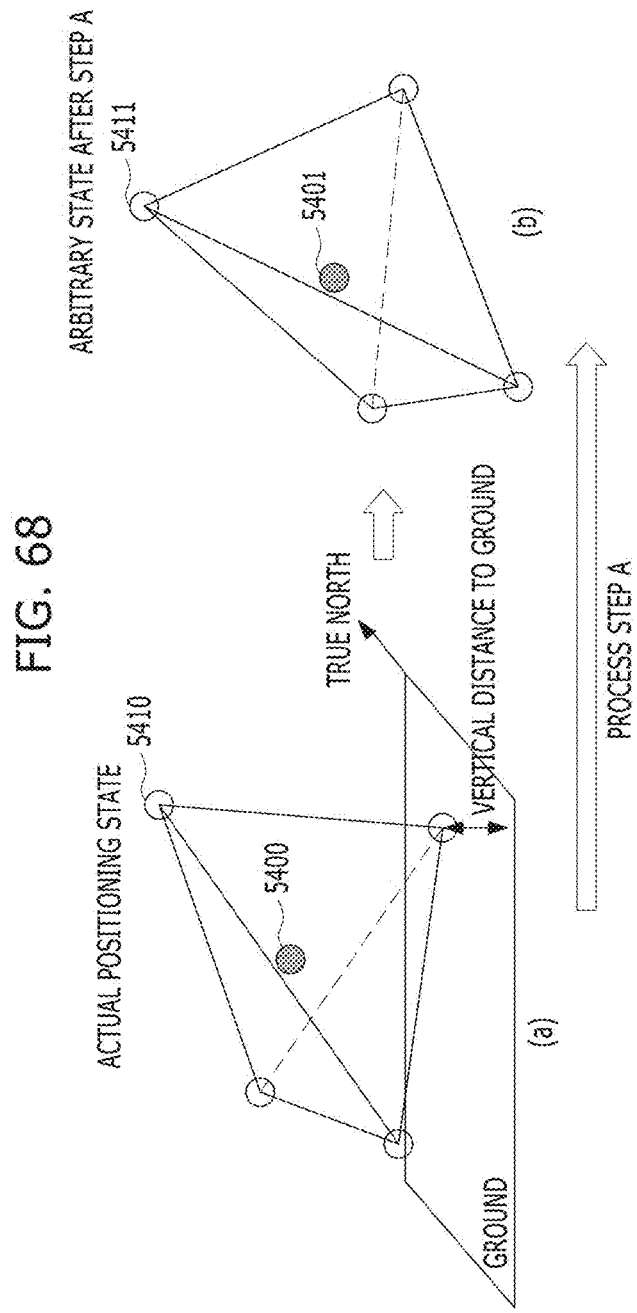
FIG. 68 is a view further describing step A illustrated in FIG. 67.

FIG. 68 is a view further describing step A illustrated in FIG. 67. Referring to FIG. 68(a), a reference device 5410 does not determine the distance between the reference device 5410 and another reference device before step A of FIG. 67. Accordingly, the reference device 5410 may not estimate a tetrahedron formed by a plurality of reference devices. Therefore, a mobile terminal 5400 does not determine the locations of the reference devices at all.

Further, if step A of FIG. 67 is performed, a reference device 5411 acquires information about a relative distance to another reference device as illustrated in FIG. 68(b). Thus, a virtual tetrahedron formed by the reference device 5411 in a home where a mobile terminal 5401 is located is determined, as illustrated in FIG. 68(b). However, the mobile terminal 5401 does not determine the accurate location of the reference device 5411 just with distance information between the reference devices (that is, no directionality is known due to the absence of rotation information), as stated before with reference to FIG. 65.

Figure 69:
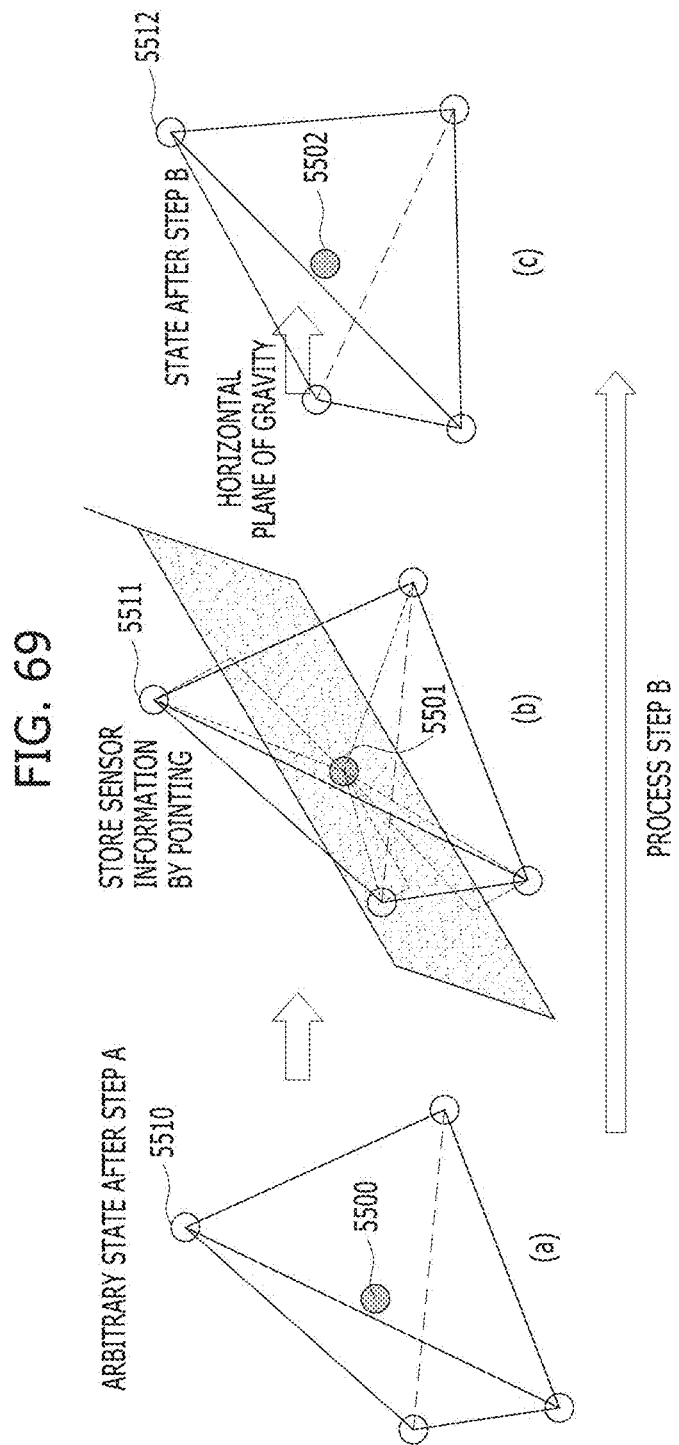
FIG. 69 is a view further describing step B of FIG. 67.

FIG. 69 is a view further describing step B of FIG. 67. FIG. 69(a) corresponds to FIG. 68(b). That is, a reference device 5510 illustrated in FIG. 69(a) may determine the distance to another reference device but a mobile terminal 5500 does not have information about the directionality of each reference device.

Therefore, the mobile terminal 5501 randomly points at a reference device 5511 and may determine the rotation state of the reference device 5511 with respect to a gravity direction and a magnetic North direction using a 6-axis or 9-axis sensor of the mobile terminal 5501, as illustrated in FIG. 69(b). That is, an image formed by the mirror plane illustrated in FIG. 65 is removed.

Finally, since a mobile terminal 5502 has information about the directionality of a reference device 5512 as well as information about the distance to the reference device 5512 as illustrated in FIG. 69(c), an actual object may be identified, instead of an image formed by the mirror plane illustrated in FIG. 65.

If the accuracy of the 6-axis or 9-axis sensor included in the mobile terminal 5502 is high, an error is small. Therefore, an image determined in FIG. 69(c) is almost identical to an actual object. However, if the accuracy of the 6-axis or 9-axis sensor included in the mobile terminal 5502 is relatively low, the image illustrated in FIG. 69(c) may be rotated slightly from the actual object. To solve this problem, an operation described later with reference to FIG. 70 (step C of FIG. 67) is needed.

Figure 70:
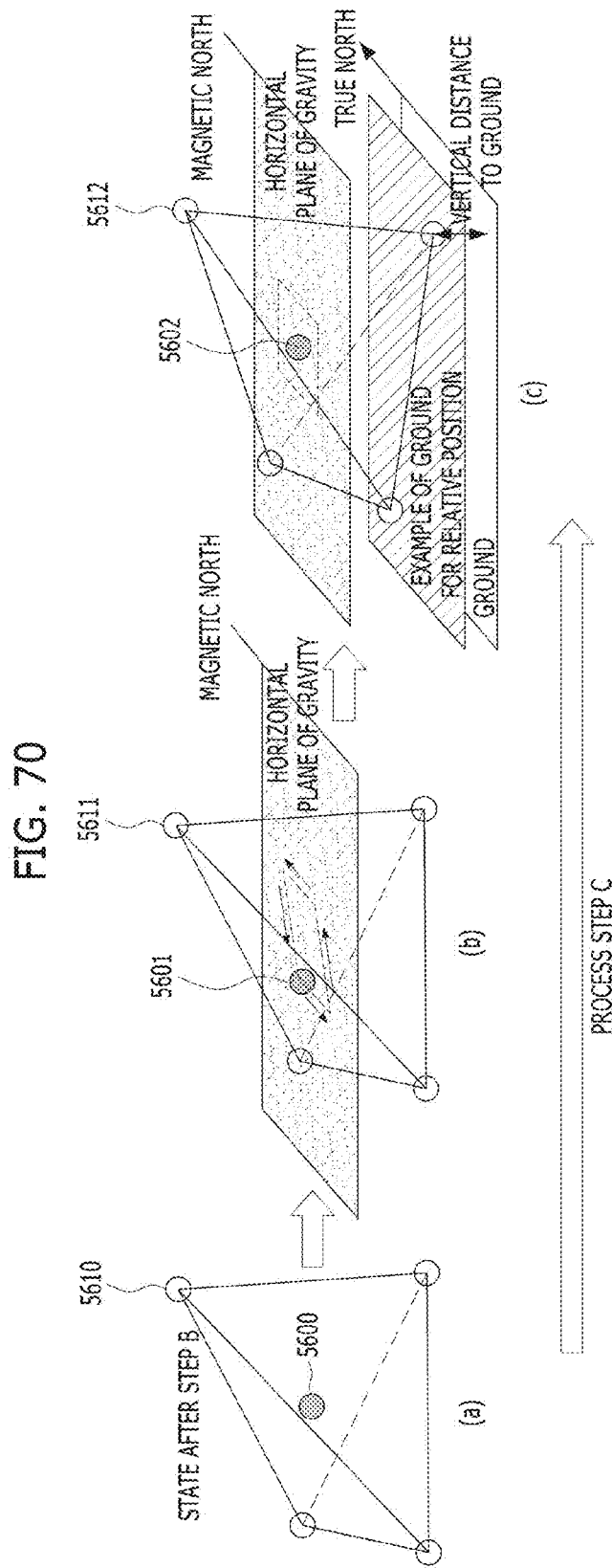
FIG. 70 is a view further describing step C of FIG. 67.

FIG. 70 is a view further describing step C of FIG. 67. As described before, if an error exceeds a predetermined error range after step B, step C may be performed. FIG. 70(a) corresponds to FIG. 69(b) and it is assumed that a reference device 5610 may communicate with a mobile terminal 5600. As illustrated in FIG. 70(b), a reference device 5611 is kept stationary, while a mobile terminal 5601 is parallel to the ground at a fixed height. For example, if the mobile terminal 5601 forms a plane (indicated by a dotted line) as illustrated in FIG. 70(b), the plane should be parallel to the ground or a horizontal plane. Otherwise, as much an inclination error as an angle difference is generated. Therefore, the angle between a mobile terminal 5602 and a reference device 5612 is adjusted by compensating for the angle difference, as illustrated in FIG. 70(c).

That is, a comparison between FIG. 70(b) and FIG. 70(c) reveals that a closed loop formed by the mobile terminal is perfectly parallel to the ground surface. While the plane formed by the mobile terminal is shown in FIG. 70 as a square, it may be modified to any other shape representing the horizontal plane, which falls into the scope of the present invention.

Figure 71:
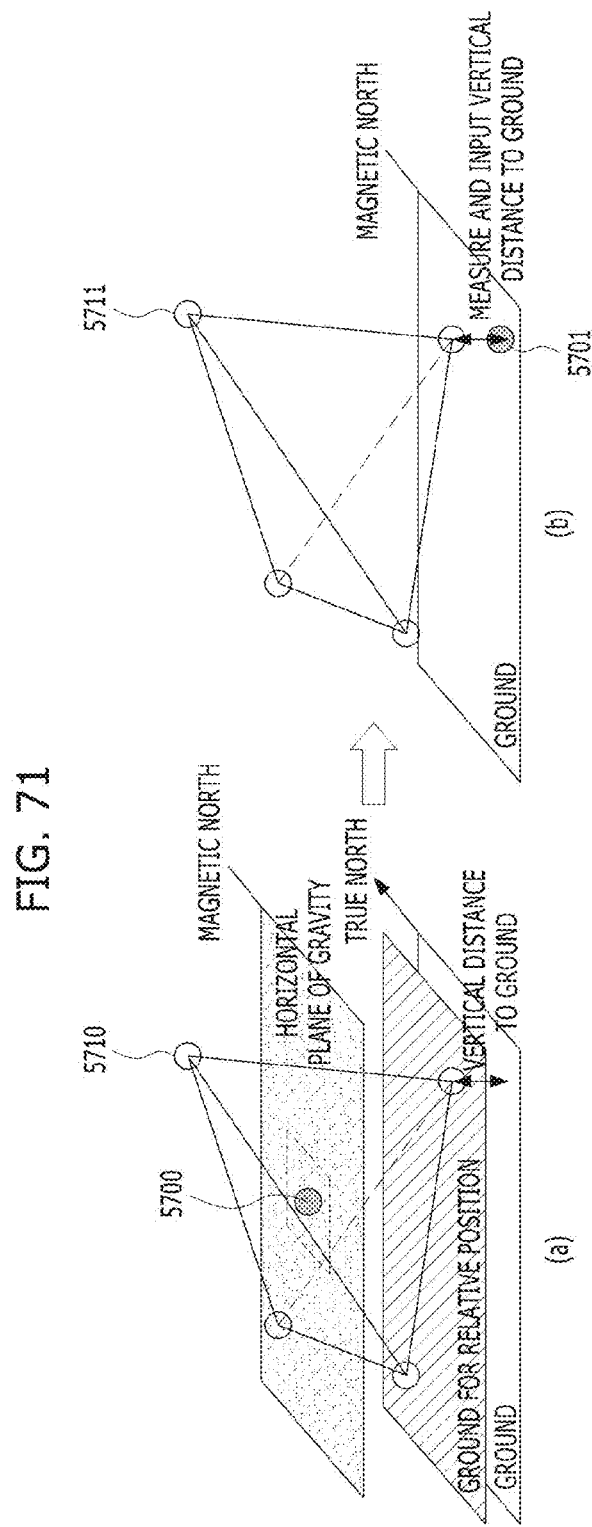
FIG. 71 is a view referred for further describing step S5370 of FIG. 67.

FIG. 71 is a view referred for further describing step S5370 of FIG. 67. FIG. 71(a) corresponds to FIG. 70(c). As illustrated in FIG. 71(a), a mobile terminal 5700 may collect data with a slight error in height information about a reference device 5710. To solve this problem, FIG. 71(b) is presented. Referring to FIG. 71(b), a mobile terminal 5701 is placed on the ground, specifically at a position vertically under a reference device 5711. Then an offset regarding the height from the ground is applied by measuring the distance between the reference device 5711 and the mobile terminal 5701.

It has been assumed in the foregoing drawings that at least three or four reference devices exist. If there is only one reference device, a mobile terminal having a 9-axis sensor may point at the reference device and the location of the reference device with respect to the magnetic North direction may be recorded based on the mobile terminal. Thus, the location of the reference device may be used in conjunction with other positioning systems such as geomagnetic finger printing. Even when two reference devices exist, an Angle Of Arrival (AOA)-based indoor positioning algorithm may be performed.

According to the finger printing method, when a user of a terminal capable of communicating with an Access Point (AP) enters an environment where the AP is installed, the strength of a signal from the AP is determined and compared with pre-stored signal strengths of reference points (or reference devices). Then the location of the AP is determined to be the location of a reference point with the most similar characteristic.

This finger printing method is divided into a training step for determining signal characteristics in a predetermined area and storing the determined signal characteristics in a DB and a positioning step for determining the location of an object based on the stored information. Before positioning, a pre-process for pre-defining areas, determining signal characteristics in each area, and storing the signal characteristics is needed and this operation should be repeated each time the environment of a positioning area is changed.

Despite these shortcomings, the finger printing method offers the benefits of less constraint from an ambient environment and higher positioning accuracy than a conventional modeling-based positioning method.

A deterministic finger printing method and a probabilistic finger printing method may be classified depending on what finger data is to be stored in a DB or how the data is to be used for positioning.

Figure 72:
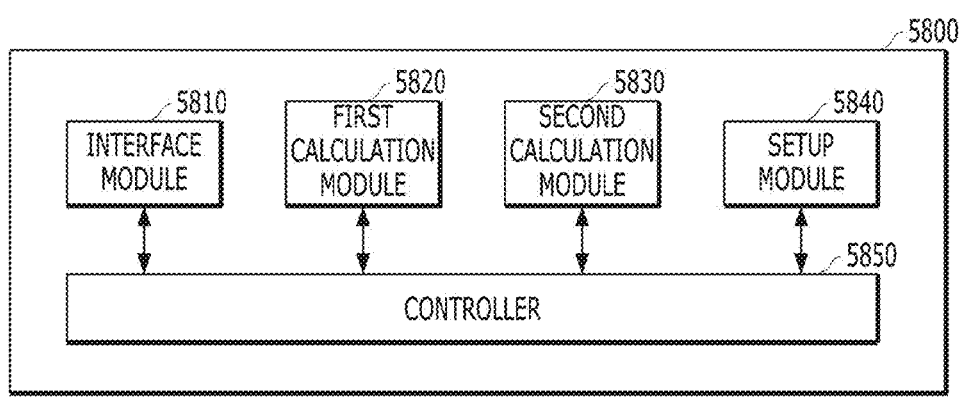
FIG. 72 is a block diagram illustrating components of a mobile terminal according to another embodiment of the present invention.

FIG. 72 is a block diagram illustrating components of a mobile terminal according to another embodiment of the present invention. Referring to FIG. 72, a mobile terminal 5800 includes an interface module 5810, a first calculation module 5820, a second calculation module 5830, a setup module 5840, and a controller 5850.

The interface module 5810 point at the direction of a random reference device from among a plurality of reference devices installed in a home. The interface module 5810 may be implemented as a component without any special communication means of the mobile terminal 5800 and has only to point. The first calculation module 5820 calculates the distance between the mobile terminal 5800 and the reference device, and the second calculation module 5830 calculates direction information about the reference device using a sensing module. The first and second calculation modules may be incorporated into one module and the sensing module may be, for example, a 6-axis or 9-axis sensor.

The controller 5850 controls repetition of the above steps in a restrictive manner according to the number of the plurality of reference devices installed in the home. The setup module 5840 determines the location of each reference device based on the calculation result. If an even number of reference devices reside in the home, the controller 5850 controls repetition of the pointing and calculation steps for ((number of reference devices/2)+1) or more reference devices. Further, if an odd number of reference devices reside in the home, the controller 5850 controls repetition of the pointing and calculation steps for (number of reference devices/2) or more reference devices.

While not shown in FIG. 72, the mobile terminal further includes a reception module for receiving distance information between the plurality of reference devices installed in the home according to another embodiment of the present invention.

While not shown in FIG. 72, the mobile terminal further includes a third calculation module for calculating an error between the mobile terminal and a horizontal plane or a vertical plane according to another embodiment of the present invention. The setup module 5840 readjusts the location of each reference device according to the calculated error. While not shown in FIG. 72, the mobile terminal further includes a third calculation module for calculating the distance between the mobile terminal and the random reference device according to another embodiment of the present invention. The setup module 5840 readjusts the location of each reference device according to the calculated distance.

The second calculation module 5830 calculates a first angle of the random reference device with respect to the gravity direction and a second angle of the random reference device with respect to the magnetic North direction using the 6-axis or 9-axis sensor. The mobile terminal 5800 is, for example, any of a portable phone, a tablet PC, a laptop computer, and a wearable device.

FIG. 73 is a flowchart illustrating a control method of a mobile terminal according to another embodiment of the present invention. According to the embodiment, the mobile terminal points at a random reference device from among a plurality of reference devices installed in a home (S5910) and calculates the distance between the mobile terminal and the random reference device (S5920).

The mobile terminal calculates direction information about the random reference device using a sensing module (S5930) and controls repetition of the above steps according to the number of the reference devices installed in the home (S5940). Then the mobile terminal determines the location of each reference device based on the calculation result (S5950).

As is apparent from the above description, the mobile device and control system of the present invention includes several advantages. For example, the location of an indoor electronic device or a specific indoor area can be measured accurately, an indoor electronic device can be controlled remotely and a mobile terminal approaching a specific area can be controlled remotely, and if a mobile terminal to be controlled is a legacy device, the legacy device can be pre-registered. The legacy device may be interpreted in a general meaning of the term or as an analog device or a device without communication functionality.

Further, a process for automatically changing a communication means of the mobile terminal can be provided to control a mobile terminal to be controlled according to the pointing direction of the mobile terminal.

The present invention may be implemented as code that can be written on a computer-readable recording medium. The computer-readable recording medium may be any type of recording device in which data is stored in a computer-readable manner. Examples of the computer-readable recording medium include a Hard Disk Driver (HDD), a Solid State Disk (SSD), a Silicon Disk Driver (SDD), a ROM, a RAM, a CD-ROM, a magnetic tape, a floppy disc, an optical data storage, and a carrier wave (e.g., data transmission over the Internet). The computer may include the controller 180 of the mobile device. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling a mobile terminal, the method comprising:
pointing the mobile terminal in a direction of a random reference device among a plurality of reference devices installed in a specific area;
calculating, via a controller of the mobile terminal, a distance between the mobile terminal and the random reference device;
calculating, via the controller, direction information about the random reference device using a sensing module;
controlling, via the controller, repetition of the pointing and calculation restrictively according to the number of the reference devices installed in the specific area;
registering, via the controller, location information and identification information for each of the reference devices installed in the specific area based on a result of the calculation; and
generating a map based on the location information and identification information of the reference devices for selectively controlling the registered reference devices based on a location of the mobile terminal within the specific area.

2. The method according to claim 1, further comprising:
if the number of the reference devices installed in the specific area is an even number, controlling repetition of the pointing and calculation for ((the number of the reference devices/2)+1) or more reference devices.

3. The method according to claim 1, further comprising:
if the number of the reference devices installed in the specific area is an odd number, controlling repetition of the pointing and calculation for (the number of the reference devices/2) or more reference devices.

4. The method according to claim 1, wherein the direction information about the random reference device includes 6-axis sensor information or 9-axis sensor information of the random reference device.

5. The method according to claim 1, further comprising:
pointing to the mobile terminal in a direction of a registered reference device;
identifying the registered reference device using the location of the mobile terminal within the specific area and the map; and
displaying, on the mobile terminal, a graphic image for controlling the registered reference device corresponding to the location and the pointing direction of the mobile terminal.

6. The method according to claim 1, further comprising:
setting a virtual object based on the location and the pointing direction of the mobile terminal for controlling one or more registered reference devices that correspond to the virtual object,
wherein the location and the pointing direction of the mobile terminal is independent from a location of the one or more registered reference devices that correspond to the virtual object.

7. The method according to claim 1, further comprising:
selectively entering a Line Of Sight (LOS) mode and a Non Line Of Sight (NLOS) mode by the mobile terminal,
wherein the mobile terminal only controls one or more registered reference devices within a line of sight and the pointing direction of the mobile terminal while in the LOS mode, and
wherein the mobile terminal controls one or more registered reference devices in the pointing direction of the mobile terminal independent from the light of sight of the mobile terminal while in the NLOS mode.

8. A mobile terminal comprising:
a communication processor configured to establish communication connections with a plurality of reference devices, for a location-based service to calculate a current location of the mobile terminal;
a display configured to display a list of controllable devices based on the calculated current location of the mobile terminal; and
a controller configured to:
calculate a distance between the mobile terminal and a random reference device installed in a specific area that is in a direction pointed by the mobile terminal,
calculate direction information about the random reference device using a sensing module,
repeat the pointing and calculation restrictively according to the number of the reference devices installed in the specific area,
register location information and identification information for each of the reference devices installed in the specific area based on a result of the calculation; and
generate a map based on the location information and identification information of the reference devices for selectively controlling the registered reference devices based on a location of the mobile terminal within the specific area.

9. The mobile terminal according to claim 8, wherein the controller is further configured to:
if the number of the reference devices installed in the specific area is an even number, control repetition of the pointing and calculation for ((the number of the reference devices/2)+1) or more reference devices.

10. The mobile terminal according to claim 8, wherein the controller is further configured to:
if the number of the reference devices installed in the specific area is an odd number, control repetition of the pointing and calculation for (the number of the reference devices/2) or more reference devices.

11. The mobile terminal according to claim 8, wherein the direction information about the random reference device includes 6-axis sensor information or 9-axis sensor information of the random reference device.

12. The mobile terminal according to claim 8, wherein the controller is further configured to:
when pointing the mobile terminal in a direction of a registered reference device, identify the registered reference device using the location of the mobile terminal within the specific area and the map, and
display, on the mobile terminal, a graphic image for controlling the registered reference device corresponding to the location and the pointing direction of the mobile terminal.

13. The mobile terminal according to claim 8, wherein the controller is further configured to:
set a virtual object based on the location and the pointing direction of the mobile terminal for controlling one or more registered reference devices that correspond to the virtual object,
wherein the location and the pointing direction of the mobile terminal is independent from a location of the one or more registered reference devices that correspond to the virtual object.

14. The mobile terminal according to claim 8, wherein the controller is further configured to:
selectively enter a Line Of Sight (LOS) mode and a Non Line Of Sight (NLOS) mode by the mobile terminal,
wherein the mobile terminal only controls one or more registered reference devices within a line of sight and the pointing direction of the mobile terminal while in the LOS mode, and
wherein the mobile terminal controls one or more registered reference devices in the pointing direction of the mobile terminal independent from the light of sight of the mobile terminal while in the NLOS mode.

* * * * *